US012640200B2

(12) United States Patent
Vegesna et al.

(10) Patent No.: US 12,640,200 B2
(45) Date of Patent: May 26, 2026

(54) DEVICES AND METHODS FOR READING A MEMRISTIVE ELEMENT

(71) Applicant: TechlFab GmbH, Radeberg (DE)

(72) Inventors: Sahitya Varma Vegesna, Jena (DE); Heidemarie Schmidt, Dresden (DE)

(73) Assignee: Techifab GmbH, Dresden (DE)

( * ) Notice: Subject to any disclaimer, the term of this patent is extended or adjusted under 35 U.S.C. 154(b) by 285 days.

(21) Appl. No.: 18/374,689

(22) Filed: Sep. 29, 2023

(65) Prior Publication Data

US 2024/0120003 A1      Apr. 11, 2024

(30) Foreign Application Priority Data

Sep. 30, 2022      (DE) ..................... 10 2022 125 340.6

(51) Int. Cl.
| | |
|---|---|
| *G11C 11/00* | (2006.01) |
| *G06N 3/065* | (2023.01) |
| *G11C 13/00* | (2006.01) |
| *H04L 9/08* | (2006.01) |

(52) U.S. Cl.
CPC .......... *G11C 13/004* (2013.01); *G06N 3/065* (2023.01); *G11C 13/0069* (2013.01); *H04L 9/0869* (2013.01); *G11C 2013/0045* (2013.01); *H04L 2209/12* (2013.01)

(58) Field of Classification Search
CPC .............. G11C 13/004; G11C 13/0069; G11C 2013/0045; G11C 2013/0054; G06N 3/065; H04L 9/0869; H04L 2209/12; H04L 9/0866
See application file for complete search history.

(56) References Cited

U.S. PATENT DOCUMENTS

| | | | | |
|---|---|---|---|---|
| 8,586,959 | B2 * | 11/2013 | Pickett | ............... H10N 70/8833 |
| | | | | 257/4 |
| 9,190,171 | B2 * | 11/2015 | Papandreou | ......... G11C 29/021 |
| 9,336,870 | B1 * | 5/2016 | Mickel | ............... G11C 13/0069 |
| 11,126,403 | B2 * | 9/2021 | Yang | .................. H10N 70/8833 |

(Continued)

FOREIGN PATENT DOCUMENTS

| | | |
|---|---|---|
| DE | 112011102156 A1 | 5/2013 |
| DE | 112011102156 T5 | 5/2013 |

(Continued)

OTHER PUBLICATIONS

Xi, Jane et al., "Temperature Dependence Model", Chapter 12, 2003, pp. 12-1 to 12-10, BSIM 4.3.0, UC Berkeley.

(Continued)

*Primary Examiner* — Hien N Nguyen
(74) *Attorney, Agent, or Firm* — Natalie Albrecht

(57)      ABSTRACT

According to various aspects, a device is provided including: a memristive element residing in a memristive state of a plurality of memristive states; and a read circuit configured to: in a first measurement, measure a first voltage drop over the memristive element or a first current through the memristive element, in a second measurement subsequent to the first measurement, measure a second voltage drop over the memristive element or a second current through the memristive element; and determine the memristive state of the memristive element based on the first measurement and the second measurement.

20 Claims, 34 Drawing Sheets

(56) References Cited

U.S. PATENT DOCUMENTS

| | | | |
|---|---|---|---|
| 11,127,694 B2 * | 9/2021 | Kozicki | H10B 63/30 |
| 2011/0119036 A1 | 5/2011 | Pino et al. | |
| 2011/0182104 A1 | 7/2011 | Kim et al. | |
| 2012/0075914 A1 * | 3/2012 | Bateman | G11C 13/0028 |
| | | | 365/148 |
| 2016/0118117 A1 * | 4/2016 | Park | G11C 13/0069 |
| | | | 365/148 |
| 2016/0351259 A1 | 12/2016 | Jeon et al. | |
| 2017/0213590 A1 | 7/2017 | Muralimanohar et al. | |
| 2017/0249987 A1 | 8/2017 | Jeon et al. | |
| 2018/0316493 A1 | 11/2018 | Kvatinsky et al. | |
| 2019/0122730 A1 | 4/2019 | Schmidt et al. | |
| 2020/0295920 A1 | 9/2020 | Du et al. | |
| 2023/0090726 A1 | 3/2023 | Du et al. | |

FOREIGN PATENT DOCUMENTS

| | | | |
|---|---|---|---|
| DE | 102020206790 A1 | 12/2021 | |
| WO | 2012029007 A1 | 3/2012 | |

OTHER PUBLICATIONS

Copetti, T. S. et al., "Validating a DFT Strategy's Detection Capability regarding Emerging Faults in RRAMs", IEEE, Oct. 4-7, 2021, 6 pages, 2021 IFIP/IEEE 29th International Conference on Very Large Scale Integration (VLSI-SoC), Singapore.

Blasco, J. et al., "Equivalent circuit modeling of the bistable conduction characteristics in electroformed thin dielectric films", Microelectronics Reliability, 2015, 14 pages, Issue 55, Elsevier.

European Search Report issued for the parallel European patent application No. 23 20 0840, dated Mar. 1, 2024, 12 pages (for informational purposes only).

Garcia-Redondo, Fernando et al., "A Thermal Adaptive Scheme for Reliable Write Operation on RRAM Based Architectures", IEEE, 2015, pp. 367-374, 2015 33rd IEEE International Conference on Computer Design (ICCD).

Li, Haitong et al., "A Spice Model of Resistive Random Access Memory for Large-Scale Memory Array Simulation", IEEE, Feb. 2014, pp. 211-213, IEEE Electron Device Letters, vol. 35, No. 2.

European Search Report issued for the parallel European patent application No. 23 20 0825, dated Mar. 1, 2024, 13 pages (for informational purposes only).

Office Action issued for the parallel German patent application No. 10 2022 125 340.6, dated Jun. 19, 2023, 7 pages (for informational purposes only).

Office Action issued for the parallel German patent application No. 10 2022 125 356.2, dated Jul. 11, 2023, 9 pages (for informational purposes only).

Office Action issued for the parallel German patent application No. 10 2022 125 361.9, dated Jul. 20, 2023, 12 pages (for informational purposes only).

Nan Du, et al., Practical guide for validated memristance measurements, Review of Scientific Instruments, 2013, Issue 84, 023903.

German office action for corresponding German application No. DE10 2022 125 340.6, issued Jun. 19, 2023, 7 pages (for informational purposes only).

\* cited by examiner $V_{ini}=-|V_{max}|$ (HRS)       200a $V_{ini}=+|V_{max}|$ (LRS)       200b

V $+V_{max}$

1

2

0 time

3

4

$-V_{max}$

V $+V_{max}$

3

4

0 time

2

1

$-V_{max}$

200a

200b

Current, I

2

1

Voltage, V

3

4

$V_{ini}=-|V_{max}|$ (HRS)

Current, I

4

1

3

Voltage, V

2

$V_{ini}=+|V_{max}|$ (LRS)

100

120

200a

200b

130

110

$V_{prior} < 0 \, V$ $+V_{read,max} = V_1$ $V_{prior} = V_1$ $+V_{read,max} = V_0 < V_1$ $V_{prior} = V_1$ $+V_{read,max} = V_1$ $$V_{prior} = V_1$$

$$+V_{read,max} = V_2$$

$$V_{prior} = V_2$$

$$+V_{read,max} = V_3$$

600

602

604

606

608

800

| Area, A | Modeled static state parameters | | | |
|---|---|---|---|---|
| (mm²) | n0 | K | Is | Rs |
| | | | | |
| 814 | 0,091 | 4.27 | 17.28 | 154.91 | 1.81 |
| 816 | 0,102 | 4.81 | 14.47 | 206.47 | 1.47 |
| 818 | 0,221 | 4.66 | 15.14 | 337.52 | 0.87 |
| 820 | 0,454 | 4.38 | 16.65 | 617.70 | 0.48 |

| Area, A | Modeled static state parameters | | | | Calculated | |
|---|---|---|---|---|---|---|
| (mm²) | n0 | K | Is/A | Rs*A | Is | Rs |
| | | | | | | |
| 814 | 0,091 | 4.27 | 17.14 | 1735.46 | 0.16 | 157.93 | 1.76 |
| 816 | 0,102 | 4.81 | 14.48 | 2063.70 | 0.15 | 210.50 | 1.47 |
| 818 | 0,221 | 4.63 | 15.25 | 1555.05 | 0.19 | 343.67 | 0.86 |
| 820 | 0,454 | 4.37 | 16.66 | 1351.06 | 0.22 | 613.38 | 0.48 |

R (kOhms)

Voltage (V)

Is (nA)

Voltage (V)

806 one or more
static state
parameter values

812 one or more
operating
parameters

904

1000

1600

1602(n=1)     1602(n=2)    • • •    1602(n=N)

602

1604 key    1606 cryptographic key    1608

1600

1602(n=1)     1602(n=2)  • • •  1602(n=N)

602

1604 key   1606 random number   1610

1600

1612

1602(n=1)          1602(n=2)     • • •     1602(n=N)

602

1604 key          1606

Current in A

Voltage in V

Current in A

Voltage in V

FIG. 18

1800

1802 applying a voltage pulse to a memristive element which is set into a memristive state

1804 during applying the voltage pulse to the memristive element, measuring a first current value associated with a current through the memristive element at a first voltage value and a second current value associated with the current through the memristive element at a second voltage value different from the first voltage value

FIG. 19

1900

1902 applying a voltage pulse to a memristive element

1904 during a falling edge of the applied voltage pulse, measuring a first current value associated with a current through the memristive element at a first voltage value and a second current value associated with the current through the memristive element at a second voltage value different from the first voltage value

FIG. 20

2000

2002 setting a memristive element into a memristive state of a plurality of memristive states

2004 determining one or more static state parameter values of the memristive element associated with the memristive state, wherein determining the one or more static state parameter values includes: determining a current/voltage characteristic of the memristive element by applying a read voltage sequence to the memristive element to cause a corresponding current sequence through the memristive element, and fitting the current/voltage characteristic by a physical model to determine the one or more static state parameter values, wherein the physical model is based on static state parameters for which the static state parameter values are determined.

DEVICES AND METHODS FOR READING A MEMRISTIVE ELEMENT

CROSS-REFERENCE TO RELATED APPLICATIONS

This application claims priority to German application DE 10 2022 125 340.6, filed on Sep. 30, 2022, the entire content of which is incorporated herein by reference.

TECHNICAL FIELD

Various aspects relate to devices and methods for reading a memristive element using at least two measurements during a single read-out operation.

BACKGROUND

In general, various data processing applications may rely on transistor technologies. However, it was found that resistor arrays may be useful for some data processing applications as well. Such resistor-based technologies were further developed to allow for a selective reconfiguration of an electric resistance of resistors. Such devices having a non-volatile, reconfigurable electric resistance, may be referred to as memristive devices or memristors, for example. Memristor crossbar arrays were developed to replace transistors and memory cells in some data processing and data storage applications. However, an occurrence of leakage currents in memristor based crossbar arrays may limit a scalability of such structures. Therefore, several types of memristors with nonlinear resistance behavior have been proposed to reduce leakage currents when reconfiguring and reading selective memristors over nonselective memristors. These include so-called complementary resistance switches, which include two memristive structures connected in series, wherein a disadvantage of this technology may be that the state of the complementary resistance can be only read out destructively and, therefore, the complementary resistance switch has to be rewritten after readout. An approach for a nondestructive readout of a state of a complementary resistive switch may be based on capacitance measurements. A complementary resistive switch may include a two-layer memristive structure with strong non-linear resistive behavior and a single-layer memristive structure with strong nonlinear resistive behavior.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 8A shows a reading scheme for determining a respective value of one or more static state parameters of a memristive structure associated with a memristive state the memristive structure resides in.

FIG. 9 to FIG. 14 each shows a respective processing scheme for employing determined static state parameter values;

FIG. 18 and FIG. 19 each shows a flow diagram of a respective method for reading a memristive element using at least two different reading voltages; and FIG. 20 shows a flow diagram of a method for determining a respective value of one or more static state parameters associated with a memristive state of a memristive structure.

DESCRIPTION

Figure 1A:
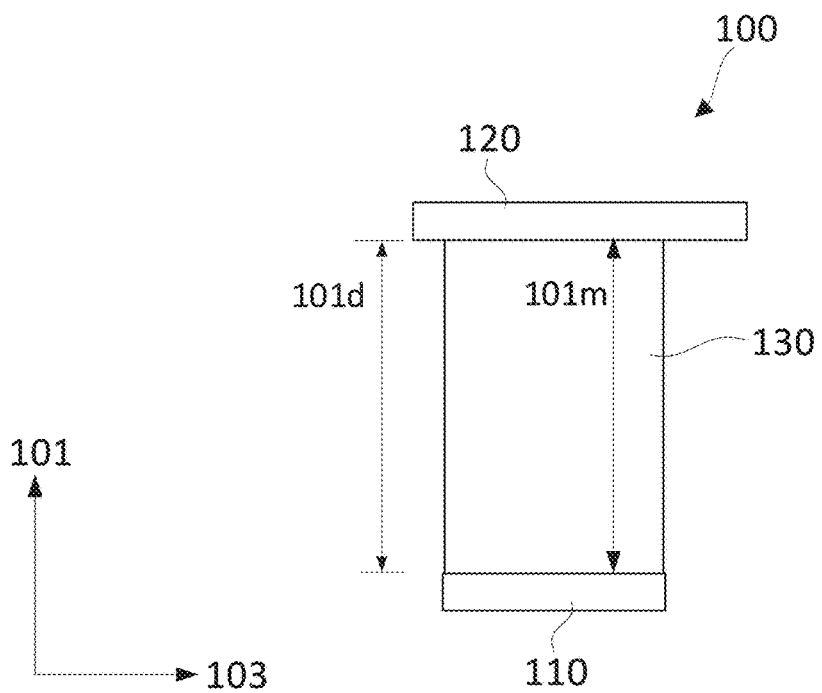
FIGS. 1A to 1D schematically show various aspects of a memristive structure.

The following detailed description refers to the accompanying drawings that show, by way of illustration, specific details, and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects. Various aspects are described in connection with methods and various aspects are described in connection with devices (e.g., arrangements). However, it may be understood that aspects described in connection with methods may similarly apply to the devices, and vice versa.

The terms "at least one" and "one or more" may be understood to include any integer number greater than or equal to one, i.e., one, two, three, four, [ . . . ], etc. The term "a plurality" may be understood to include any integer number greater than or equal to two, i.e., two, three, four, five, [ . . . ], etc. The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The phrase "unambiguously assigned" may be used herein to mean a one-to-one-assignment (e.g., allocation, e.g., correspondence) or a bijective assignment. As an example, a first element being unambiguously assigned to a second element may include that the second element is unambiguously assigned to the first element. As another example, a first group of elements being unambiguously assigned to a second group of element may include that each element of the first group of elements is unambiguously assigned to a corresponding element of the second group of elements and that that corresponding element of the second group of elements is unambiguously assigned to the element of the first group of elements.

The term "coupled" may be used herein with respect to nodes, circuit elements, and the like, to mean a, e.g. direct or indirect, connection and/or interaction. Several elements may, for example, be coupled together along an interaction chain (e.g., an electrically conductive path), along which the interaction (e.g., electrical charges) may be transmitted. For example, two elements coupled together may interact with each other.

The term "connected" or "connection" may be used herein with respect to nodes, circuit elements, and the like, to mean electrically connected, which may include a direct connection or an indirect connection, wherein an indirect connection may only include additional structures in the current path that do not influence the substantial functioning of the described circuit or device. The term "electrically conductively connected" that is used herein to describe an electrical connection between one or more terminals, nodes, regions, contacts, etc., may be understood as an electrically conductive connection with, for example, ohmic behavior, e.g., provided by a metal or degenerate semiconductor in absence of p-n junctions in the current path. The term "electrically conductively connected" may be also referred to as "galvanically connected."

In some aspects, two physical and/or chemical properties (e.g., an electrical voltage, an electrical current, an electrical conductance, a thickness, an electrical conductivity, a doping concentration, as examples) may be compared with one another by relative terms such as "greater", "higher", "lower", "less", or "equal", for example. It is understood that, in some aspects, a comparison may include a sign (positive or negative) of a value representing the physical and/or chemical properties or, in other aspects, the absolute values are considered for the comparison. However, a comparison of measurement values representing a physical and/or chemical property may usually include a measurement of such measurement values by the same measurement principle or at least by comparable measurement principles.

According to various aspects, a memristive structure in an array of memristive structures (e.g., within a crossbar array) may be addressable, e.g. by being unambiguously assigned to a logic address. The addressability and the logic addresses may be provided by the architecture of the control lines connected to a respective memristive structure. In a crossbar array, two sets of control lines (e.g., a set of word-lines and a set of bit-lines) may be utilized to address an array of memristive structures. According to various aspects, an analog memristive structure may reside in one of various memristive states (also referred to as resistance states) associated therewith. As an example, the actual electrical resistance (or conductivity) associated with a memristive structure can be determined via a read operation to evaluate in which of the distinct memristive states the memristive structure is residing in. As another example, the actual electrical resistance (or conductivity) associated with a memristive structure can be utilized in a neuronal network configuration to influence a data or signal processing.

In some aspects, a plurality of memristive structures may be arranged in a crossbar configuration. In such a crossbar configuration, a memristive material portion (also referred to as memristor or memristive device) can be addressed by a corresponding cross-point formed by input-lines and output-lines of the crossbar arrangement. Neuromorphic and/or analog computing technologies, only as examples, may utilize an ideal analog switching of a memristive structure.

FIG. 1A to FIG. 1D show various aspects of a memristive structure 100. As illustrated in FIG. 1A, according to various aspects, the memristive structure 100 may include a first electrode 110 and a second electrode 120. The first electrode 110 and/or the second electrode 120 may include any suitable electrically conductive material, e.g., Al, Cu, Ti, AlCu, TiN, W, Ta, only as examples. The memristive structure 100 may further include a memristive material portion 130 (e.g., a memristive element). The memristive material portion 130 may be disposed between the first electrode 110 and the second electrode 120. Illustratively, the region in which the first electrode 110 and the second electrode 120 overlap one another may be (e.g., partially or completely) filled with memristive material. According to various aspects, the memristive material portion 130 may be in electrical contact and in direct physical contact with both the first electrode 110 and the second electrode 120. Therefore, a dimension $101m$ (e.g., a height or a thickness) of the memristive material portion 130 may be defined by a distance $101d$ from the first electrode 110 to the second electrode 120. The distance $101d$ from the first electrode 110 to the second electrode 120 may be understood as a shortest distance measure, for example, perpendicular to the planes in which the electrodes are formed. According to various aspects, the dimension (e.g., the height) of the memristive material portion 130 may be in a predefined range such that the memristive structure 100 has a substantially symmetric read characteristic and/or at least one curvature change in the read characteristic. The first electrode 110 and the second electrode 120 may be planar electrodes.

Figure 1B:
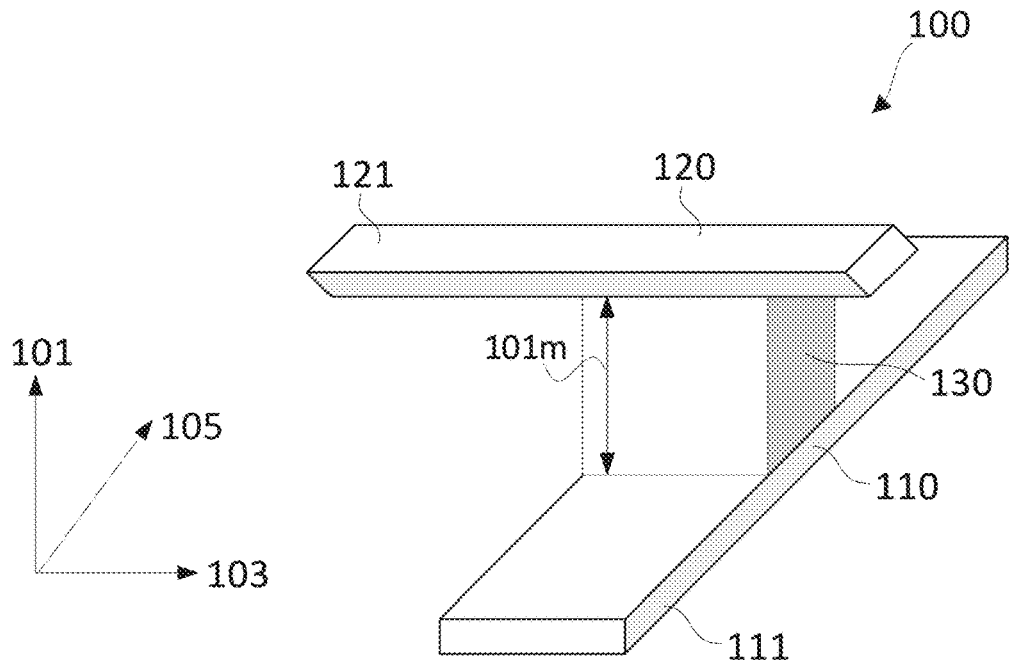

According to various aspects, the memristive structure 100 may be a memristive cross-point structure included in a memristive crossbar array. The first electrode 110 and the second electrode 120 may be each a portion of a corresponding crossbar control line. As an example, a crossbar array may include a set of first control lines and a set of second control lines in a crossbar configuration, and the first electrode 110 may be a portion of a first control line 111 of the set of first control lines and the second electrode 120 may be a portion of a second control line 121 of the set of second control lines, as illustrated in FIG. 1B. In this example, the memristive material portion 130 may be in direct physical contact with both the first control line 111 and the second control line 121, and the memristive material portion 130 may be disposed between both the first control line 111 and the second control line 121. Accordingly, a memristive structure 100 can be provided in each of various cross-point regions of the crossbar array.

Figures 1C, 1D:
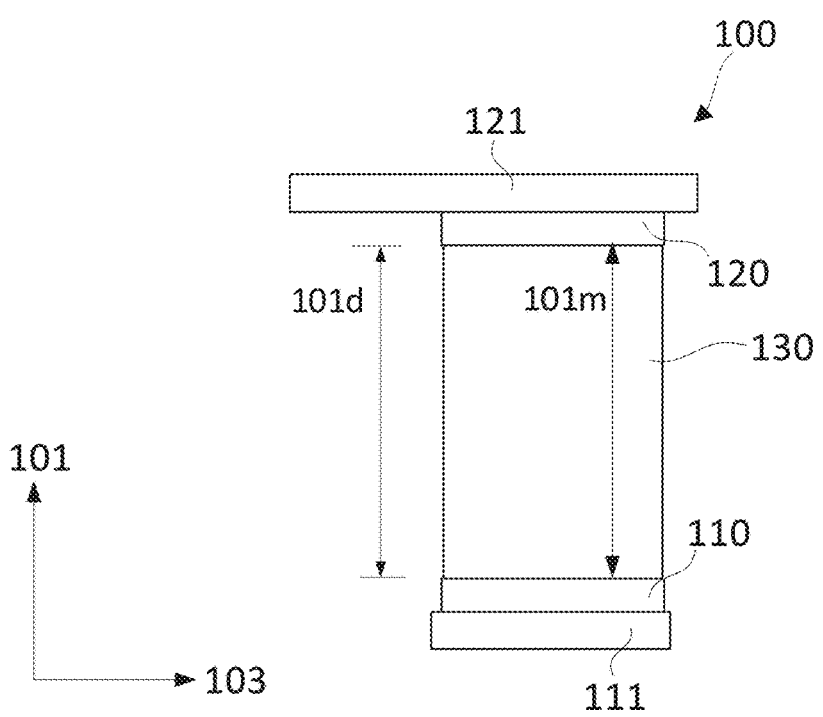

In other aspects, the first electrode 110 may be coupled to (e.g., electrically conductively connected to, e.g., in direct physical contact with) a corresponding first control line (e.g., a first control line of a crossbar array) and the second electrode 120 may be coupled to (e.g., electrically conductively connected to, e.g., in direct physical contact with) a corresponding second control line (e.g., a second control line of a crossbar array). As an example, a crossbar array may include a set of first control lines and a set of second control lines in a crossbar configuration, and the first electrode 110 may be coupled to (e.g., electrically conductively connected to, e.g., in direct physical contact with) a first control line 111 of the set of first control lines and the second electrode 120 may be coupled to (e.g., electrically conductively connected to, e.g., in direct physical contact with) a second control line 121 of the set of second control lines, as illustrated in FIG. 1C and FIG. 1D. In this example, the memristive material portion 130 may not be in direct physical contact with the first control line 111 and the second control line 121. But the first electrode 110 may be in direct physical contact with the first control line 111 and the second electrode 120 may be in direct physical contact with the second control line 121. The first electrode 110, the second electrode 120, and the memristive material portion 130 may be disposed between the first control line 111 and the second control line 121. Accordingly, a memristive structure 100 can be provided in each of various cross-point regions of a crossbar array.

According to various aspects, a crossbar array may define lateral (e.g., in plane) dimensions, e.g., along lateral directions 103, 105 shown in the figures. As an example, each control line (e.g., first control line 111) of a set of first control lines of the crossbar array may extend along a first lateral direction 105 and each control line (e.g., second control line 121) of a set of second control lines of the crossbar array may extend along a second lateral direction 103. The first lateral direction 105 may be perpendicular to the second lateral direction 103. A height direction 101 may be perpendicular to the first lateral direction 105 and/or the second lateral direction 103. The height direction 101 may be perpendicular to a planar surface of the first electrode 110 facing the memristive material portion 130 and/or perpendicular to a planar surface of the second electrode 120 facing the memristive material portion 130.

The dimension 101m (e.g., a height or a thickness) of the memristive material portion 130 may be defined along a direction parallel to the height direction 101. Accordingly, the distance 101d between the first electrode 110 and the second electrode 120 may be defined along a direction parallel to the height direction 101. The dimension 101m of the memristive material portion 130 may be greater than 150 nm. Accordingly, the distance 101d from the first electrode 110 to the second electrode 120 may be greater than 150 nm.

As explained above, the first control line 111 and the second control line 121 may be in a crossbar configuration to allow for an electrical addressing of the memristive structure 100 (i.e., the memristive material portion 130) via the first control line 111 and the second control line 121. An electrical addressing of the memristive structure 100 may be used to read information stored in the memristive structure 100 and/or to write (e.g., store) information into the memristive structure 100. In other words, an electrical addressing of the memristive structure 100 may be used to determine a state (e.g., a memristive state) in which the memristive structure 100 is residing and/or to set (e.g., keep or change) a (e.g., a memristive) state of the memristive structure 100.

In some aspects, the memristive material portion 130 may be patterned. Since the electric field between the first electrode 110 and the second electrode 120 may be substantially formed in the overlap region between the respective electrodes 110, 120, it may be sufficient to provide the memristive material only in the overlap region to form the memristive material portion 130, see, for example, FIGS. 1A to 1D. In this case, according to various aspects, the memristive material portion 130 has an aspect ratio of greater than 1, e.g., greater than 2, greater than 5, greater than 10. The aspect ratio may be defined by the height (e.g., the dimension along the height direction 101) of the memristive material portion 130 divided by a width (e.g., along one of the lateral directions 103, 105) of the memristive material portion 130. A sufficiently great height of the memristive material portion 130 and therefore a comparatively high aspect ratio may be essential to provide a memristive material portion 130 with ideal analog read properties. However, since due to manufacturing aspects, it may be difficult to form such a memristive material portion 130 with a comparatively high aspect ratio, the memristive material portion 130 may be provided by a non-patterned layer of a memristive material and/or the memristive material portion 130 may have a greater lateral extension than the overlap region between the electrodes 110, 120. However, a sufficiently great height of the memristive material portion 130 may be realized in any cases to achieve ideal analog read properties.

Possible materials that can be used to form the memristive material portion 130 may be, for example, a ternary oxide, a quaternary oxide, and/or a quinary oxide. Examples for ternary oxides are perovskite oxides with a base structure ABO3 or bixbyite with a base structure of A2O3 or B2O3 or mixtures thereof. Further, mixtures may include different impurities at the A or B site. Examples of elements for A may include La3+, Ce, Nd, Sm, Eu, Gd, Tb, Dy, Ho, Er, Yp, Lu, Ca, Pr, Pm, Tm, Tl, Pb, Bi, Sr, Y, Ba, Cr, Pu (e.g., all 3+ like La3+). Examples of elements for B may include Al3+, Cr, Fe, Ga, In, Sc, V, Ti, Mn, Co, Ni, Sn (e.g., all 3+ like Al3+). Examples of impurities at the A site may include Ca, La, Ce, Nd, Sm, Eu, Gd, Tb, Dy, Ho, Er, Yb, Lu, Pr, Pm, Tm, Tl, Pb, Bi, Sr, Y, La, Ba, Cr Pu, Al, Cr, Fe, Ga, In, Sc, V, Ti, Mn, Co, Ni, Sn, e.g., with a different valence than 3+. Examples of impurities at the B site may include Al, Cr, Fe, Ga, In, Sc, V, Ti, Mn, Co, Ni, Sn, Ca, La, Ce, Nd, Sm, Eu, Gd, Tb, Dy, Ho, Er, Yb, Lu, Pr, Pm, Tm, Tl, Pb, Bi, Sr, Y, La, Ba, Cr, Pu, e.g., with a different valence than 3+. Perovskite oxides may be present in different phases like for example a rhombohedral alpha phase, an orthorhombic beta phase, a hexagonal phase, and/or a cubic bixbyite phase. Examples of suitable crystalline materials may include the ternary oxides CaTiO3, BaTiO3, PbTiO3, LaNiO3, NdAlO3, and/or PrAlO3. The memristive material portion 130 may be or may include one or more of the following materials and/or material combinations: Al2O3/ TaOx, SiOx:Ag/TiOx, TaO, HfAlyOx/TaO, Pr0.7Ca0.3MnO3 (PCMO), Si—In—Zn—O/ion gel, SiIn-ZnO, SiN/TaN, SrFeO3, only as examples.

In some aspects, at least a portion of the memristive material portion 130 may be modified, e.g., to cause a vacancy doping V+ or V−. In some aspects, the memristive material portion 130 may include an n-type memristive material that has a positive vacancy doping V+, e.g. anion vacancy. In other aspects, the memristive material portion 130 may include a p-type memristive material that has a negative vacancy doping V−, e.g. cation vacancy. In the case that the memristive material that form the memristive material portion 130 is an oxide, e.g., BiFeyOx, the vacancy doping V+ may be cause by oxygen vacancies VO+. In some aspects, at least a portion of the memristive material portion 130 may be modified, e.g., to cause traps, T. Accordingly, the memristive material portion 130 may include traps T. As an example, the traps T may be caused by introduction of metal iones (e.g., titanium ions) into the memristive material. A function of the memristive material portion 130 may be understood in terms of movable vacancies V+ that can be locally trapped in regions of the memristive material portion 130. The traps T may be introduced adjacent to the first electrode 110 and second electrode 120 and the movable vacancies V+ may selectively move either into the region adjacent to the first electrode 110 or into the region adjacent to the second electrode 120 and trapped there accordingly in an electric field. This may allow for generating selectively a Schottky-type diode either with maximum barrier height at the first electrode 110 or with maximum barrier height at the second electrode 120 such that the memristive structure 100 exhibit a nonlinear switching behavior and is self-rectifying.

Figures 2A, 2B, 2C:
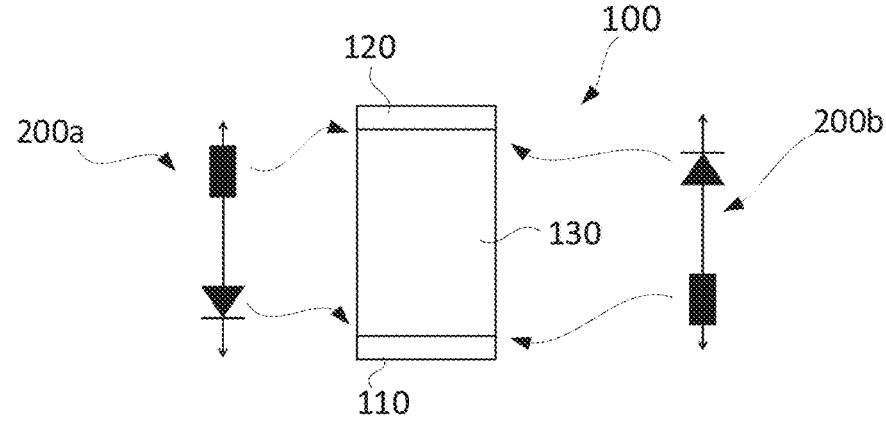
FIGS. 2A to 2F show aspects of electric characteristics corresponding to barrier switching of a memristive structure and FIGS. 2G to 2I each show measured IV-characteristics for different exemplary memristive structures.

A memristive structure (also referred to as memristive device, memristive element, resistive switch, memristor, memristor element, or memristor structure) may be regarded as an analog memristive structure in the case that the memristive structure exhibits a continuous change in current (e.g., in the read current $I_{read}$) when (e.g., linearly) ramping the applied voltage (e.g., from 0 V to $+V_{max}$ and from $+V_{max}$ to 0 V and from 0 V to $-V_{max}$ and from $-V_{max}$ to 0 V), as illustrated, for example, in FIG. 2A and FIG. 2B. This current may be associated with a current through the memristive structure 100. In the following various aspects are described with reference to the memristive structure 100; it is noted that this serves for illustration and that other memristive structures may be used accordingly.

Up to now, a memristive structure was set either into a high resistive state (HRS) or a low resistive state (LRS). This process of setting the memristive structure into the high resistive state (HRS) or the low resistive state (LRS) was often referred to as writing a memristive state of the memristive structure. However, it is found that the high resistive state (HRS) is always associated with changing memristive states, $m_s$. In this case, aspects of an applied write signal (e.g., a maximum applied voltage value or a maximum applied current value, a shape of the write signal, etc.) may define the memristive state into which the memristive structure is written in (e.g., in the case of a voltage signal, the memristive state after reducing the voltage to 0 V). This curve associated with changing the memristive states may be denoted as transition curve. It is found that this transition curve is common for all memristive states. Further, it is found that each memristive state is associated with a corresponding resistance-characteristic curve such that information about the resistance-characteristic curve allows to conclude the memristive state the memristive structure is in. Hence, each resistance-characteristic curve may be unambiguously assigned to a respective memristive state, and vice versa. This resistance-characteristic curve may be independent on how the memristive structure was set into the corresponding memristive state. As described in the following, these findings allow to use less complex writing schemes as well as various kinds of reading schemes to read out the memristive state of the memristive structure 100. The described writing and/or reading schemes allow, for example, to differentiate between more than 100 (e.g., more than 500, e.g., more than 1000) different memristive states. Hence, as compared to two memristive states (HRS or LRS), the memristive structure 100 may be in one of more than 100 (e.g., more than 500, e.g., more than 1000) memristive states enhancing the number of bits associated with the memristive structure 100 significantly. In the following, various reading schemes for reading out a memristive state are exemplarily described for the memristive structure 100. It is understood that any memristive structure may be read using one or more of these reading schemes and that any kind of device which includes at least one memristive structure may employ any of these reading schemes. According to an example, the device may include a read circuit configured to read out the memristive state of the at least one memristive structure. According to another example, the device may be (e.g., for analysis) coupled to another device which is configured to apply a measurement signal to the memristive structure in order to read out the memristive state of the at least one memristive structure.

According to various aspects, a (e.g., measurement) signal may be applied to the memristive structure to set a memristive state and/or to read a prior set memristive state. The (e.g., measurement) signal may be, for example, a signal pulse. The memristive structure 100 may be addressed via a voltage-driven mode or a current-driven mode. In the case of the voltage-driven mode, a voltage signal (e.g., a voltage pulse) may be applied to the memristive structure 100 and an induced current through the memristive structure 100 may be determined (e.g., measured). In the case of the current-driven mode, a current signal (e.g., a current pulse) may be applied to the memristive structure 100 and an induced voltage may be determined (e.g., measured). Herein, various aspects of memristive structures and of various reading schemes are described for the voltage-driven mode (e.g., in the case of the shown IV-characteristics). It is noted that this serves for illustration and that other modes, such as the current-driven mode, can be used accordingly.

FIG. 2A shows a first exemplary ramping scheme 200a that can be used to set the memristive structure 100 into the high resistive state (HRS) and a second exemplary ramping schemes 200b that can be used to set the memristive structure 100 into a low resistive state (LRS). FIG. 2B shows an exemplary current/voltage (I/V) characteristic of the memristive structure 100 obtained via the two exemplary ramping schemes 200a, 200b, according to various aspects. FIG. 2C shows two equivalent circuits representing the electrical condition of a memristive structure for the HRS and the LRS. The memristive structure 100 may be in a self-rectifying configuration. The self-rectifying configuration and/or the desired switching behavior may be caused by a formation of a diode (e.g., a Schottky contact) and a resistor at the interfaces between the first electrode 110 and the memristive element 130 and between the second electrode 120 and the memristive element 130 (the memristive element 130 may be a memristive material portion). The diode and the resistor are coupled to one another in a series connection and provide the described HRS and LRS states for a defined polarity. The switching of the memristive structure 100 and therefore the presence of a diode-contact or a resistive contact at the respective electrode regions may be defined by the memristive material, e.g., by presence and/or absence of oxygen vacancies in the electrode regions.

Figure 2D:
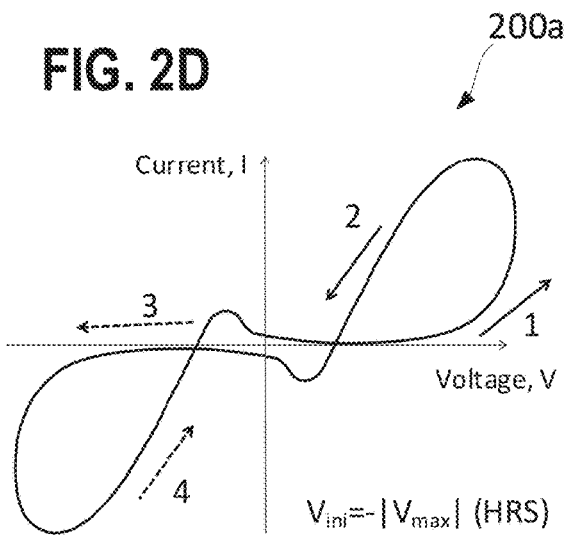
Figure 2D:
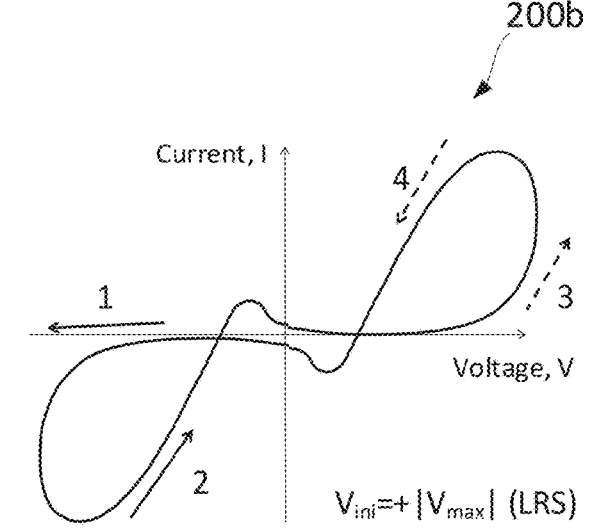
Figure 2E:
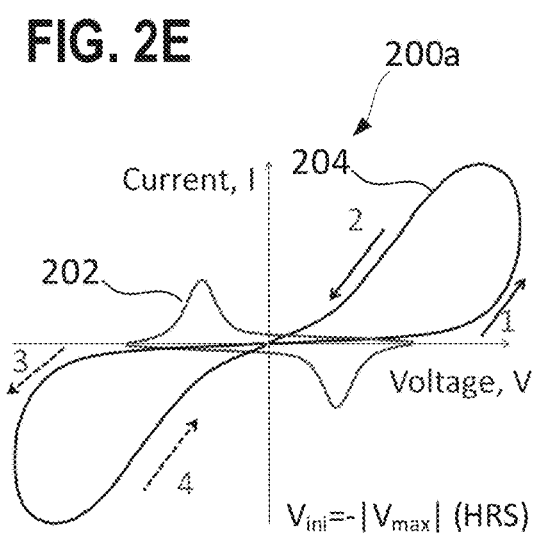
Figure 2E:
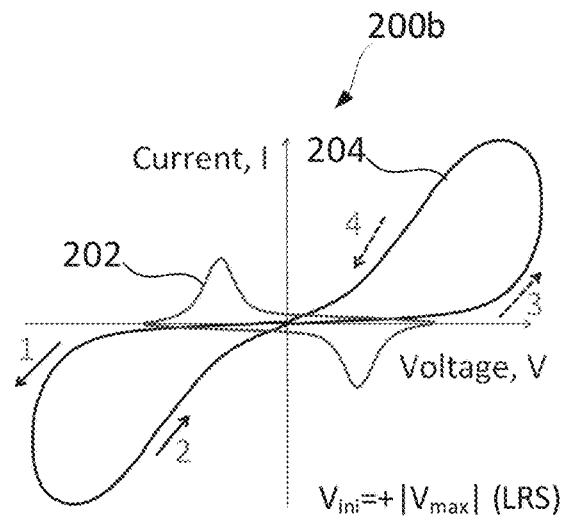
Figure 2F:
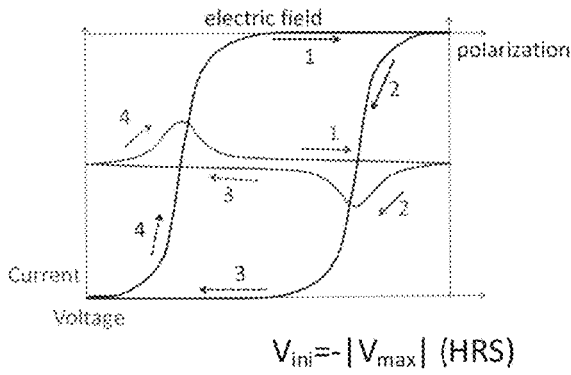
Figure 2F:
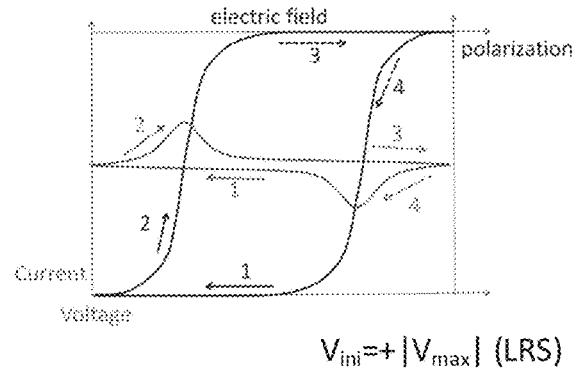
Figure 2G:
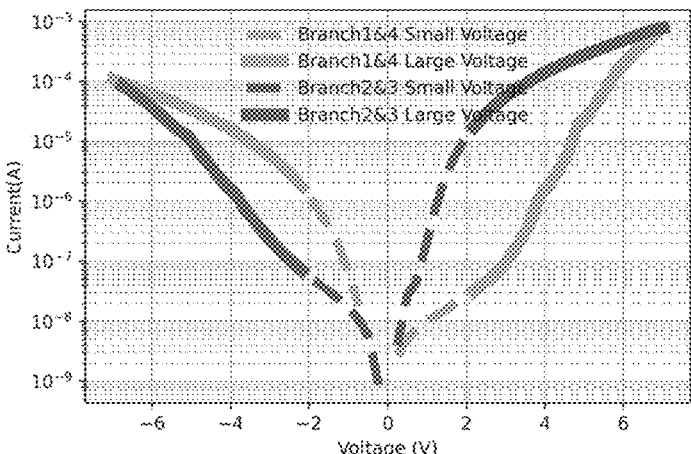
Figure 2H:
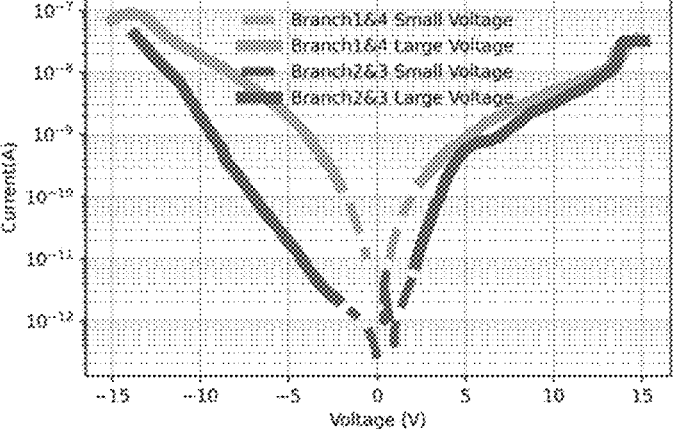
Figure 2I:
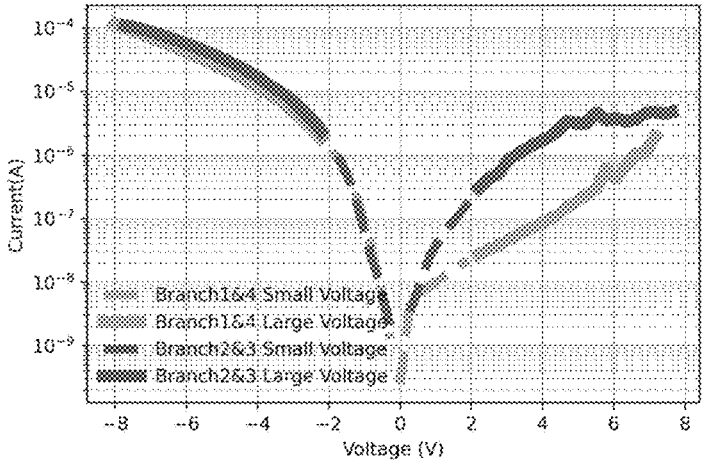

It is understood that the IV-characteristics shown in FIG. 2B are exemplary and schematically serving for illustration and that the IV-characteristic of a memristive structure may be different. In particular, many different types of IV-characteristics are possible for various kinds of memristive structures (e.g., depending on the material, the size, the thickness of the layers, etc.). FIG. 2G to FIG. 2I each show an exemplarily measured IV-characteristic of a respective memristive structure.

Up to now, the memristive structure 100 may be set into a well-defined memristive state by applying an initialization voltage, $V_{ini}$, (in some aspects referred to as programming voltage or write voltage) and subsequently applying a desired write voltage scheme to set a memristive state in which the memristive structure 100 is residing in after the write voltage has been applied.

As shown in FIG. 2A, the memristive structure 100 may be set into the low resistive state (LRS, branch 2) by ramping the voltage from 0 V to +$|V_{max}|$ (branch 1) and into low resistance state (LRS, branch 4) by ramping the voltage from 0V to −$|V_{max}|$ (branch 3). As shown in FIG. 2B, the memristive structure 100 may be set into the low resistive state (LRS, branch 2) by ramping the voltage from 0 V to −$|V_{max}|$ (branch 1) and into low resistance state (LRS, branch 4) by ramping the voltage from 0V to +$|V_{max}|$ (branch 3). The resistance state in branch 2 and in branch 4 in FIG. 2A can be determined by applying a read voltage that is less than the write voltage and has the same polarity as the write voltage, i.e. positive polarity in branch 2 and negative polarity in branch 4. The resistance state in branch 2 and in branch 4 in FIG. 2B may be determined by applying a read voltage (value) that is smaller than the write voltage (value) and has the same polarity as the write voltage (value), i.e. a negative polarity in branch 2 and positive polarity in branch 4. In this case, the state of the memristive structure 100 may be read out by applying a positive read voltage having a voltage value between about 0 V and about +$V_{max}$. Depending on the state of the memristive structure 100, the applied read voltage always causes a larger current flow associated with low resistance state in comparison to the small current flow flowing during application of the write voltage. Here, the voltage, V, may be ramped up to a maximum positive voltage value, +$V_{max}$, and up to a maximum negative voltage value, −$V_{max}$. In an example, the respective maximum voltage, $|V_{max}|$, may be the highest voltage that can be applied such that no breakdown (e.g., of the diode described with reference to FIG. 2C) occurs. In another example, the respective maximum voltage, $|V_{max}|$, may have any voltage value different from 0. However, as described above, these complex writing schemes may not be necessary by employing the findings that the high resistive state (HRS) is always associated with changing memristive states (branches 1 and 3 in FIG. 2A and branches 1 and 3 in FIG. 2B) and that each memristive state is associated with a corresponding resistance-characteristic curve (branches 2 and 4 in FIG. 2A and branches 2 and 4 in FIG. 2B).

The IV-characteristics may show ferroelectric and interface switching current. Exemplary IV-characteristics which include ferroelectric and/or interface switching effects are shown in FIG. 2D as obtained via the first exemplary ramping scheme 200a and via the second exemplary ramping scheme 200b. According to various aspects, these effects may be subtracted from the IV-characteristics. For example, the ferroelectric current may be subtracted from the IV-characteristics to obtain corrected IV-characteristics. FIG. 2E exemplarily shows a ferroelectric current 202 which may be subtracted from the IV-characteristics shown in FIG. 2D to obtain the corrected IV-characteristics 204. FIG. 2F shows the corresponding electric field vs. polarization behavior. In contrast to ferroelectric switching, when using barrier switching information about properties can be obtained by means of the polarity of the voltage signal.

Figure 3A:
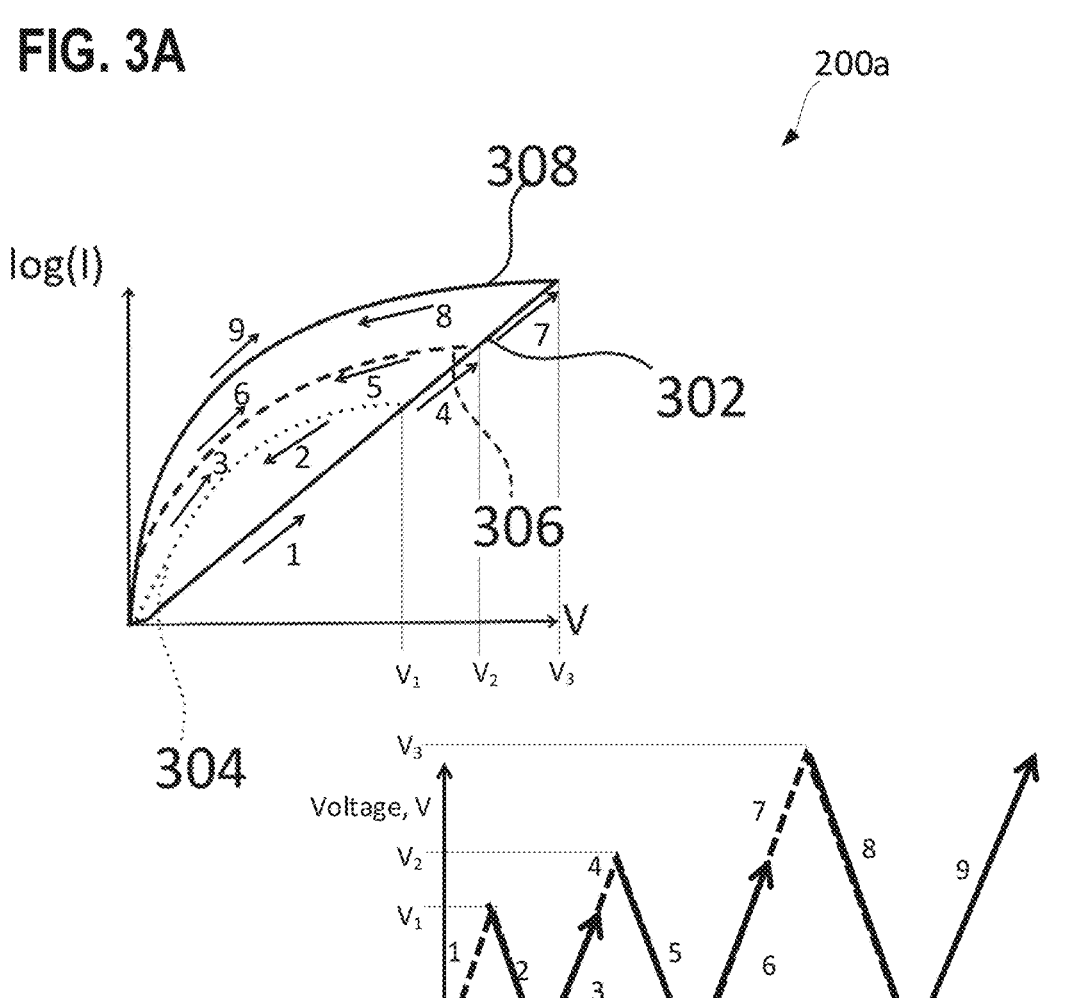
FIG. 3A shows a respective schematic IV-characteristic of a memristive structure for three different memristive states and FIG. 3B shows a respective IV-characteristic measured for five different memristive states of a memristive structure.

FIG. 3A shows a schematic IV-characteristic of the memristive structure 100 exemplarily for the first quadrant of the IV-diagram. The following description may apply similarly to the third quadrant. For example, the first quadrant and the third quadrant may be associated with a respective transition curve. Also, the first quadrant (i.e., positive applied voltages) may be associated with a plurality of (positive) memristive states and the third quadrant (i.e., negative applied voltages) may be associated with a plurality of (negative) memristive states. It is understood that, in some aspects, the described behavior may be only present in either the first quadrant or the third quadrant. FIG. 3A also shows a voltage signal scheme including writing (dashed lines) as well as reading (solid lines) memristive states.

Figure 3B:
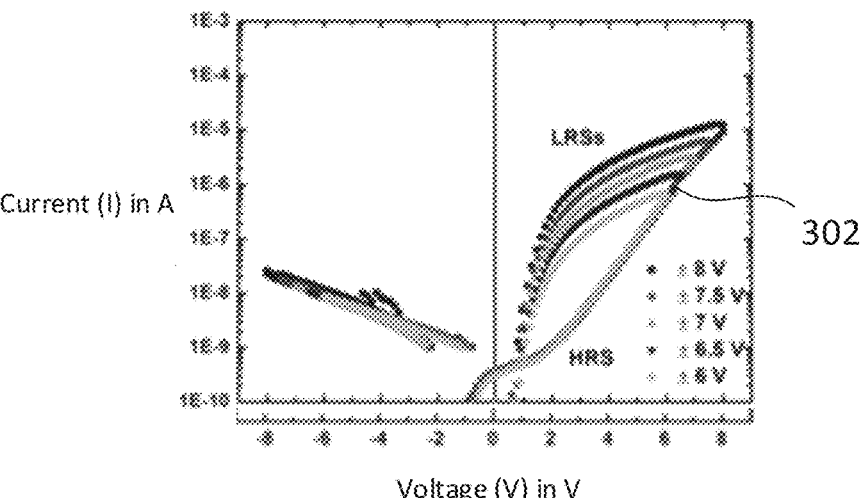
Figure 4A:
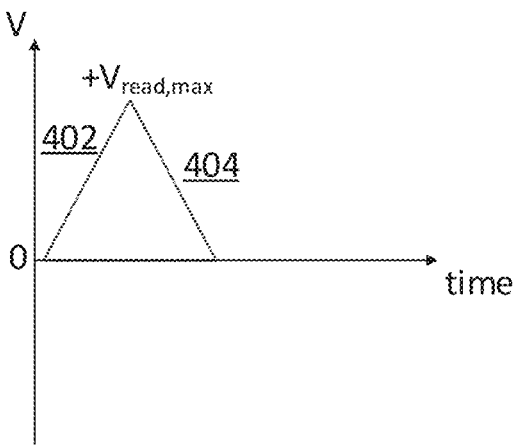
FIGS. 4A to 4E each shows a respective exemplary voltage pulse used for reading a memristive structure.
Figure 4B:
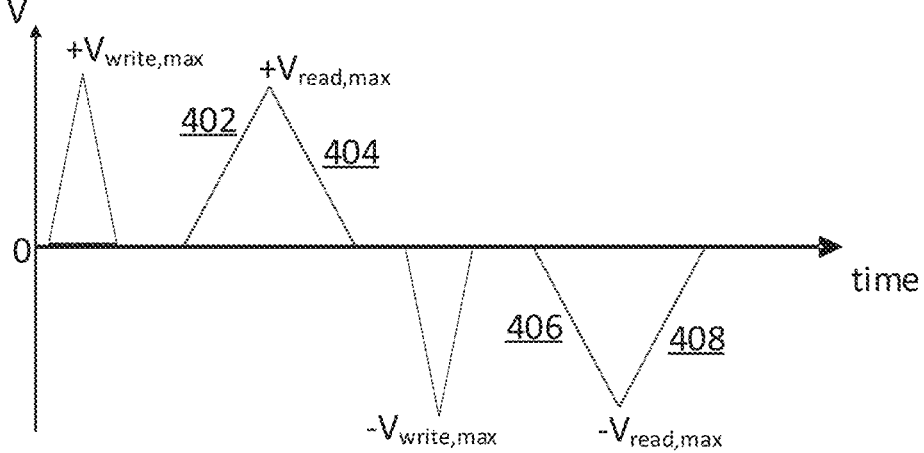
Figure 4C:
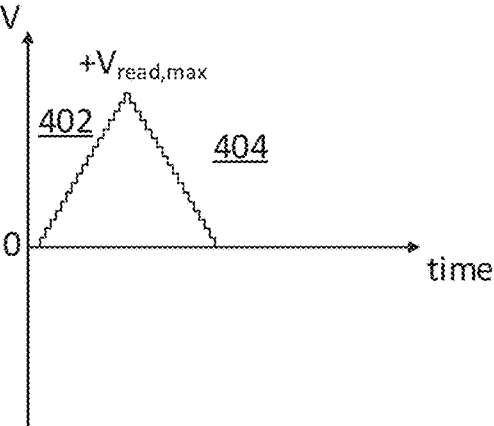
Figure 4D:
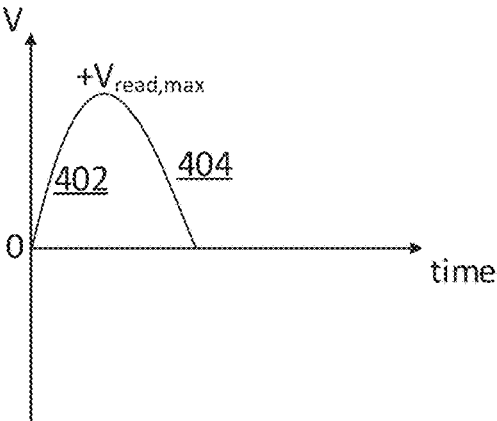
Figure 4E:
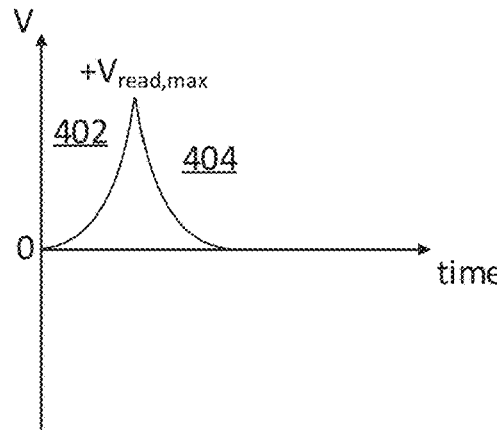

As exemplarily shown for the first quadrant, the transition curve 302 (branch 1) may be associated with changing the resistivity of the memristive structure 100 (e.g., via moving traps T), thereby changing the memristive state, $m_s$. Each current-voltage (I-V) data point, I(V), on the transition curve 302 may be associated with a corresponding memristive state, $1 \leq m_s \leq M$ (with M being any integer number equal to or greater than one (e.g., equal to or greater than 100, e.g., equal to or greater than 200, etc.), of the memristive structure 100. This transition curve 302 may be associated with the HRS state. As described herein, it is found that, when setting the memristive structure into a respective memristive state, this transition curve 302 is similar for all memristive states (since each data point of the transition curve 302 corresponds to a respective memristive state). Hence, a memristive structure 100 has one transition curve 302 (transitioning from a lowest memristive state, $m_s$=1, over various intermediate memristive states to a highest memristive state, $m_s$=M). For illustration, the transition curve 302 is herein shown (substantially) linearly. It is understood that the transition curve 302 may have any course depending the memristive structure. FIG. 3B shows an IV-characteristic measured for a manufactured memristive structure illustrating that the transition curve 302 can have a substantially linear course. However, it is noted that there may be a highest memristive state, $m_s$=M, associated with a corresponding voltage value. Within the same quadrant (e.g., the first or the third quadrant), the memristive states (from $m_s$=2 to $m_s$=M−1) between the lowest memristive state, $m_s$=1, and the highest memristive state, $m_s$=M, may be referred to as intermediate memristive states. When applying a voltage having a voltage value greater than the voltage value corresponding to the highest memristive state, $m_s$=M, the memristive structure 100 may be set into the highest memristive state. In this case, the transition curve 302 may, at the voltage value corresponding to the highest memristive state, (e.g., slowly) change from the linear behavior into saturation (hence a substantially stable current). It is understood that by further increasing the voltage value beyond that saturation regime, the current value may increase significantly due to the diode character of the memristive structure 100 (hence, a breakthrough of the Schottky-type diode).

As described herein, each memristive state (thus, each data point, I(V)), on the transition curve 302 may be associated with (e.g., unambiguously assigned to) a corresponding resistance-characteristic curve (branch 2 in the case of the branch 1 transition curve or branch 4 in the case of the branch 3 transition curve) (as understood up to the highest memristive state). This resistance-characteristic curve may be characteristic for a corresponding memristive state (hence characteristic for the resistance corresponding to the memristive state). A resistance-characteristic curve may be understood as a respective characteristic LRS curve for each memristive state. FIG. 3A schematically shows a first resistance-characteristic curve 304 (e.g., a first LRS curve) corresponding to a first memristive state, a second resistance-characteristic curve 306 (e.g., a second LRS curve) corresponding to a second memristive state different from the first memristive state, and a third resistance-characteristic curve 308 (e.g., a third LRS curve) corresponding to a third memristive state different from both, the first memristive state and the second memristive state. FIG. 3B shows the common transition curve 302 (HRS curve) and a corresponding (individual) resistance-characteristic curve (hence, a respective LRS curve) for five different memristive states set via a respective programming voltage (6 V, 6.5 V, 7 V, 7.5 V, and 8 V).

Thus, depending on the memristive state the memristive structure resides in, the IV-characteristic may follow the transition curve 302 (in the case of changing the memristive state) or may follow the resistance-characteristic curve corresponding to a current memristive state (in the case of keeping (i.e., not changing) the memristive state). Hence, a measured IV-characteristic may depend on a current memristive state of the memristive structure 100. To program a memristive state and/or to determine the current memristive state of the memristive structure 100, a (e.g., measurement) signal may be applied to the memristive structure 100. For example, the measurement signal may be a measurement pulse (e.g., a voltage pulse or a current pulse).

As detailed above, herein the measurement source/input signal (short measurement signal) is described as voltage pulse for illustration and the measurement output signal is described as corresponding current pulse for illustration. Exemplary courses and shapes of one or more voltage pulses are shown in FIG. 4A to FIG. 4E. For simplicity, the voltage pulses are shown rising from and falling to 0 V as base voltage. It is understood that the base voltage may have any suitable voltage value. According to some aspects, the voltage may be applied to one of the first electrode 110 or the second electrode 120 and that the base voltage may be applied to the other one of the first electrode 110 or the second electrode 120. According to other aspects, a respective voltage (different from the base voltage) may be applied the first electrode 110 and to the second electrode 120. In this case, the voltage values of herein described voltages (e.g., the maximum positive read voltage value, $+V_{read,max}$, the maximum negative read voltage value, $+V_{read,max}$, etc.) may be voltage drops over the memristive structure 100 (hence a voltage difference between the voltage applied at the first electrode 110 and the voltage applied at the second electrode 120).

As shown, a voltage pulse may have a linear triangular course (see, for example, FIG. 4A and FIG. 4B), a stepwise triangular course (see, for example, FIG. 4C), a sinusoidal course (see, for example, FIG. 4D), or an exponentially falling/rising course (see, for example, FIG. 4E), as examples. It is understood that any other course and/or shape may be used. Even though these voltage pulses are described as read signals, it is understood that a write signal may have a similar course and/or shape. A voltage pulse may be characterized by a rising edge from the base voltage (e.g., 0 V) to a maximum read voltage value and a falling edge from the maximum read voltage value to the base voltage (e.g., 0 V). For example, a first voltage pulse may be characterized by a rising edge 402 from the base voltage (e.g., 0 V) to a maximum positive read voltage value, $+V_{read,max}$, and a falling edge 404 from the maximum positive read voltage value, $+V_{read,max}$, to the base voltage (e.g., 0 V). A second voltage pulse may be characterized by a rising edge 406 from the base voltage (e.g., 0 V) to a maximum negative read voltage value, $-V_{read,max}$, and a falling edge 408 from the maximum negative read voltage value, $-V_{read,max}$, to the base voltage (e.g., 0 V). A rising edge may be associated with (e.g., continuously) increasing (e.g., ramping) a voltage up to up to the maximum (positive or negative) voltage value (different from zero volts). According to various aspects, only one voltage pulse (e.g., the first voltage pulse or the second voltage pulse) may be applied. According to other aspects, the first voltage pulse and the second voltage pulse may be (in any order) applied subsequent to each other. In this case, the first voltage pulse and the second voltage pulse may be (in any order) applied directly subsequent to each other or there may be a time delay between them.

As described herein, a measured IV-characteristic (e.g., branch 2 and/or branch 4) depend on a current (i.e., an actual or present) memristive state of the memristive structure 100. This memristive state of the memristive structure 100 may depend on a prior applied measurement signal (in the present example a prior applied voltage signal). The memristive state may be set by applying a programming voltage pulse. For simplicity, in the following, the maximum voltage (in some aspects referred to as programming voltage) of the programming voltage pulse is considered as defining the memristive state the memristive structure 100 is set into. However, it is noted that the memristive state into which the memristive structure 100 is set by applying the programming voltage pulse may also depend on other aspects, such as the shape and/or course of the programming voltage pulse.

Figure 5A:
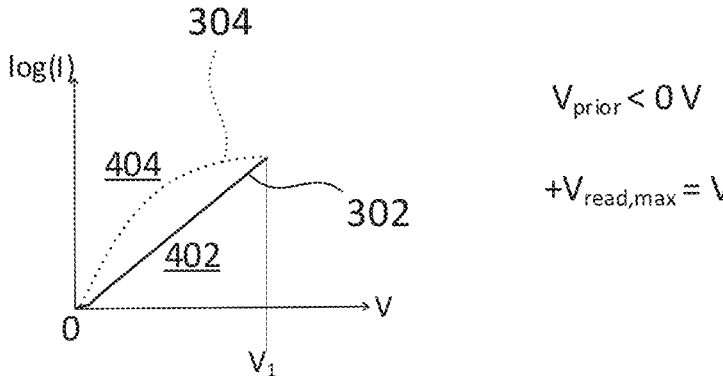
FIGS. 5A to 5E schematically show an IV-characteristic of a memristive structure depending on a prior applied voltage value.
Figure 5B:
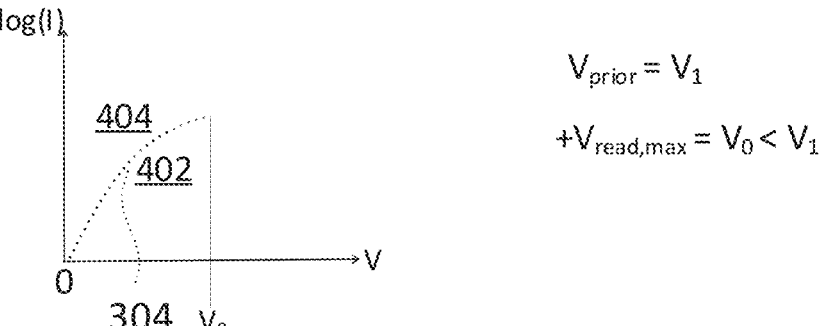
Figure 5C:
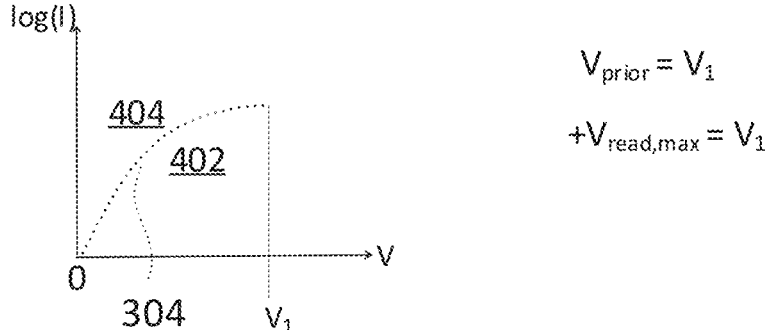
Figure 5D:
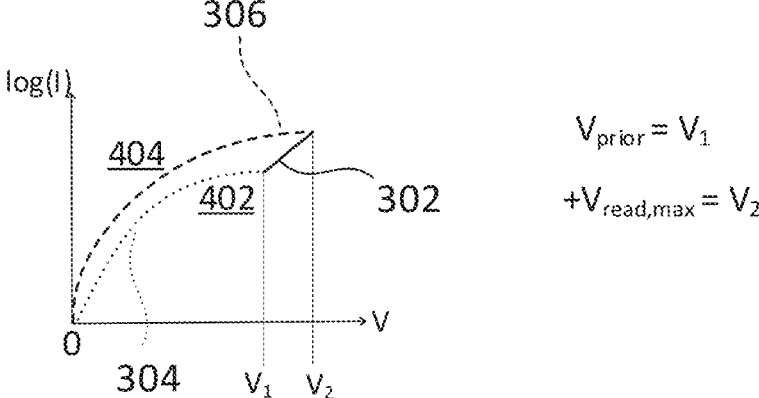
Figure 5E:
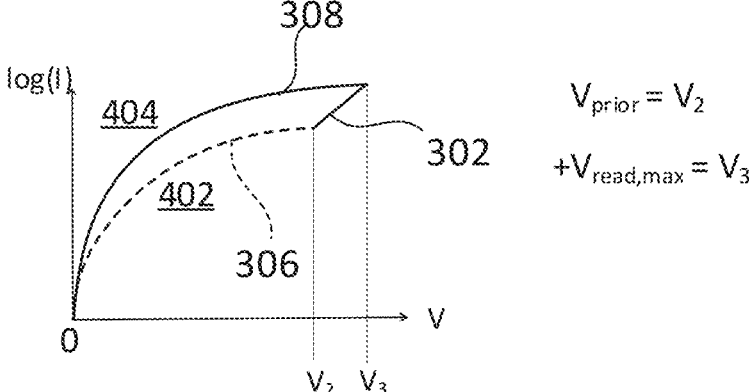

Hence, the current/voltage (I/V) characteristic of the memristive structure 100 can depend on a prior applied voltage value, $V_{prior}$, associated with a prior applied voltage. FIG. 5A to FIG. 5E schematically show a respective IV-characteristic depending on the prior applied voltage value, $V_{prior}$, for the memristive structure 100 having the IV-characteristic shown in FIG. 3A. In the case that a prior voltage has a negative voltage value (i.e., $V_{prior}<0$), the memristive structure 100 resides either in a (negative) memristive state associated with the third quadrant (i.e., a negative voltage value and a negative current value) since the negative voltage would either write a (negative) memristive state associated with the third quadrant (e.g., in the case that the memristive structure 100 is in a memristive state associated with the first quadrant or in a memristive state associated with a negative voltage value having an absolute value less than the voltage value of the applied negative voltage) or would keep the (negative) memristive state in the case that the memristive structure 100 is in a (negative) memristive state associated with a negative voltage value having an absolute value greater than the voltage value of the applied negative voltage. When applying a first read voltage pulse (e.g., having a shape and/or course as shown in FIG. 4A, FIG. 4C, FIG. 4D, or FIG. 4E) with a first voltage value, $V_1$, as maximum positive read voltage value, $+V_{read,max}$, the rising edge 402 of the first read voltage pulse (continuously) changes the memristive state, $m_s$, (over the memristive states starting from $m_s=1$) until setting the memristive structure 100 into the memristive state $m_s=m_s$ ($V_1$) associated with the first voltage value, $V_1$ (see FIG. 5A). Hence, the IV-characteristic follows the transition curve 302 during the rising edge 402 of the first read voltage pulse. The falling edge 404 of the first read voltage pulse keeps (i.e., does not change) the set (e.g., written) memristive state $m_s=m_s(V_1)$ since the voltage value is reduced (and not further increased). Hence, the IV-characteristic follows the first resistance-characteristic curve 304 associated with the first voltage value, $V_1$, during the falling edge 404 of the first read voltage pulse. When applying a (subsequent) second read voltage pulse (having the same polarity as the first read voltage pulse) with another voltage value, $V_0$, (being less than the first voltage value, $V_1$,) as maximum positive read voltage value, $+V_{read,max}$, the rising edge 402 of the second read voltage pulse keeps (i.e., does not change)

the memristive state $m_s = m_s(V_1)$ (see FIG. 5B). Therefore, the rising edge 402 of the second read voltage pulse follows the first resistance-characteristic curve 304 associated with the first voltage value, $V_1$. When applying a third read voltage pulse (having the same polarity as the first read voltage pulse) with the first voltage value, $V_1$, as maximum positive read voltage value, $+V_{read,max}$, the rising edge 402 of the third read voltage pulse keeps (i.e., does not change) the memristive state $m_s = m_s(V_1)$ up to the first voltage value, $V_1$ (see FIG. 5C). Therefore, the rising edge 402 of the third read voltage pulse follows the first resistance-characteristic curve 304 associated with the first voltage value, $V_1$, up to the first voltage value, $V_1$. When applying a fourth read voltage pulse (having the same polarity as the first read voltage pulse) with a second voltage value, $V_2$, (being greater than the first voltage value, $V_1$,) as maximum positive read voltage value, $+V_{read,max}$, the rising edge 402 of the second read voltage pulse keeps (i.e., does not change) the memristive state $m_s = m_s(V_1)$ up to the first voltage value, $V_1$ (see FIG. 5D). Therefore, the rising edge 402 of the second read voltage pulse follows the first resistance-characteristic curve 304 associated with the first voltage value, $V_1$, up to the first voltage value, $V_1$. Once the voltage value of the rising edge 402 surpasses (hence, is greater than) the first voltage value, $V_1$, the memristive state $m_s$ of the memristive structure 100 is (continuously) changed (starting from the memristive state $m_s = m_s(V_1)$ to the memristive state $m_s = m_s(V_2)$. Hence, from the first voltage value, $V_1$, to the second voltage value, $V_2$, the rising edge 402 of the fourth read voltage pulse follows the transition curve 302. The falling edge 404 of the fourth read voltage pulse keeps (i.e., does not change) the set (e.g., written) memristive state $m_s = m_s(V_2)$ since the voltage value is reduced. Hence, the IV-characteristic follows the second resistance-characteristic curve 306 associated with the second voltage value, $V_2$, during the falling edge 404 of the fourth read voltage pulse. This applies similar to applying any read voltage pulse having a greater voltage value (up to the highest voltage value) than a prior applied read voltage pulse. Hence, when applying a (subsequent) fifth read voltage pulse (having the same polarity as the second read voltage pulse) with a third voltage value, $V_3$, (being greater than the second voltage value, $V_2$,) as maximum positive read voltage value, $+V_{read,max}$, the IV-characteristic of the memristive structure 100 follows the second resistance-characteristic curve 306 associated with the second voltage value, $V_2$, up to the second voltage value, $V_2$ during the rising edge 402 of the fifth read voltage pulse and follows the transition curve 302 from the second voltage value, $V_2$, to the third voltage value, $V_3$. The falling edge 404 of the fifth read voltage pulse keeps the set memristive state $m_s = m_s(V_3)$ and the IV-characteristic, therefore, follows the third resistance-characteristic curve 308 associated with the third voltage value, $V_3$.

Figure 6:
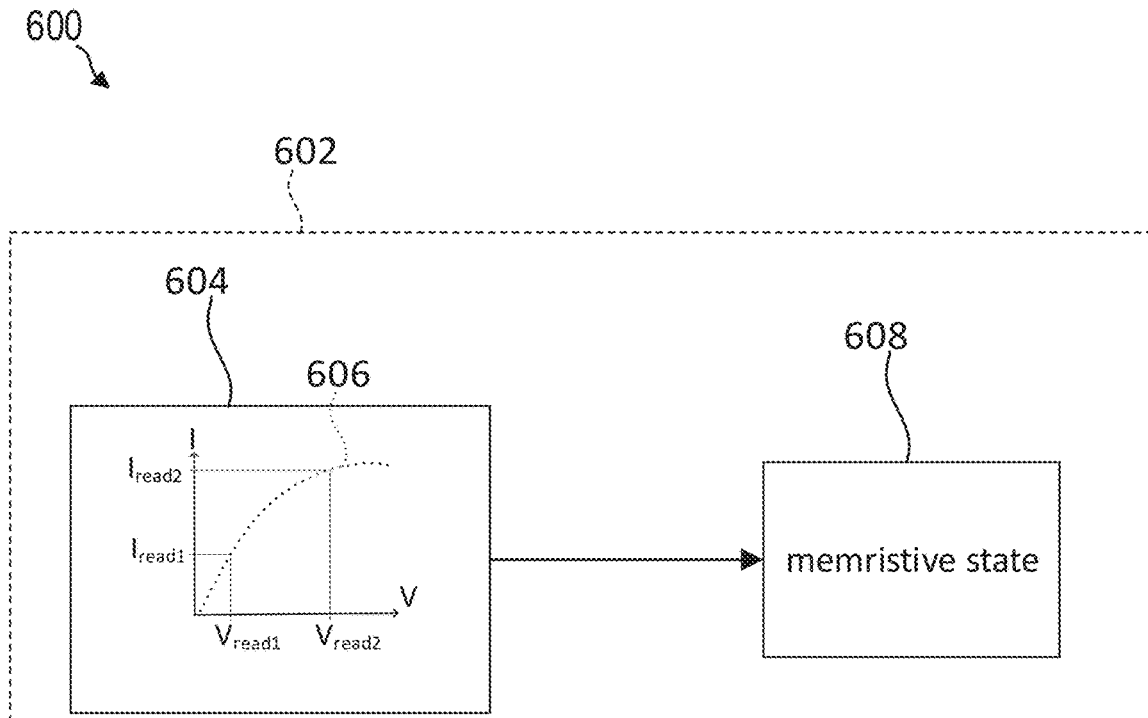
FIG. 6 and FIG. 7 each shows a respective reading scheme for reading a memristive state of a memristive structure.
Figure 7:
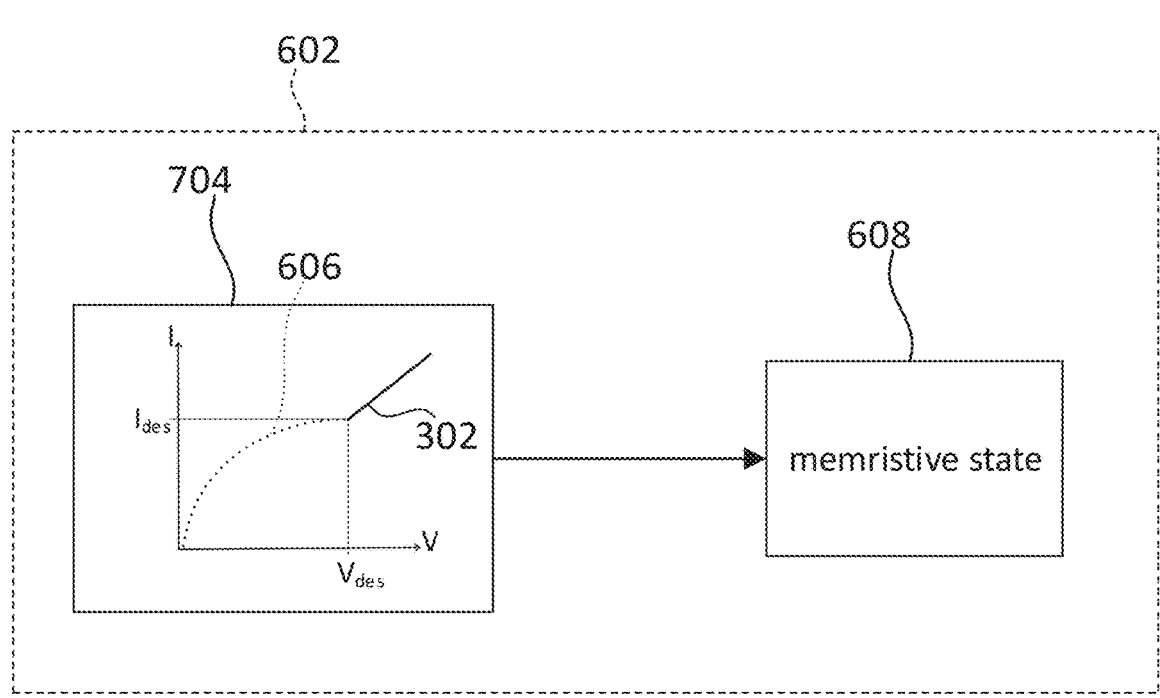

According to various aspects, a memristive state of the memristive structure 100 may be read either non-destructively (while keeping the memristive state, see, for example, FIG. 6) or destructively (which includes changing the memristive state, see, for example, FIG. 7).

In the case of a non-destructive read, the memristive structure 100 may reside in a memristive state, $m_s(+V_{program})$, associated with a positive programming voltage value, $+V_{program}$, equal to or greater than the maximum read voltage value, $+V_{read,max}$, of the read voltage pulse. In this case, as described herein (e.g., regarding FIG. 5A to FIG. 5E), the rising edge 402 of the read voltage pulse causes a current through the memristive structure 100 according to the resistance-characteristic curve corresponding to the memristive state, $m_s(+V_{program})$. Hence, applying the read voltage pulse may keep the memristive state, $m_s(+V_{program})$, associated with the positive programming voltage. This allows, for example, to read the memristive state, $m_s(+V_{program})$, of the memristive structure 100 multiple times as long as the respective maximum read voltage value, $+V_{read,max}$, of each read voltage pulse is equal to or lower than the positive programming voltage value, $+V_{program}$ (and of course within the same quadrant, i.e., having the same polarity). When ramping the read voltage in a range between the base voltage (e.g., 0 V) and the maximum read voltage value, $+V_{read,max}$, less than the programming voltage value, $+V_{program}$, also the falling edge 404 of the read voltage pulse causes a current according to the resistance-characteristic curve corresponding to the memristive state, $m_s(+V_{program})$, (since the memristive state is not changed by the maximum read voltage value, $+V_{read,max}$). It is understood that, in this example, no negative voltages may be applied since, as described herein, a negative voltage would write a memristive state in the third quadrant of the I/V characteristic.

In the case of a destructive read, the memristive structure 100 may reside in a memristive state, $m_s(+V_{program})$, associated with a positive programming voltage value, $+V_{program}$, less than the maximum read voltage value $+V_{read,max}$, of the read voltage pulse. In this case, as described herein (e.g., regarding FIG. 5A to FIG. 5E), the rising edge 402 of the read voltage pulse causes, once the voltage value surpasses the positive programming voltage value, $+V_{program}$, a current through the memristive structure 100 according to the transition curve (e.g., transition curve 302). Hence, applying the read voltage pulse may change the memristive state from the memristive state, $m_s(+V_{program})$, associated with the positive programming voltage to the memristive state, $m_s(+V_{read,max})$, associated with the maximum read voltage value, $+V_{read,max}$.

FIG. 6 shows a reading scheme 600 for (e.g., non-destructively or destructively) reading a memristive state 608 of the memristive structure 100 according to various aspects. A read circuit 602 (in some aspects referred to as read-out circuit) may be configured to read (out) the memristive state 608 of a respective memristive structure (e.g., a memristive structure of a plurality of memristive structures in a crossbar array). The read circuit 602 may be configured to apply a read signal (e.g., a read voltage pulse or a read current pulse, as described herein) to the memristive structure 100.

As described, the memristive state 608 may be read non-destructively (e.g., the memristive structure 100 may reside in a memristive state, $m_s(+V_{program})$, associated with a positive programming voltage value, $+V_{program}$, equal to or greater than the maximum read voltage value, $+V_{read,max}$, of the read voltage pulse.

According to various aspects, the read circuit 602 may (in 604) be configured to measure a respective read current value at at least two (e.g., exactly two, three, or more than three) different voltage values. In the following, the read out is described exemplarily for exactly two different voltage values; however, it is noted that any number of different voltage values may be used. The read circuit 602 may be configured to measure the respective current value at the (at least) two different voltage values within the same read voltage pulse and/or within two separate (e.g., subsequent) read voltage pulses. According to an example, the read circuit 602 may be configured to measure a first read current value, $I_{read1}$, at a first read voltage value, $V_{read1}$, and a second read current value, $I_{read2}$, at a second read voltage value, $V_{read2}$, during applying a single read voltage pulse.

According to another example, the read circuit 602 may be configured to measure the first read current value, $I_{read1}$, at the first read voltage value, $V_{read1}$, during applying a first read voltage pulse and to measure the second read current value, $I_{read2}$, at the second read voltage value, $V_{read2}$, during applying a second read voltage pulse. The first read voltage value, $V_{read1}$, may be any voltage value between the base voltage (e.g., 0 V) and the maximum read voltage, $V_{read,max}$, of the first read voltage pulse and the second read voltage value, $V_{read2}$, may be any voltage value between the base voltage (e.g., 0 V) and the maximum read voltage, $V_{read,max}$, of the second read voltage pulse as long as the second read voltage value, $V_{read2}$, is different from the first read voltage value, $V_{read1}$. The maximum read voltage, $V_{read,max}$, of the first read voltage pulse and the maximum read voltage, $V_{read,max}$, of the second read voltage pulse may have the same or different voltage values. The application of a read voltage pulse and the determination (e.g., measurement) of a respective read current value (e.g., by measuring a voltage responsive to integrating a current) at two or more (e.g., different) read voltage values may be referred to as a read-out operation. Hence, the read circuit 602 may be configured to determine (e.g., measure) the first read current value, $I_{read1}$, via a first measurement and the second read current value, $I_{read2}$, via a second measurement during a single read-out operation. As described herein, a current value may be determined by directly measuring a current value or by measuring a voltage value representing the current value. For example, one or more integrators may integrate the current (over time) and output a voltage value representing the integrated current. The current value may then be determined using the voltage value representing the integrated current. According to other aspects, as an alternative to using the IV-characteristics described herein, a functional correlation between the voltage representing the integrated current and the read voltage may be used.

In the case that the read voltage of the read voltage pulse is in the range between the base voltage (e.g., 0 V) and the programming voltage value, $+V_{program}$, both, the rising edge 402 and the falling edge 404 of the read voltage pulse cause a current according to the resistance-characteristic curve 606 corresponding to the memristive state, $m_s(+V_{program})$, (since the memristive state is not changed). Hence, the first read current value, $I_{read1}$, and/or the second read current value, $I_{read2}$, may be measured on the rising edge 402 and/or the falling edge 404 of the read voltage pulse. According to an example, both, the first read current value, $I_{read1}$, and the second read current value, $I_{read2}$, may be measured during the rising edge 402 or the falling edge 404 of the read voltage pulse. According to another example, the first read current value, $I_{read1}$, may be measured during the rising edge 402 of the read voltage pulse and the second read current value, $I_{read2}$, may be measured during the falling edge 404 of the read voltage pulse, or vice versa.

In the case of a destructive read, both, the first read current value, $I_{read1}$, and the second read current value, $I_{read2}$, may be measured during the rising edge 402 of the read voltage pulse (since, during the falling edge 404, the IV-characteristic may follow the resistance-characteristic curve of the newly set memristive state, $m_s(+V_{read,max})$).

As described herein, the resistance-characteristic curve may be characteristic for a respective memristive state, thereby allowing to determine the memristive state based on information regarding (e.g., by knowing) the resistance-characteristic curve (such as the first current value and the second current value). The read circuit 602 may be configured to determine the memristive state 608 using the first read current value, $I_{read1}$, and the second read current value, $I_{read2}$.

According to various aspects, the reading scheme may include a programming circuit (e.g., a write circuit) configured to set (e.g., write) the memristive structure 100 into a memristive state (e.g., by applying the programming voltage).

FIG. 7 shows a reading scheme 700 for destructively reading the memristive state 608 of the memristive structure 100 (i.e., by changing the memristive state) according to various aspects. According to some aspects, the first read current value, $I_{read1}$, and the second read current value, $I_{read2}$, may be measured during the rising edge 402 of the read voltage pulse at the first voltage value, $V_{read1}$, and the second voltage value, $V_{read2}$, less than a destruction voltage, $V_{des}$. The destruction voltage, $V_{des}$, may substantially correspond to the programing voltage, $+V_{program}$. Hence, voltage values higher than the destruction voltage, $V_{des}$, may change the memristive state of the memristive structure 100. Thus, the first read current value, $I_{read1}$, and the second read current value, $I_{read2}$, may be measured during the rising edge 402 of the read voltage pulse at the resistance-characteristic curve 606 associated with the memristive state, $m_s(+V_{program})$ priorly set by applying the programming voltage, $+V_{program}$. Additionally or alternatively, the read circuit 602 may be (e.g., in 704) configured to determine the destruction voltage, $V_{des}$ (and optionally also the destruction current, $I_{des}$, corresponding to the destruction voltage, $V_{des}$). For example, the read circuit 062 may (e.g., continuously) measure the current through the memristive structure 100 as a function of the applied voltage and may determine the change of the slope of the measured current curve (e.g., from the resistance characteristic curve 606 to the (e.g., linear) transition curve 302). Since the destruction voltage, $V_{des}$, may substantially correspond to the programing voltage, $+V_{program}$, the read circuit 602 may be configured to determine the memristive state as $m_s(+V_{des})$.

In the case of a non-destructive read, the programming voltage values (which may be used to set a respective memristive state) may be within a predefined programming voltage range. Hence, in order to non-destructively read the memristive state 608, the maximum read voltage, $V_{read,max}$, has to be equal to or lower than a lower boundary of the predefined programming voltage range. This may limit both, the predefined programming voltage range and the range for the maximum read voltage, $V_{read,max}$. Hence, a limited predefined programming voltage range may also limit the number of possible memristive states the memristive structure 100 can be set into. On the other hand, the non-destructive read allows to read the memristive structure 100 multiple times and/or within different parts of the read voltage pulse (e.g., during the rising edge 402 and the falling edge 404) and/or within different read voltage pulses. Even though a destructive read only allows to read the memristive state at the rising edge 402 of the read voltage pulse, the destructive read does not limit the maximum read voltage value, $V_{read,max}$, to be lower than the lower boundary of the predefined programming voltage range. This allows to use an increased range for the programming voltage, thereby increasing the number of possible memristive states.

Figure 8A:
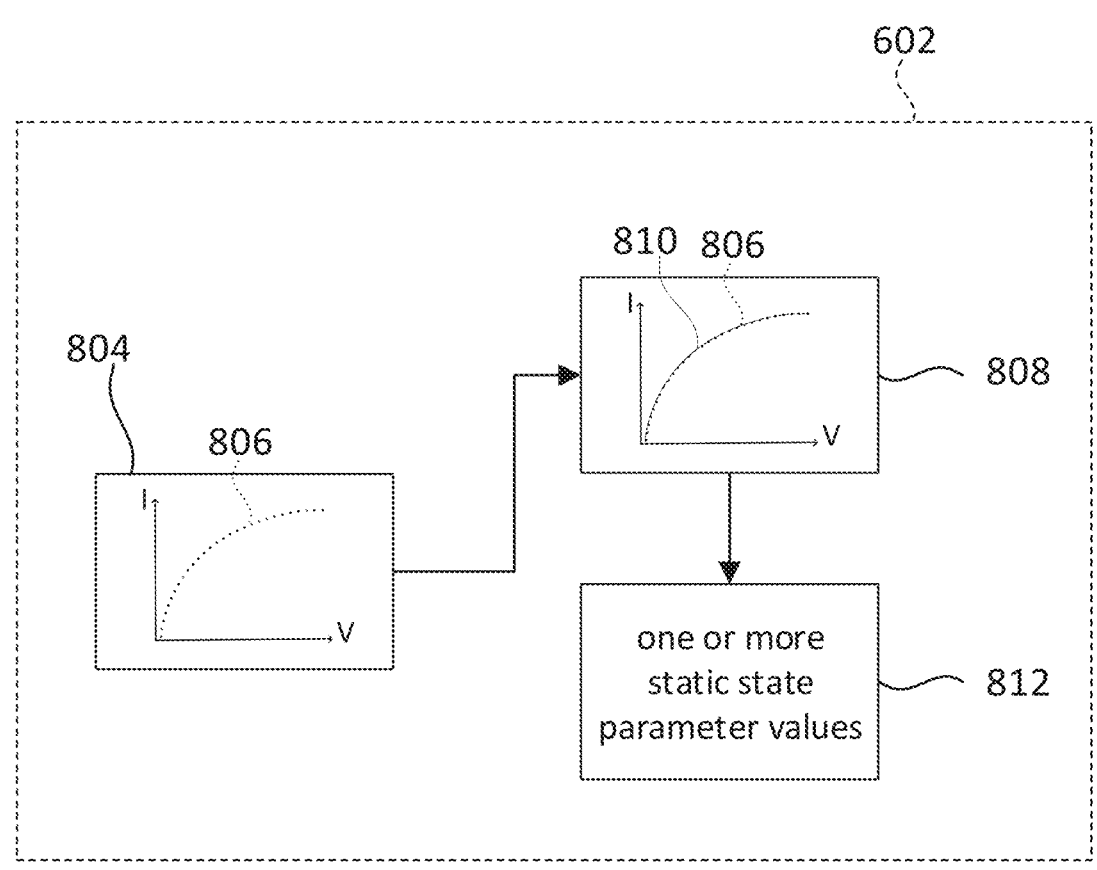

FIG. 8A shows a reading scheme 800 for (e.g., non-destructively or destructively) reading the memristive state 608 of the memristive structure 100 according to various aspects. The read circuit 602 may be configured to determine (e.g., measure) a current/voltage (IV) characteristic of the memristive element 100. For example, the read circuit 602 may be configured to measure (in 804) at least a part (e.g., within a predefined voltage range) of the resistance-characteristic curve (current-voltage) 806 corresponding to the memristive state, m<sub>s</sub>($+V_{program}$), the memristive structure 100 resides in. The read circuit 602 may be configured to measure the (e.g., part of the) resistance-characteristic curve 806 by measuring a respective current value at a plurality of voltage values (e.g., at predefined voltage steps or in predefined time steps). For example, the read circuit 602 may be configured to apply a read voltage sequence to the memristive structure 100 to cause a corresponding current sequence through the memristive structure 100 and to measure (e.g., in predefined time steps or predefined voltage steps) current values of the caused corresponding current sequence.

According to various aspects, the read circuit 602 may be configured to fit (in 808) the (e.g., measured) resistance-characteristic curve 806 (e.g., to determine a fitting curve 810). The read circuit 602 may be configured to fit the resistance-characteristic curve 806 by a physical model. The physical model may be based on one or more static state parameters. The read circuit 602 may be configured to determine a respective static state parameter value for at least one (e.g., each) of the one or more static state parameters. Hence, the read circuit 602 may be configured to determine one or more static state parameter values 812. Even though the fitting of the resistance-characteristic curve 806 and the determination of the one or more static state parameter values is described herein as being carried out by the read circuit 602, it is understood that any other kind of processor may be used to carry these processes.

A "static state parameter", as used herein, may describe (e.g., physical, electrical, chemical, etc.) properties (or other manufacturing-related properties) of a memristive structure. Thus, the static state parameter(s) may be correlated to (memristor) properties of the memristive structure. A "static state parameter value", as used herein, may a value of such a static state parameter. The static state parameter value may be indicative of (e.g., unambiguously assigned to) the memristive state, m<sub>s</sub>, the memristive structure resides in. Hence, the static state parameter(s) may characterize the memristive states of the memristive structure and a value of the static state parameter(s) (i.e., the static state parameter value(s)) may be "static" for a respective memristive state.

According to various aspects, the physical model (e.g., used for fitting the resistance-characteristic curve 806) may be given by:

$$V = A\frac{k_B T}{q}\log\left(\frac{I}{B}+1\right)\left(1+C\frac{k_B T}{q}\log\left(\frac{I}{B}+1\right)\right)+I\cdot D,$$

wherein: V may be the applied read voltage, I may be the current through the memristive structure responsive to applying the read voltage, $k_B$ may be the Boltzmann constant, T may be the temperature of the memristive structure, q may be the electron charge, and A, B, C, and D each may be a respective static state parameter. Hence, in this example, the physical model may include four static state parameters. It is understood that the static state parameters do not change when a respective resistance-characteristic curve of branch 2 and/or branch 4 is measured.

The static state parameter A may represent an ideality of the memristive structure 100. For example, an ideality factor, n, may be given by n=A($1+C*V_{ideal}$). The ideal voltage, $V_{ideal}$, may be given by:

$$\frac{k_B T}{q}\log\left(\frac{I}{I_S}+1\right).$$

According to an example, the static state parameter B may represent a reverse saturation current, $I_S$, through the memristive structure 100 responsive to applying the read voltage. The reverse saturation current, $I_S$, may be substantially proportional to $$e^{\frac{-\Phi_B}{k_B T}}.$$

Figure 8B:
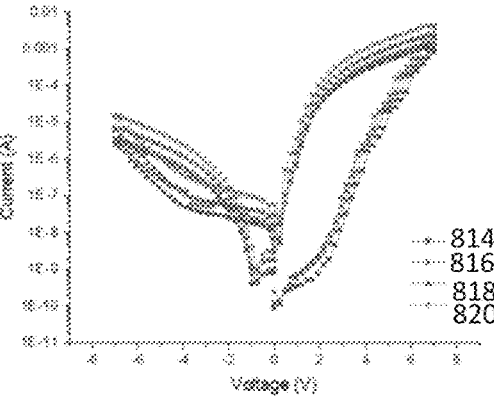
FIGS. 8B and 8C show measured characteristics and correspondingly determined values of four exemplary static state parameters.

The static state parameter D may represent a series resistance, $R_S$, of the memristive structure 100. The series resistance, $R_S$, may be given by:

$$R_S = R_{max} - (R_{max} - R_{min})*\frac{2}{\pi*\arctan\left(10*\frac{1}{I_{max}}\right)},$$

wherein $R_{max}$ is a maximum resistance and $R_{min}$ a minimum resistance of the memristive structure 100, and wherein $I_{max}$ is a maximum current through the memristive structure 100. FIG. 8B shows measured IV-characteristics for four different memristive structures 814, 816, 818, 820 and respectively determined static state parameters using the above physical model (with A=n<sub>0</sub>, B=I<sub>S</sub>, C=K, and D=R<sub>S</sub>).

Figure 8C:
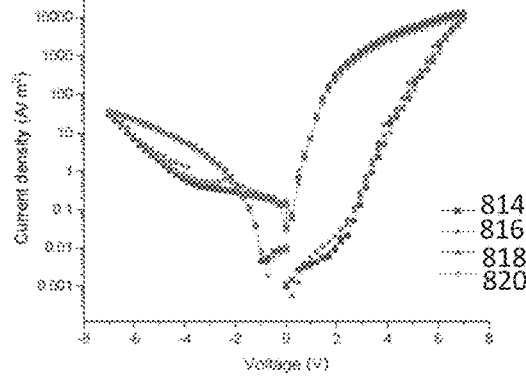

According to another example, the static state parameter B may represent a ratio $$\left(\frac{I_S}{A}\right)$$

between the reverse saturation current, $I_S$, and an area, $A_{mem}$, of the memristive structure 100. The static state parameter D may represent a product ($R_S*A_{mem}$) of the reverse saturation current, $I_S$, and the area, $A_{mem}$, of the memristive structure 100. In this example, the physical model may model the current density as a function of the voltage. FIG. 8C shows current density-voltage-characteristics for the four different memristive structures 814, 816, 818, 820 of FIG. 8B and respectively determined static state parameters using the above physical model (with A=n<sub>0</sub>, $$B = \frac{I_S}{A},$$

C=K, and D=R<sub>S</sub>*A<sub>mem</sub>).

Figure 8D:
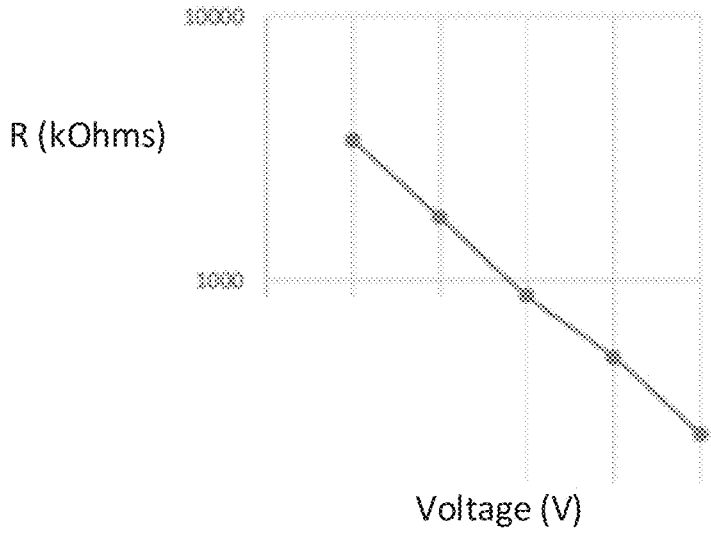
FIG. 8D shows determined static state parameters as a function of the memristive state of a memristive structure.
Figure 8D:
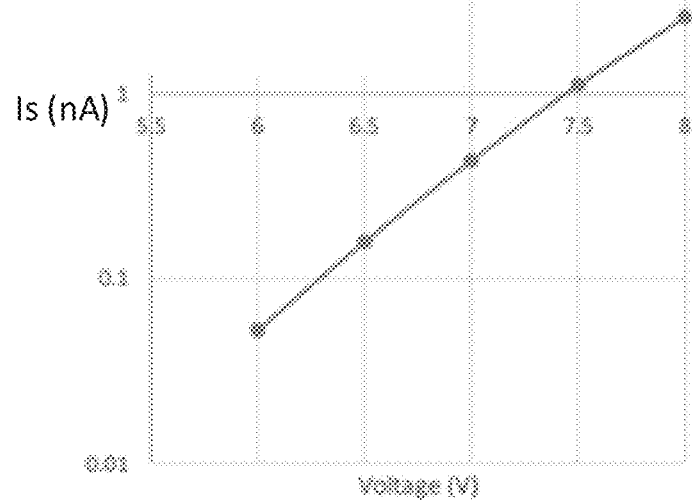

As described above, FIG. 3B shows a corresponding (individual) resistance-characteristic curve for five different memristive states set via a respective programming voltage (6 V, 6.5 V, 7 V, 7.5 V, and 8 V). FIG. 8D shows the static state parameter D being the series resistance, $R_S$, and the static state parameter B being the reverse saturation current, $I_S$, respectively determined for each of these five different memristive states using the above physical model. As illustratively shown, the static state parameters have a substantially linear behavior and characterize physical properties of the memristive structure.

In the following, with reference to FIG. 9 to FIG. 14, various processing schemes are described which employ the determined one or more static state parameter values 812. At least a part of the processing may be carried out by at least one processor 902.

The term "processor", as used herein, may be understood as any kind of entity capable to process data and/or signals. For example, the data or signals may be handled according to at least one (i.e., one or more than one) specific function performed by the processor. A processor may include or may be an analog circuit, a digital circuit, a mixed signal circuit, a logic circuit, a microprocessor, a central processing unit (CPU), a graphics processing unit (GPU), a digital signal processor (DSP), a programmable gate array (FPGA), an integrated circuit, or any combination thereof. Any other method of implementing the respective functions, described herein, may also be understood to include a processor or logic circuit. It is understood that one or more of the method steps described in detail herein may be carried out (e.g., implemented) by a processor, through one or more specific functions performed by the processor. The processor may therefore be arranged to carry out any of the information processing methods or components thereof described herein.

Figure 9:
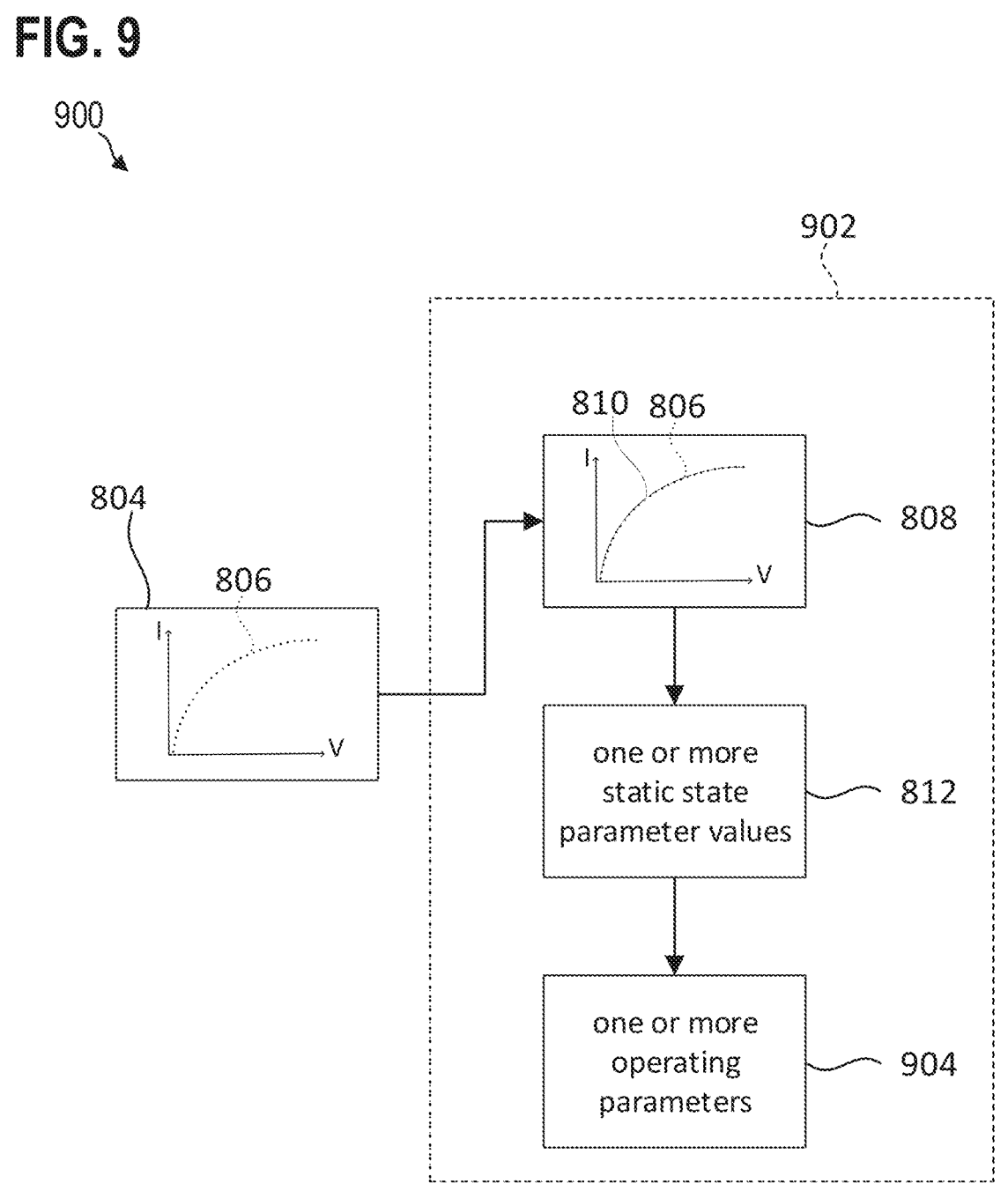

According to the processing scheme 900 shown in FIG. 9, the at least one processor 902 may be configured to select (e.g., initially select or adapt), using the one or more static state parameter values 812, one or more operating parameters 904 associated with an operation of the memristive structure 110 (e.g., as a function of the determined static state parameter values). For example, the processing scheme 900 may include an analysis of one or more memristive structures (e.g., a plurality of memristive structures of a device). This analysis may include the determination of the one or more static state parameter values 812. Sine these one or more static state parameter values 812 represent respective (e.g., physical and/or electrical) properties of the one or more memristive structures, this allows to select corresponding operating parameters 904 at which the one or more memristive structures may be operated. Such operating parameters 904 may be, for example, a read voltage, a programming (e.g., write) voltage, a read current, a programming (e.g., write) current, and/or an operating temperature. As shown above, the physical model may depend on the temperature of the memristive structure. Knowing the respective values of the static state parameter(s) allows, for example, to determine a current-voltage characteristic at another temperature value. For example, this allows to simulate the behavior of the memristive structure at another (e.g., non-measured) temperature (see, for example, description with reference to FIG. 10). According to some aspects, the static state parameter values 812 may be determined during use of the device which includes the one or more memristive structures. In this case, the operating parameters 904 used for operating the one or more memristive structures may be adapted based on the one or more static state parameter values 812. For example, some (e.g., physical, electrical, chemical, etc.) properties of the memristive structure may change over time. Using the physical model to determine the one or more static state parameters 812 may allow to determine such a change and, therefore, allows to adapt the operating parameters 904 to the changed properties. This may increase the lifetime, accuracy, reliability, etc. of the device.

Figure 10:
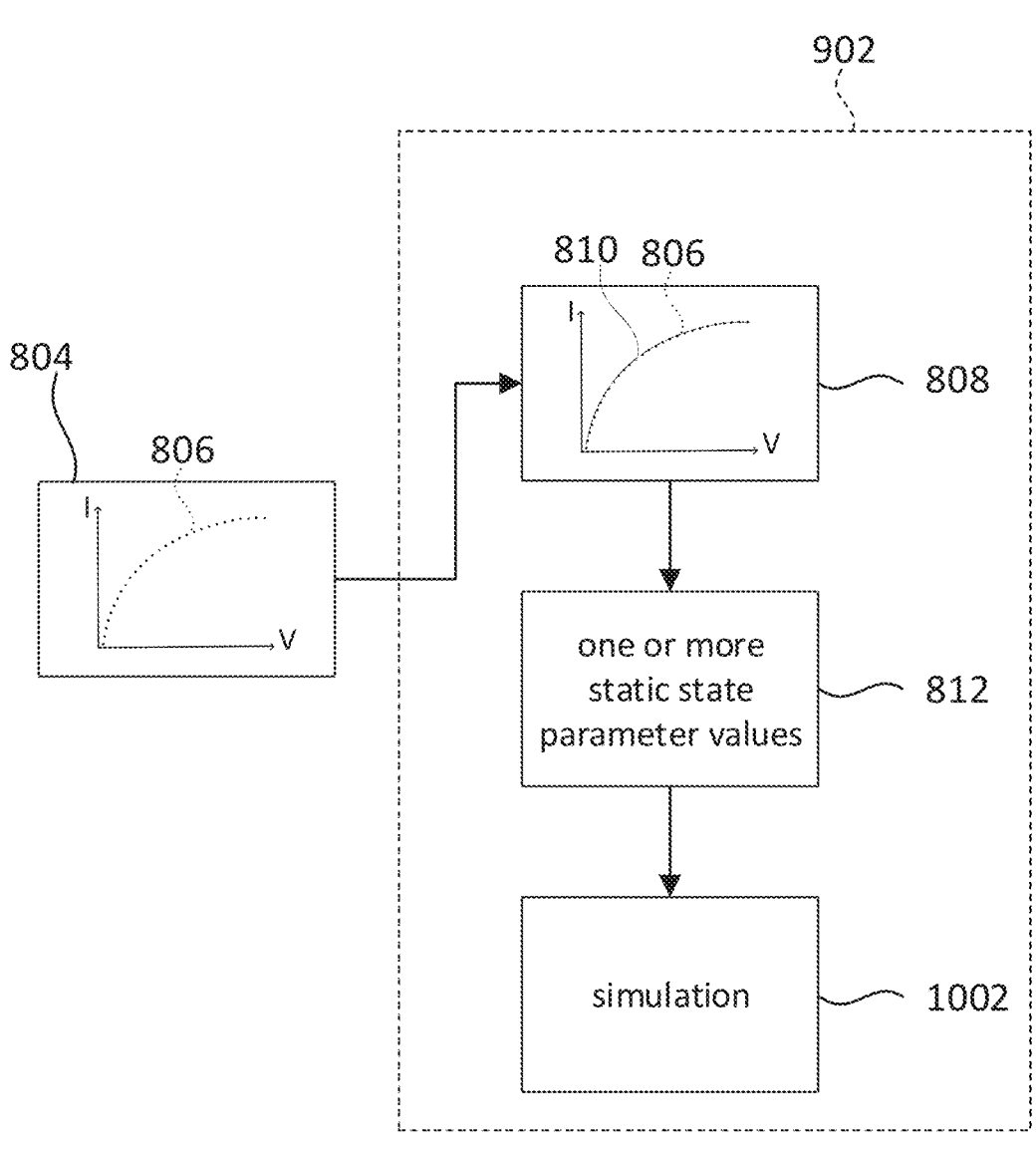

According to the processing scheme 1000 shown in FIG. 10, the at least one processor 902 may be configured to carry out a simulation 1002 using the one or more static state parameter values 812. The simulation 1002 may be a simulation of the behavior of a memristive circuit including one or more memristive structures. These one or more memristive structures may be configured in accordance with the memristive structure 100 for which the one or more static state parameter values 812 are determined. This kind of simulation may be referred to as electronic circuit simulation. Hence, the static state parameter values 812 may be measured for a manufactured memristive structure and then the behavior of a memristive circuit, which includes one or more (e.g., a plurality of) such memristive structures, is simulated (in 1002). For example, the simulation 1002 may include varying one or more simulation parameters associated with an operation of the memristive circuit. These simulation parameters may, for example, include a temperature of the memristive circuit (or optionally a respective temperature for each memristive structure of the memristive circuit), a programming (e.g., write) voltage for setting a memristive state, a programming (e.g., write) current for setting a memristive state, a read voltage for reading the memristive state of the memristive structure, a read current for reading the memristive state of the memristive structure, a desired current through the memristive structure responsive to applying a corresponding read voltage (pulse), and/or a desired voltage drop over the memristive structure responsive to applying a corresponding read current (pulse). As an example, the one or more static state parameter values 812 of the manufactured memristive structure may be measured at a first temperature value and the simulation 1002 may simulate the behavior of the memristive circuit at a second temperature value different from the first temperature value (e.g., using the herein described physical model). According to various aspects, each static state parameter value of the one or more static state parameter values 812 may be associated with a respective error. Here, the simulation 1002 of the behavior of the memristive circuit may be carried out in consideration of the respective error (e.g., as noise) of the determined static state parameter values 812. According to various aspects, the determined one or more static state parameter values 812 may be verified by measuring the corresponding (physical) parameter underlying the respective static state parameter. For example, a respective state parameter value of the one or more static state parameter values 812 may be verified in the case that a difference between the measured value of the parameter and the determined static state parameter value is less than a predefined verification value. According to various aspects, the at least one processor 902 may be configured to determine a respective functional correlation between the one or more static state parameter values 812 and the memristive states, $m_s$ (e.g., as shown in FIG. 8D). The simulation 1002 may include extrapolating this functional correlation. This allow, for example, to simulate a respective resistance-characteristic curve for each (e.g., non-measured) memristive state.

Figure 11:
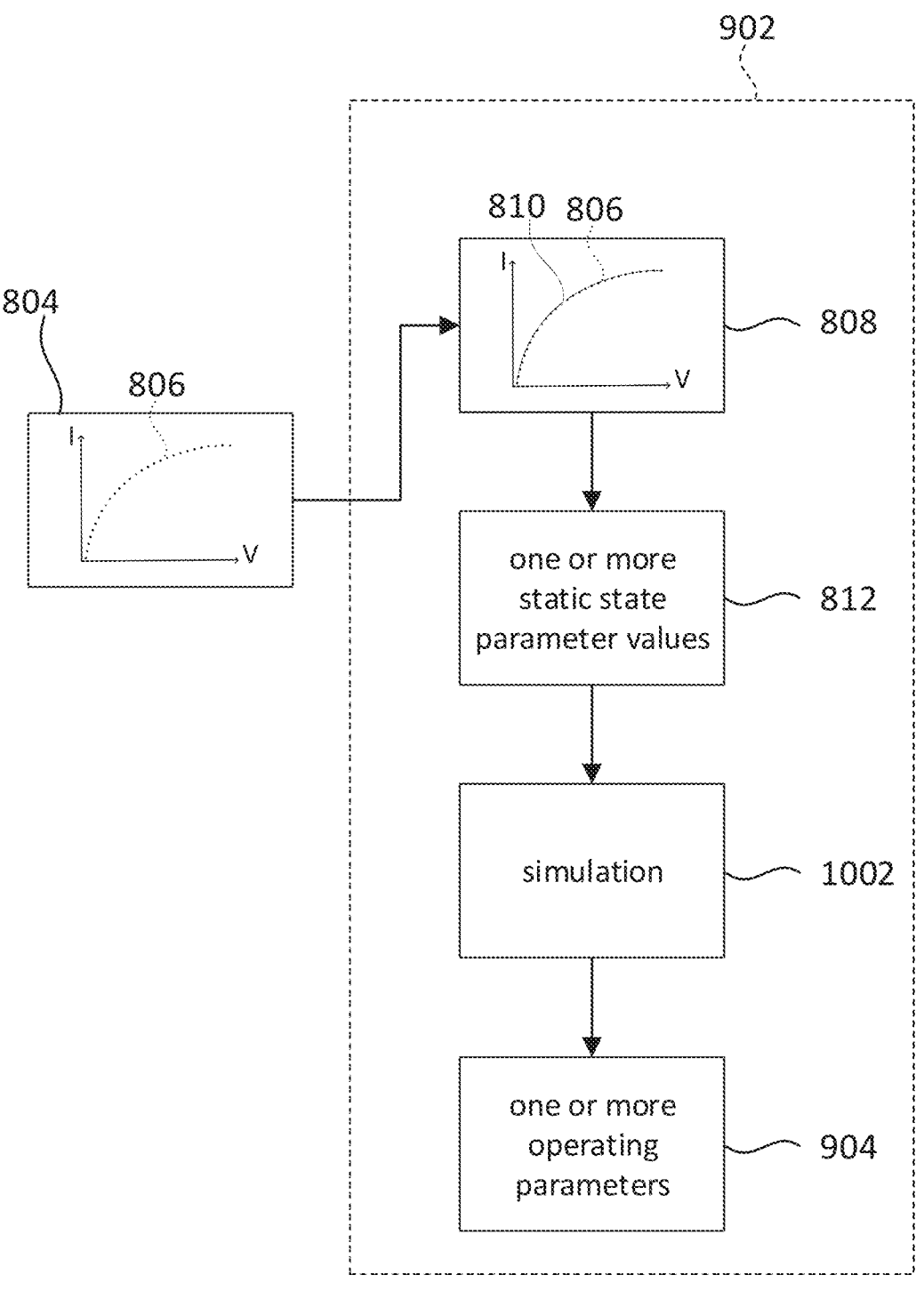
Figure 12:
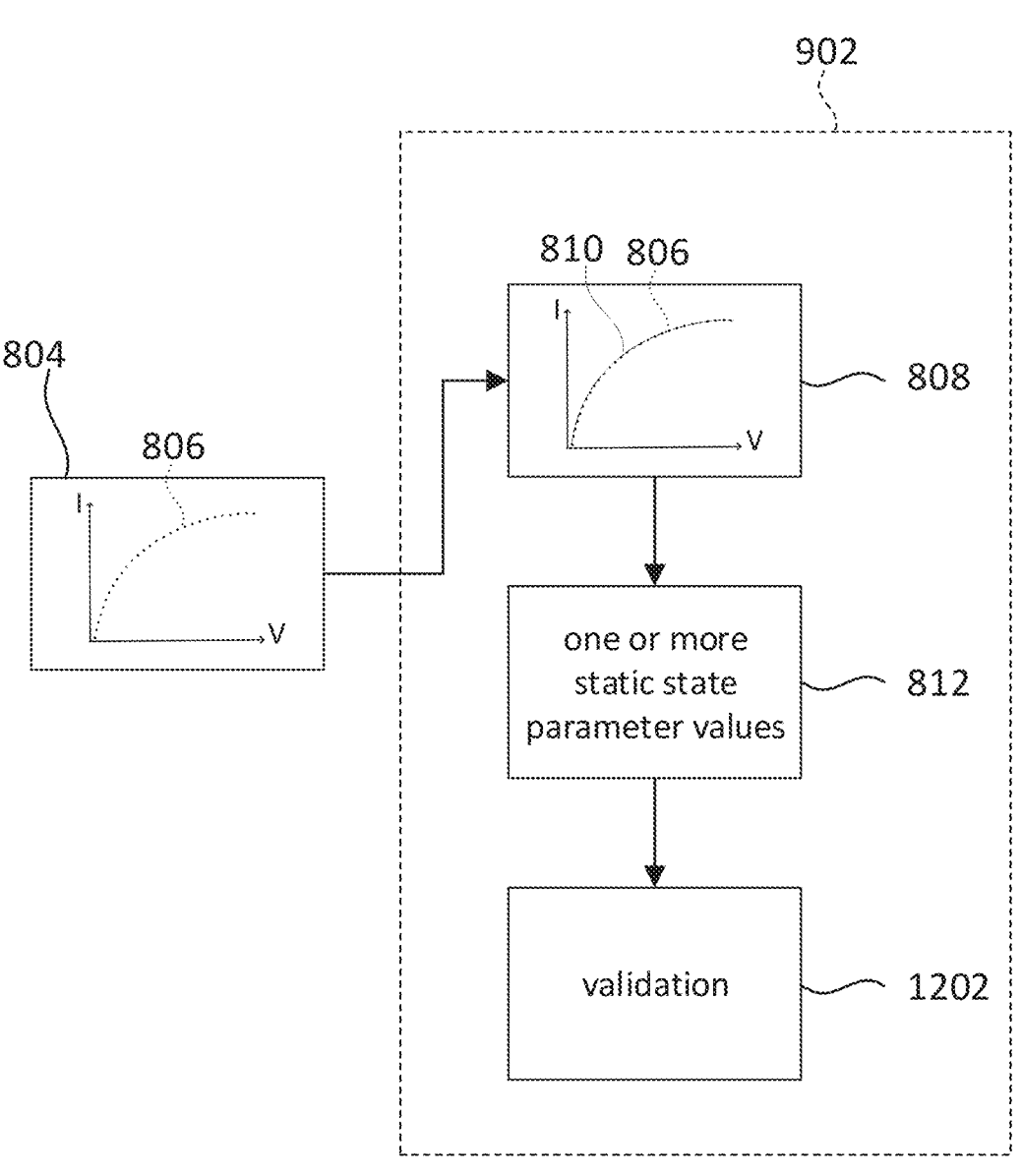
Figure 13:
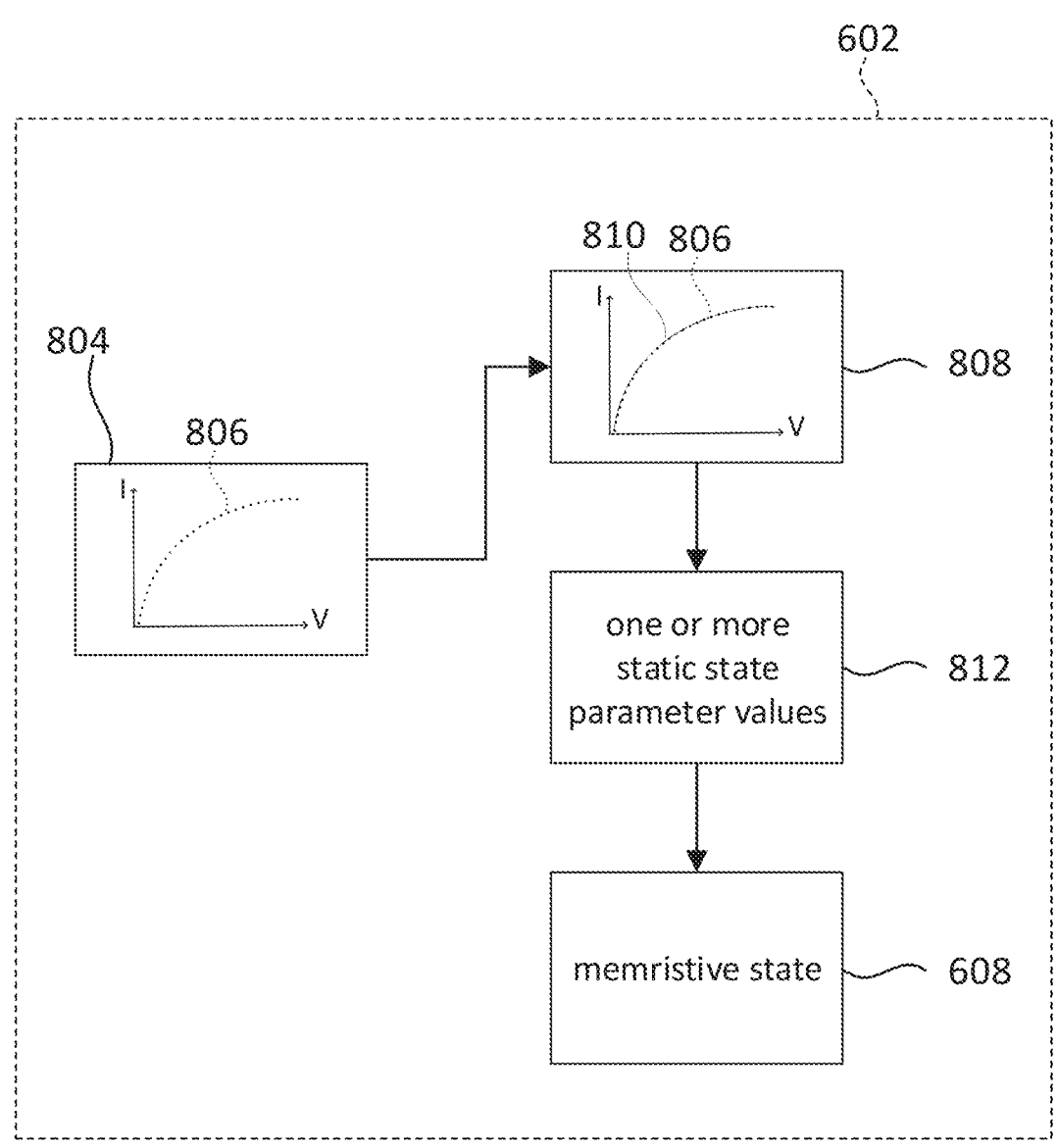
Figure 14:
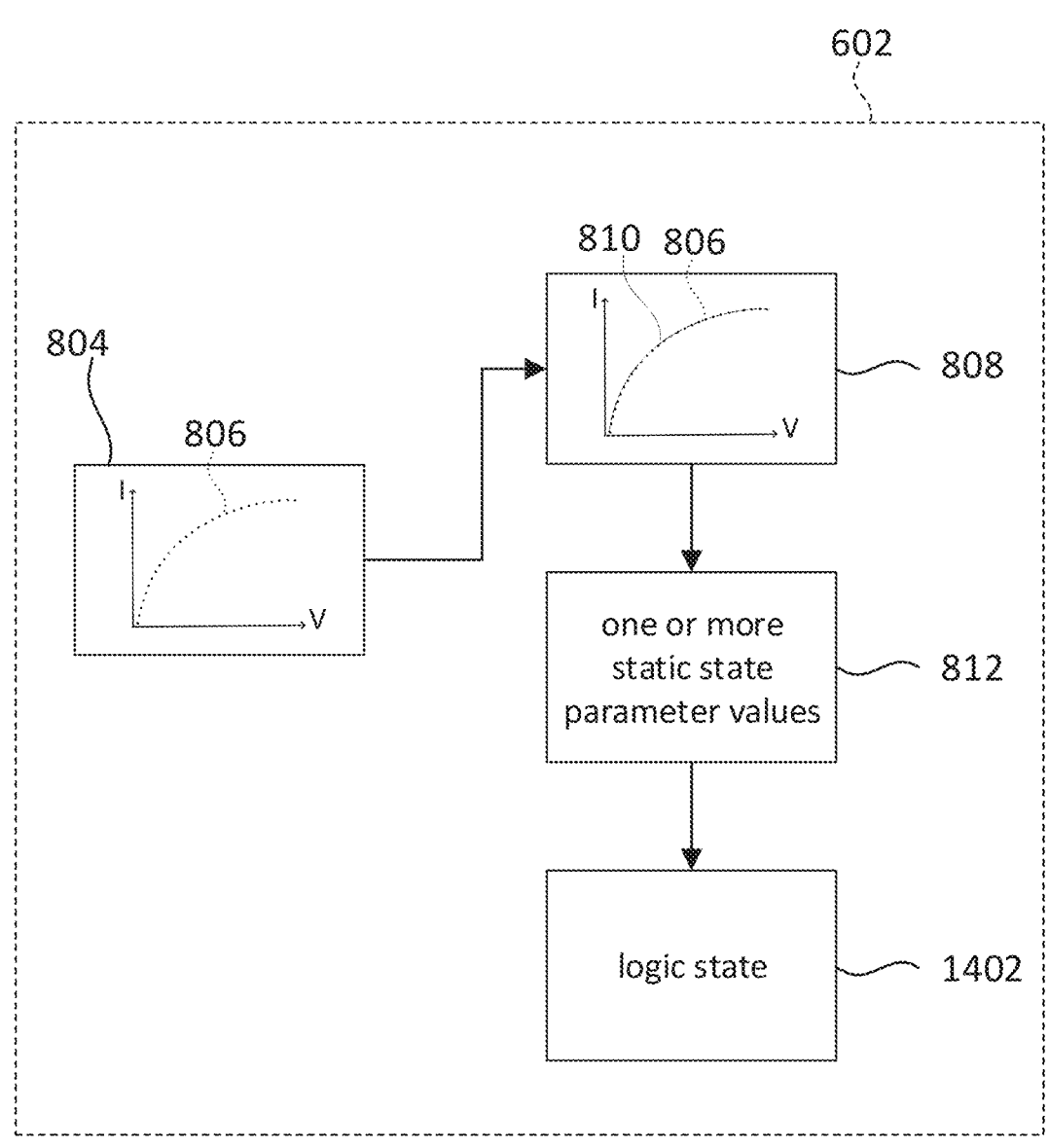

According to the processing scheme 1100 shown in FIG. 11, the at least one processor 902 may be configured to carry out the simulation 1002 (e.g., including varying the one or more simulation parameters associated with the operation of the memristive circuit) using the one or more static state parameter values 812 and to determine the one or more operating parameters 904 for operation of the memristive circuit based on a result of the simulation 1002.

According to the processing scheme 1100 shown in FIG. 11, the at least one processor 902 may be configured to carry out a validation 1202 of at least one memristive structure (e.g., for each memristive structure of a memristive circuit including a plurality of memristive structures) using the one or more static state parameter values 812. Each static state parameter may be associated with a respective predefined validation range of static state parameter values.

The at least one processor 902 may be configured to determine, for at least one static state parameter value determined for the at least one memristive structure, whether the at least one static state parameter value is within the predefined validation range associated with the static state parameter. The at least one processor 902 may be configured to validate the at least one memristive structure in the case that the at least one static state parameter value is within the predefined validation range associated with the static state parameter.

According to various aspects, the at least one processor 902 may be configured to respectively determine, for each static state parameter value determined for the at least one memristive structure, whether the static state parameter value is within the predefined validation range associated with the static state parameter. The at least one processor 902 may be configured to validate the at least one memristive structure in the case that each static state parameter is within the respective predefined validation range. Hence, if at least one static state parameter is not within the predefined validation range, the at least one processor 902 may not validate (e.g., invalidate) the at least one memristive structure.

According to various aspects, a memristive circuit may include a plurality of memristive structures. The at least one processor 902 may be configured to determine respective one or more static state parameter values 812 for each memristive structure of the plurality of memristive structures. The at least one processor 902 may be configured to respectively validate each of the memristive structures as described above. For example, the at least one processor 902 may be configured to validate a respective memristive structure of the plurality of memristive structures in the case that each static state parameter value of the one or more static state parameter values 812 is within the respectively associated predefined validation range. According to some aspects, in the case that a memristive structure is not validated (e.g., invalidated), the memristive structure may be, for example, not addressed during use. As described herein, the one or more static state parameter values may be determined during use of the memristive circuit. In this case, the herein described validation may (e.g., additionally) carried out during use. This allows to "sort out" memristive structures which change (e.g., of which the properties change) during use, such that these memristive structures may be, for example, not further addressed during use. This ensures the reliability, lifetime, data security, etc. of the memristive circuit. According to various aspects, the at least one processor 902 may be configured to validate the memristive circuit in the case that each memristive structure of the plurality of memristive structures is validated. It is noted that the respectively assigned predefined validation range serves as an example and that one or more other criteria may be used for validation. Such a criterium may be, for example, a variation of the values of a static state parameter among the plurality of memristive structures (e.g., a deviation from an average over the plurality of memristive structures). For example, the at least one processor 902 may be configured to respectively determine, for each memristive structure of the plurality of memristive structures, a respective value for one or more static state parameters. The at least one processor 902 may be configured to respectively determine, for at least one (e.g., each) static state parameter of the one or more static state parameters a variation of the determined values and whether this determined variation is equal to or less than a predefined threshold variation. The at least one processor 902 may be configured to validate the memristive circuit in the case that, for the at least one (e.g., each) static state parameter of the one or more static state parameters, the variation is equal to or less than the predefined threshold variation. Hence, a respective variation (e.g., a variation value) may be determined for each of the one or more static state parameters and the memristive circuit may be validated in the case that each of the determined variations is equal to or less than the predefined threshold variation. According to some aspects, in the case that a variation of the values of at least one static state parameter is greater than the threshold, the memristive circuit may be invalidated. This ensures consistent (unvarying) properties of the memristive structures of the memristive circuit, thereby increasing, for example, the reliability of the memristive circuit. The variation of the (static state parameter) values of a static state parameter may be, for example, a deviation from an average value. This average value may be, for example, determined by averaging the determined (static state parameter) values of the static state parameter over the plurality of memristive structures.

According to various aspects, a memristive structure (e.g., each memristive structure of the memristive circuit) may be set (one after another) into different memristive states and in each memristive state a respective validation may be carried out, as described herein.

Using the (static state parameter) values of the one or more static state parameters for validation of a memristive circuit may be a more objective criterium for the certification of the memristive circuit as compared to currently used certification criteria (e.g., since the static state parameters directly describe (e.g., physical, electrical, etc.) properties (and variations of these properties) of the memristive structures of the memristive circuit).

As described herein, the one or more static state parameter values 812 of the one or more static state parameters may be indicative of the memristive state the memristive structure resides in. Hence, the determined one or more static state parameter values allow to determine the memristive state, $m_s$, of the memristive structure. According to the processing (e.g., reading) scheme 1300 shown in FIG. 13, the read circuit 602 may be configured to, using the one or more static state parameter values 812, determine (e.g., classify) the memristive state 608 of the memristive structure 100. As described herein, a memristive structure may be in one of over one hundred (e.g., more than 200, e.g., more than 500) different memristive states. Since the differences between the resistance-characteristic curves of the different memristive states may be small (e.g., when using only one read voltage value), using only the current value corresponding a read voltage value may not allow to different between each of these different memristive states. However, since the one or more static state parameters 812 are directly indicative of the resistance-characteristic curves of the different memristive states, using the static state parameter values 812 may allow to differentiate between more (e.g., each) of the different memristive states. This also allows to use more logic states. For example, the memristive structure may be associated with over one hundred different logic states. According to the processing (e.g., reading) scheme 1400 shown in FIG. 14, the read circuit 602 may be configured to, using the one or more static state parameter values 812, determine (e.g., classify) a logic state 1402 (of two or more logic states) of the memristive structure 100. According to various aspects, each logic state of the two or more logic states may be associated with one or more memristive states of the memristive structure. Hence, more than one memristive state may be associated with the same logic state.

Alternatively, each memristive state may be associated with respective logic state. For various possibilities to determine the logic state of a memristive structure see also the description with reference to FIG. 15 to FIG. 17.

Figure 15:
FIG. 15 shows a device having a read circuit which reads a logic state of a memristive structure via at least two measurements during a single read-out operation.
Figure 15:
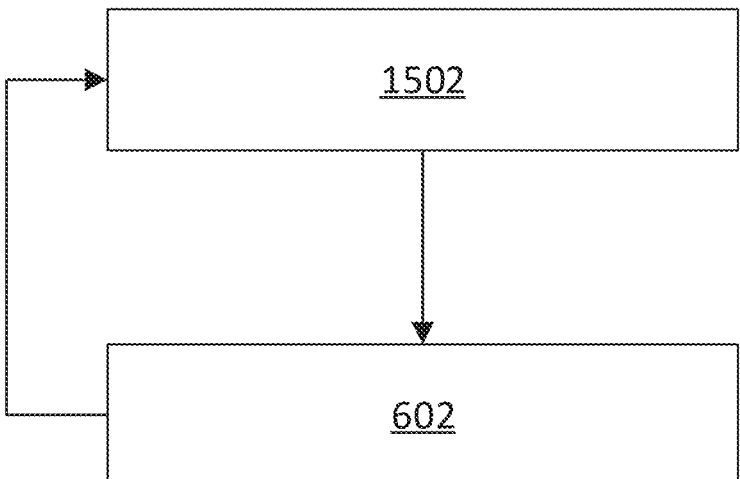

FIG. 15 shows a device 1500 according to various aspects. The device 1500 may be, for example, a memory device, a storage device, and/or a processing device. As an example, the device 1500 may be used as a back-up memory (e.g., for BIOS configuration data) since memristive structures are faster than transistors. As another example, the device 1500 may be used as a working memory (e.g., a resistive random-access memory, ReRAM) since memristive structures are not affected by sudden power losses. As a further example, the device 1500 may be used for inter-of-things application since, due to the non-volatile data storage, memristive structures can store data without energy consumption and may, thus, require less energy. As an even further example, the device 1500 may be a reprogrammable logic device or a reconfigurable computing device. The device 1500 may be, for example, a neuromorphic computing device since the plurality of memristive states may serve as a gradient for the neuromorphic computing. The device 1500 may be, for example, used for neural network computing since the plurality of memristive states may provide a gradient representing weights (and/or biases) within the neural network. The device 1500 may also be a near-memory computing device or an in-memory computing device. Here, some memristive structures of the device 1500 may carry out computing processes and other memristive structures of the device 1500 may be used to store data.

The device 1500 may include a memristive circuit 1502. The memristive circuit 1502 may include one or more (e.g., a plurality of) memristive structures. The memristive circuit 1502 may include the read circuit 602. The read circuit 602 may be configured to (e.g., individually) address each of the one or more (e.g., plurality of) memristive structures. The read circuit 602 may be configured to read a respective memristive state 608 and/or a respective logic state 1402 of each of the one or more (e.g., plurality of) memristive structures. According to some aspects, read circuit 602 may be configured to read a respective memristive state 608 and/or a respective logic state 1402 of a respective memristive structure using, for example, at least two times (e.g., via at least two measurements) during a single read-out operation using different read-out voltage values or different read-out current values, as described herein (see, for example, description with reference to FIG. 6 to FIG. 8A). It is understood that measuring the resistance-characteristic curve, as describe herein, may include measuring several data points, I(V) or V(I), and, thus, several measurements. However, it is also understood that these measurements may be carried out during the same read-out operation (e.g., during applying a single measurement signal (e.g., measurement pulse)).

For example, in the case that the read circuit 602 is configured to determine (e.g., measure) the first current value, $I_{read1}$, corresponding to first voltage value, $V_{read1}$, and the second current value, $I_{read2}$, corresponding to the second voltage value, $V_{read2}$ (see FIG. 6 and corresponding description), the read circuit 602 may be configured to determine a first expected memristive state of the memristive structure 100 using the first current value, $I_{read1}$, and to determine a second expected memristive state of the memristive structure 100 using the second current value, $I_{read2}$. The read circuit 602 may be configured to determine the memristive state of the memristive structure 100 based on the determined first expected memristive state and the determined second expected memristive state. For example, the read circuit 602 may be configured to determine, whether the first expected memristive state corresponds to the second expected memristive state, determine the first expected memristive state as the memristive state of the memristive structure 100 in the case that the first expected memristive state corresponds to the second expected memristive state. Illustratively, the memristive state of the memristive structure 100 is read out at least two (e.g., exactly two, three, more than three) times at different voltage (or current) values and the memristive state is determined based on these at least two measurements. As described herein, the differences between the resistance-characteristic curves of the different memristive states may be small. Thus, using at least two measurements during a single read-out operation may allow to differentiate between more memristive states as compared to using only one measurement.

As described herein, each data point, (I/V), on the transition curve 302 may (unambiguously or bijectively) correspond to one memristive state, $m_s(V)$, of the plurality of memristive states. In the case that the read circuit 602 is configured to determine the destruction voltage, $V_{des}$ (see FIG. 7 and corresponding description), during a single read-out operation, even more memristive states as compared to using two measurements during the read-out operation may be differentiated.

In the case that the read circuit 602 is configured to determine the one or more static state parameter values 812 (see, for example, FIG. 8A to FIG. 8D and corresponding description), even more memristive states as compared to using the two measurements and as compared to using the destruction voltage can be differentiated. It is understood that the capability to differentiate between more memristive states allows to use more logic states and, thus increases the processing or computational power.

FIG. 16A to FIG. 16D each show a device 1600 according to various aspects. The device 1600 may be a memory device or a storage device. For example, the device 1600 may be an n-logic memory. The device 1600 may include a plurality of memristive structures 1602($n$=2 to N). "N" may be any integer number equal to or greater than two. According to various aspects, "N" may be any integer number equal to or greater than twenty (e.g., equal to or greater than one hundred).

The device 1600 may include the read circuit 602. As described herein, the read circuit 602 may be configured to read out a respective logic state (of two or more logic states) of each memristive structure of the plurality of memristive structures 1602($n$=2 to N) via at least two measurements during a single read-out operation (such as, for example, described with reference to any of the FIG. 6 to FIG. 8D, and FIG. 13, to FIG. 15).

Figure 17A:
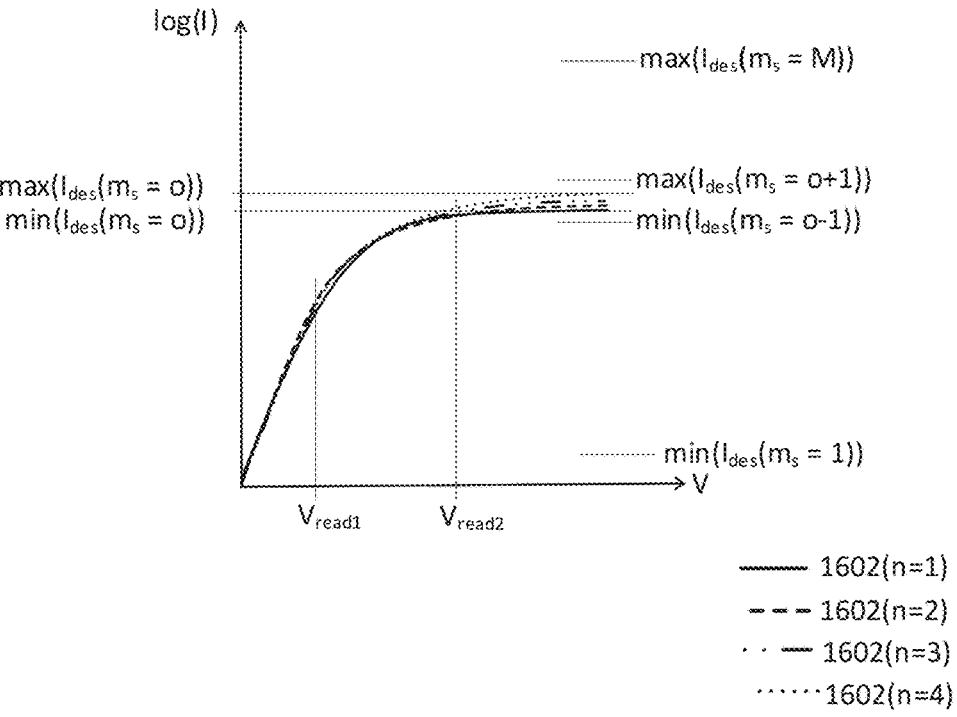
FIGS. 17A and 17B schematically illustrate process variations among different memristive structures which are in the same memristive state.
Figure 17B:
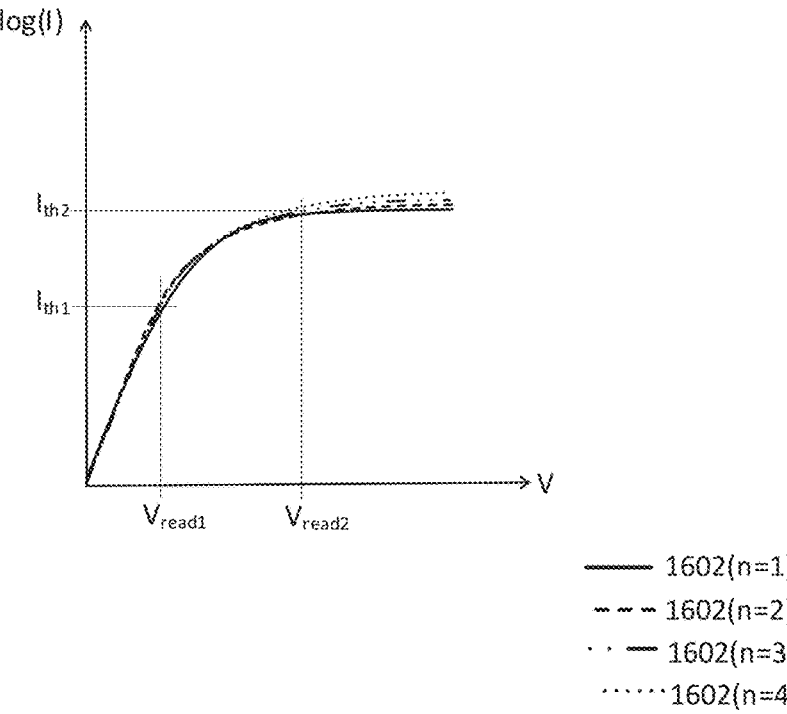

The device 1600 may include one or more processors 1604. The one or more processors 1604 may be configured to determine a key 1606. The key 1606 may be, for example, a private key or an authentication key. According to some aspects, the one or more processors 1604 may be configured to determine the key 1606 based on the logic states determined for the plurality of memristive elements. According to various aspects, process variations or deviations among the plurality of memristive structures 1602($n$=1 to N) may be employed to generate the key 1606. Thereby, the plurality of memristive structures 1602($n$=1 to N) is configured as a physical unclonable function (PUF). In particular, variations of the production process may induce variations of the plurality of memristive structures 1602($n$=1 to N). The variations of the production process introduce randomness into the properties of the plurality of memristive structures 1602($n$=1 to N) and can therefore provide the entropy for generating the key 1606. Such variations in the properties of the plurality of memristive structures 1602($n$=1 to N) may lead to slightly differences in resistance-characteristic curves (which are associated with the same memristive state) of the plurality of memristive structures 1602($n$=1 to N). As an example, FIG. 17A shows a respective resistance-characteristic curve of a first memristive structure 1602 ($n$=1), a second memristive structure 1602($n$=2), a third memristive structure 1602($n$=3), and a fourth memristive structure 1602($n$=4) for a case in which each of the first to fourth memristive structures 1602($n$=1 to 4) are in the same memristive state, $m_s$=o. As described herein, each memristive state, $m_s$, may be associated with a corresponding destruction current, $I_{des}$, at which the memristive state may be changed. According to some aspects, each memristive structure of the plurality of memristive structures 1602($n$=1 to N) may be in the same memristive state. According to other aspects, each memristive structure of the plurality of memristive structures 1602($n$=1 to N) may be in a memristive state within a predefined subrange of a plurality of memristive states. For example, the variations among the plurality of memristive structures 1602($n$=1 to N) may lead an overlap of the resistance-characteristic curves of two or more memristive structures even in the case that the two or more memristive structures are in different memristive states. Therefore, the predefined subrange of a plurality of memristive states may allow to introduce a further entropy and therefore to increase the security of the PUF.

According to various aspects, the read circuit 602 may be configured to read out the respective logic state of each of the plurality of memristive structures 1602($n$=1 to N) non-destructively. Here, threshold values may be used to determine the respective logic state (of two or more logic states) of each of the plurality of memristive structures 1602($n$=1 to N). A threshold value may be, for example, selected such that 45% to 55% (e.g., about 50%) of the plurality of memristive structures 1602($n$=1 to N) are in one logic state and that the other memristive structures are in another logic state. For example, extracted discrete parameters may be "sorted" with respect to corresponding threshold values which are the values separating discrete values corresponding to different logic states (e.g., "1" and "0"). In the following, two examples of determining the respective logic state are described:

As a first example, the read circuit 602 may be configured to carry out a first measurement during a read-out operation at the first voltage value, $V_{read1}$, and a second measurement during the read-out operation at the second voltage value, $V_{read2}$ (see, for example, FIG. 6 and corresponding description). It is understood that this serves for illustration and that more than two measurements may be carried out during the read-out operation. As exemplarily shown in FIG. 17B, each of the first voltage value, $V_{read1}$, and the second voltage value, $V_{read2}$, may be associated with a respective current threshold value, $I_{th1}$ or $I_{th2}$. All memristive structures of the plurality of memristive structures 1602($n$=1 to N) having a current value less than the respective current threshold value may be associated with a first logic state and all memristive structures of the plurality of memristive structures 1602($n$=1 to N) having a current value greater than the respective current threshold value may be associated with a second logic state (e.g., "1") different from the first logic state (e.g., "0"). This may be carried out using a (e.g., current) comparator. Thus, a first intermediate logic state (being the first logic state (e.g., "0") the second logic state (e.g., "1")) may be determined (using the first current threshold value, tau) corresponding to the first voltage value, $V_{read1}$, and a second intermediate logic state (being the first logic state (e.g., "0") the second logic state (e.g., "1")) may be determined (using the second current threshold value, $I_{th2}$) corresponding to the second voltage value, $V_{read2}$. The logic state of a respective memristive structure may be determined using first intermediate logic state and the second intermediate logic state. This may allow to different between up to four different logic states (hence, the device may be multi-bit-device): As an example, the logic state of the respective memristive structure may be:

"0" in the case that both, the first intermediate logic state and the second intermediate logic state are associated with the first logic state, "1" in the case that both, the first intermediate logic state and the second intermediate logic state are associated with the second logic state, "2" in the case that the first intermediate logic state is in the first logic state and that the second intermediate logic state is in the second logic state, and "3" in the case that the first intermediate logic state is in the second logic state and that the second intermediate logic state is in the first logic state.

However, it is understood that less than four logic states may be used by assigning these four combinations to two or three different logic states.

It is understood that each read voltage value may be associated with more than one current threshold value. For example, in the case that the first voltage value, $V_{read1}$, may be associated with two threshold values, $I_{th1a}$ and $I_{th1b}$, all memristive structures of the plurality of memristive structures 1602($n$=1 to N) having a current value less than the first, $I_{th1a}$, of the two current threshold values, $I_{th1a}$ and $I_{th1b}$, may be associated with the first logic state, all memristive structures of the plurality of memristive structures 1602($n$=1 to N) having a current value greater than the first, $I_{th1a}$, and lower than the second, $I_{th1b}$, of the two current threshold values, $I_{th1a}$ and $I_{th1b}$, may be associated with the second logic state, and all memristive structures of the plurality of memristive structures 1602($n$=1 to N) having a current value greater than the second, $I_{th1b}$, of the two current threshold values, $I_{th1a}$ and $I_{th1b}$, may be associated with a third logic state. Hence, this may increase the number of possible logic states.

As described herein, more than two measurements may be carried out at different voltage values during a single read-out operation. Here, each voltage value may be associated with one or more current threshold values as described above. Thus, a maximum number of (e.g., intermediate) logic states may be given by $(t+1)^r$, wherein t is the number of current threshold values respectively used for each measurement and r is the number of measurements during the read-out operation. As understood, the read circuit 602 may be configured to determine each of these (e.g., intermediate) logic states $(t+1)^r$ as a respective logic state or to map these (e.g., intermediate) logic states $(t+1)^r$ to less logic states (e.g., in the case of a binary device to either "0" or "1").

As described herein, applying the read voltage pulse serves as an example for a measurement signal. Hence, in the case that the measurement signal is a current pulse, the described thresholds apply in an analog (vice versa) manner to voltage threshold values.

Figure 17C:
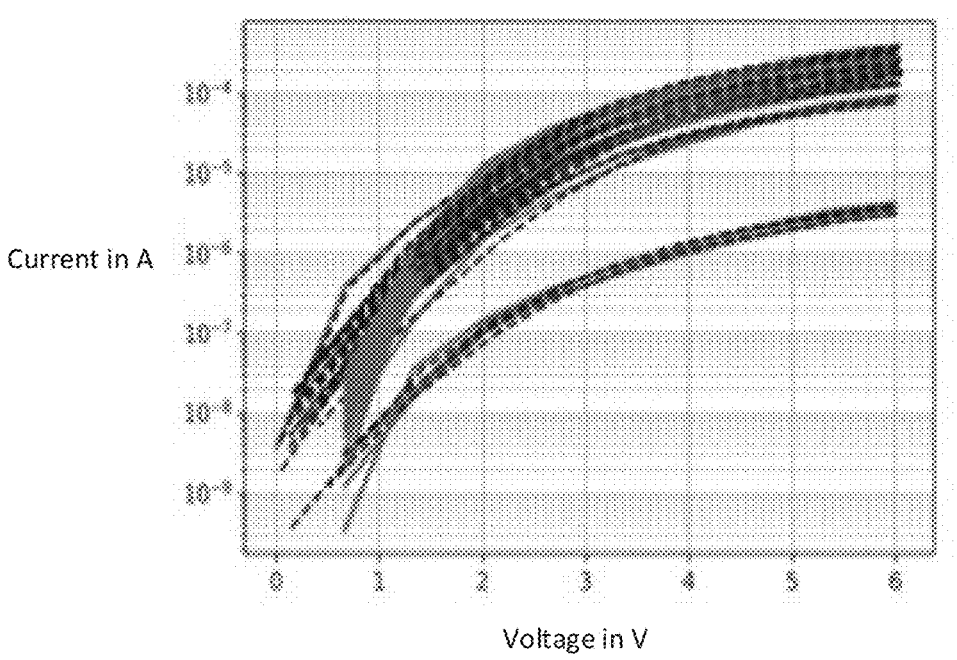
FIGS. 17C, 17E, 17G, and 17I each show measured IV-characteristics of various manufactured memristive structures which are in the same memristive state to illustrate process variations among these manufactured memristive structure and FIGS. 17D, 17F, 17H, and 17J each show correspondingly determined static state parameters, respectively.
Figure 17D:
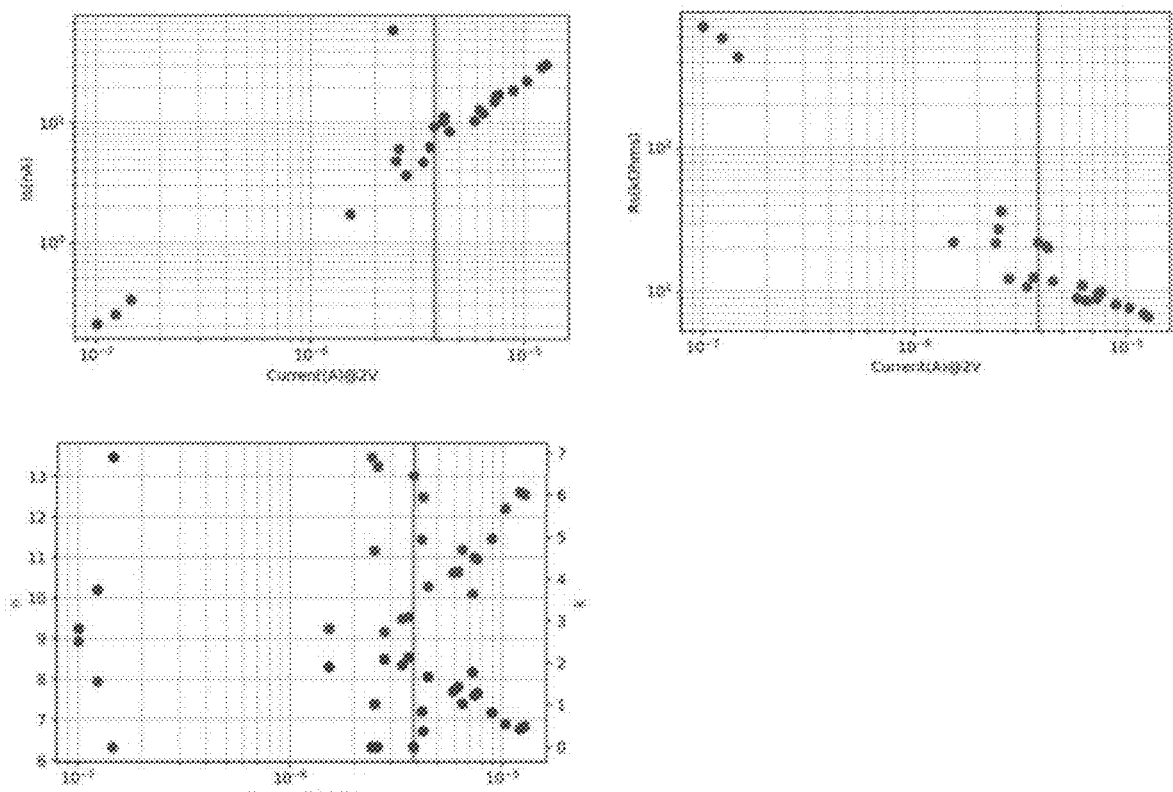

As a second example, the read circuit 602 may be configured to read out a respective memristive structure by measuring the resistance-characteristic curve of the respective memristive structure. Here, the read circuit 602 may be configured to determine the one or more static state parameter values 812 via fitting the resistance-characteristic curve based on the physical model. FIG. 17C shows measured resistance-characteristic curves of a plurality of memristive structures which are in the same memristive state. This shows illustratively the process variation induced variations among the plurality of memristive structures. FIG. 17D shows the static state parameter values 812 of the reverse saturation current, $I_S$, the series resistance, $R_S$, as well as $n_0$ and K (which both describe an ideality of the respective memristive structure) obtained by respectively fitting each of the measured resistance-characteristic curves using the physical model according to:

$$V = n_0 \frac{k_B T}{q} \log\left(\frac{I}{I_S} + 1\right)\left(1 + K \frac{k_B T}{q} \log\left(\frac{I}{I_S} + 1\right)\right) + I \cdot R_S$$

Each static state parameter may be associated with a respective parameter threshold value. For example, all memristive structures of the plurality of memristive structures having a respective static state parameter value less than the respective parameter threshold value may be associated with a first logic state (e.g., "0") and all memristive structures of the plurality of memristive structures having a respective static state parameter value greater than the respective parameter threshold value may be associated with a second logic state (e.g., "1") different from the first logic state. Thus, a maximum number of possible memristive states may be given by $2^s$, wherein s is the number of static state parameters.

As shown in FIG. 17D, the factors $n_0$ and K (which represent the ideality of the respective memristive structure) may vary among a comparatively broad range. This may allow to increase the number of memristive states used for the device 1600 since memristive structures having different memristive states may have similar "ideality" and memristive structures being in the same memristive state may have a different "ideality" (as shown in FIG. 17D). Increasing the number of used memristive states (i.e., increasing the number of memristive states within the predefined subrange of memristive states, e.g., up to all memristive states) may further increase the security of the device (e.g., of the PUF). In this case, the memristive states of the plurality of memristive structures may be (e.g., randomly) distributed over the memristive states within the predefined subrange of memristive states (e.g., over all memristive states of the memristive structures).

Figure 17E:
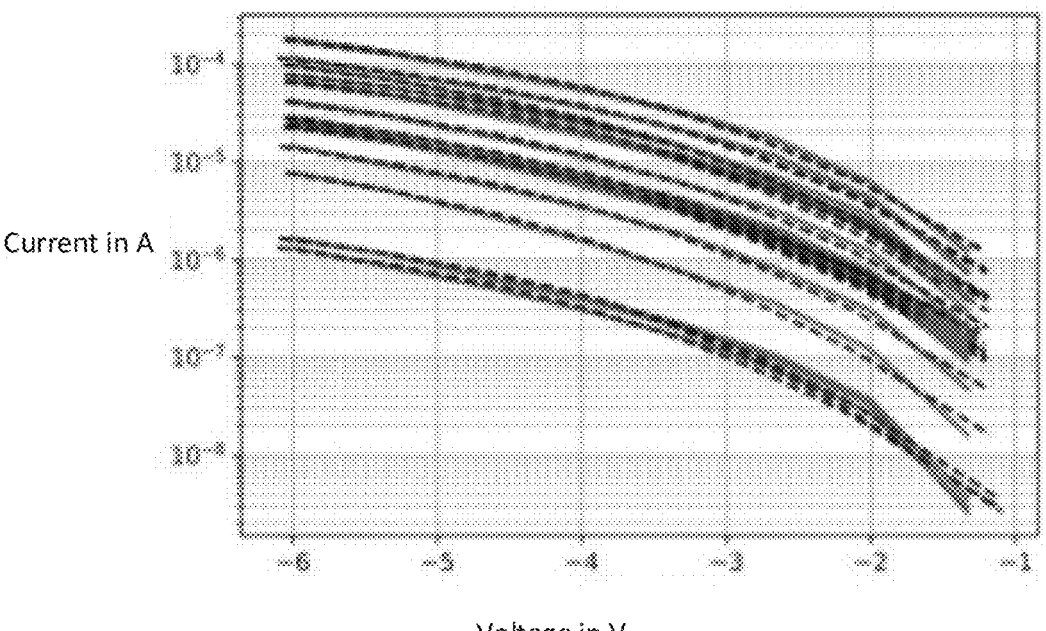
Figure 17F:
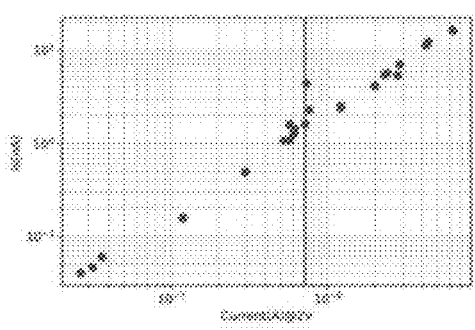
Figure 17F:
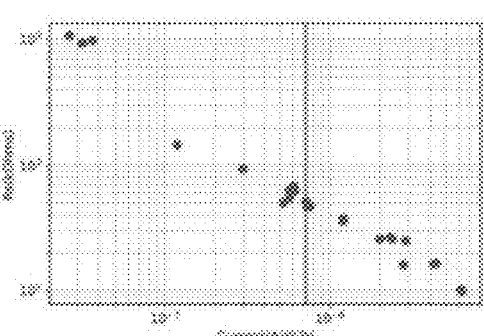
Figure 17F:
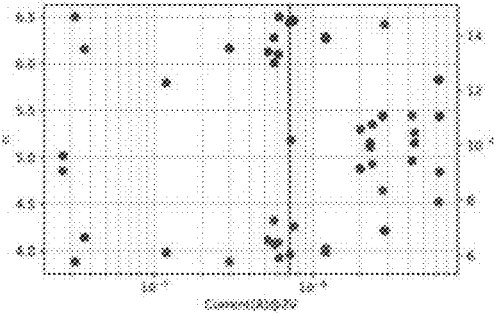
Figure 17G:
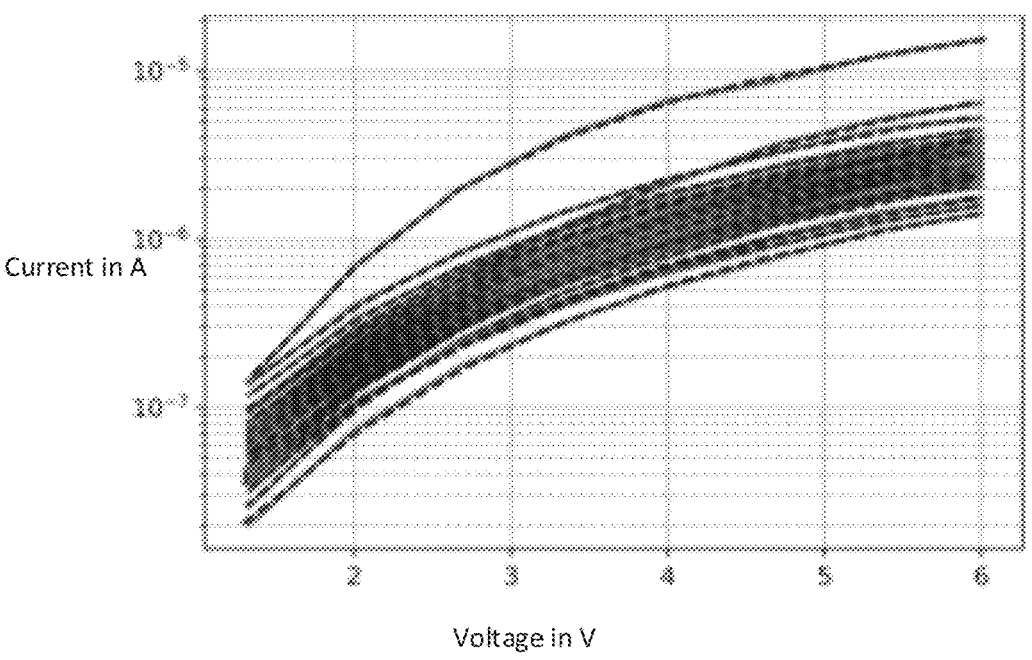
Figure 17H:
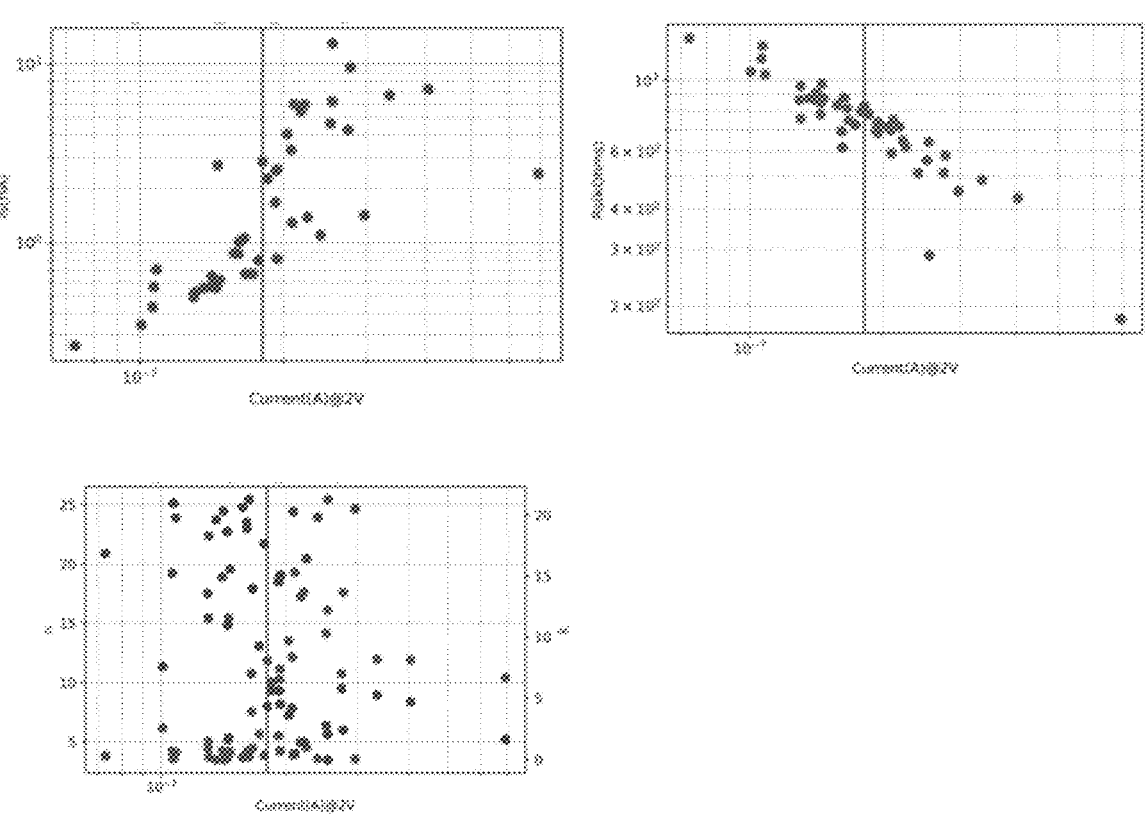
Figure 17I:
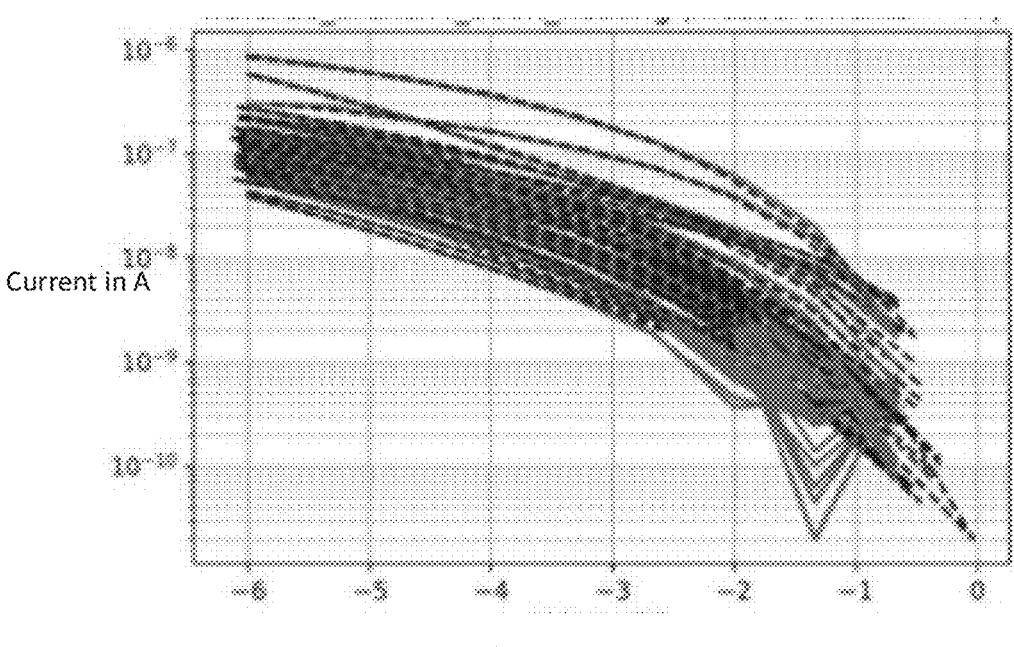
Figure 17J:
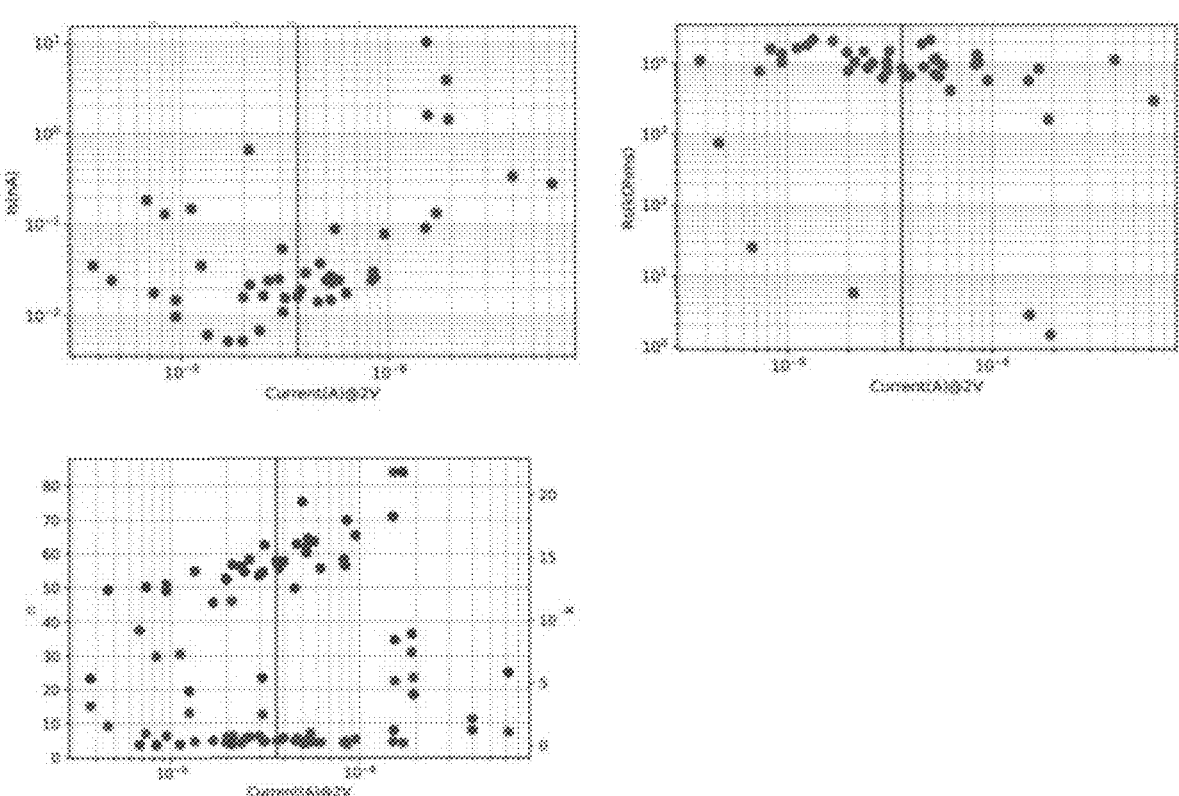

As described herein, a memristive structure may be in a (positive) memristive state associated with the first quadrant of the IV-curve or in a (negative) memristive state associated with the third quadrant of the IV-curve. All of the plurality of memristive structures 1602($n$=1 to N) may be either in a (positive) memristive state associated with the first quadrant of the IV-curve or in a (negative) memristive state associated with the third quadrant of the IV-curve. The memristive structures, for which the resistance-characteristic curves are shown in FIG. 17C, are in the same (positive) memristive state within the first quadrant. For illustration, FIG. 17E shows measured resistance-characteristic curves for the plurality of memristive structures of FIG. 17C which are set in the same (negative) memristive state within the third quadrant and FIG. 17F shows correspondingly determined static state parameter values. FIG. 17G shows measured resistance-characteristic curves for another plurality of memristive structures set in the same (positive) memristive state within the first quadrant and FIG. 17I shows measured resistance-characteristic curves for the other plurality of memristive structures set in the same (negative) memristive state within the third quadrant. FIG. 17H shows the static state parameters determined for the measured resistance-characteristic curves of FIG. 17G and FIG. 17J shows the static state parameters determined for the measured resistance-characteristic curves of FIG. 17I.

Figure 16A:
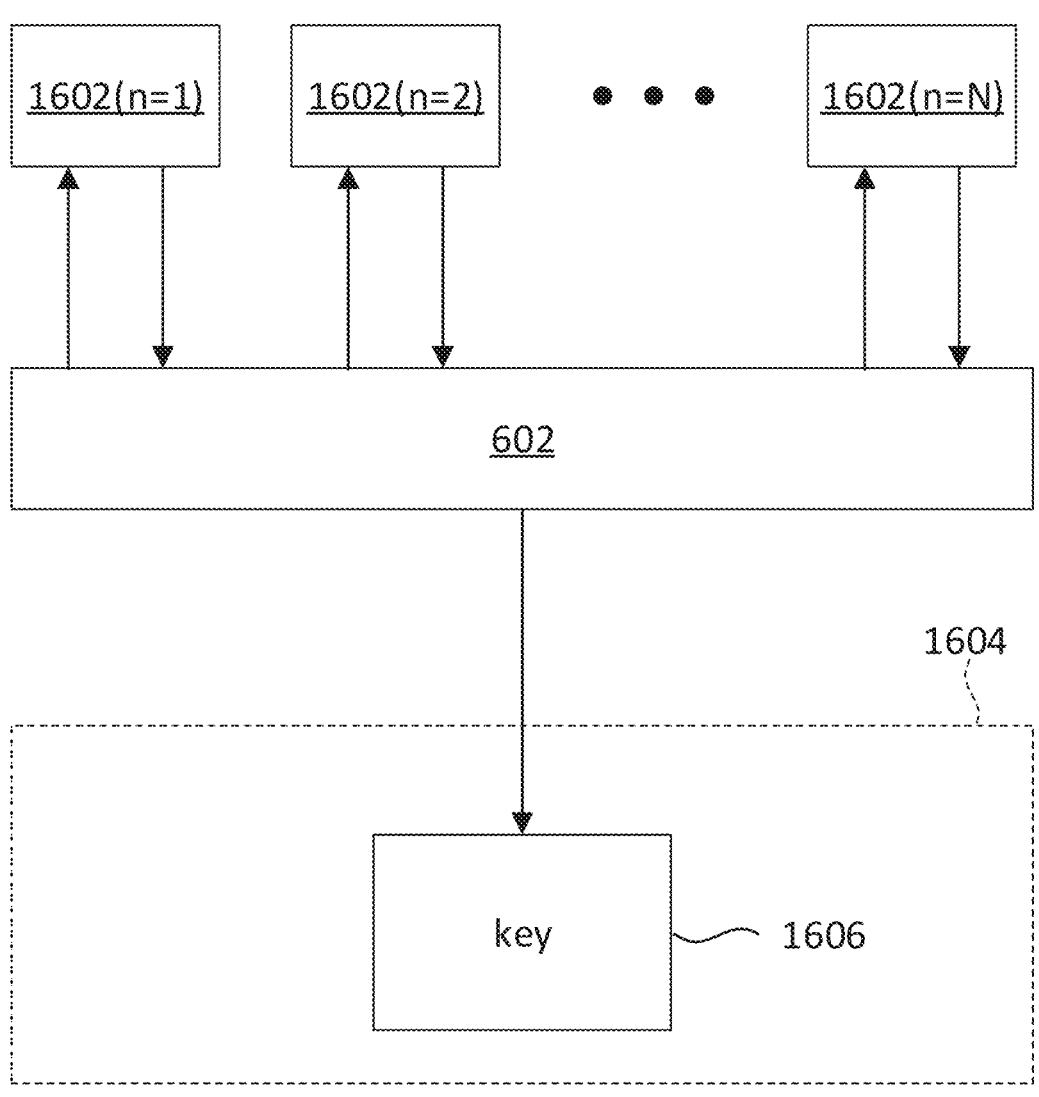
FIGS. 16A to 16D each shows a device having a read circuit which reads a respective logic state of a plurality of memristive structures via at least two measurements during a single read-out operation and which is capable to generate a key based on the logic states determined for the plurality of memristive structures.
Figure 16B:
Figure 16C:

With reference to FIG. 16B, the one or more processors 1604 may be configured to generate a cryptographic key 1608 using the determined key 1606. Hence, the device 1600 may serve as a cryptographic device. As described, each memristive structure may be associated with two or more intermediate logic states. Hence, the device 1600 may be a many-state-device. The one or more processors 902 may be, for example, configured to map these two or more logic states to either two logic states (e.g., "0" and "1") or a combination of these two logic states. As an example, in the case of the two measurements during the read-out operation, the four possible intermediate logic states may be mapped to "00", "01", "10", and "11". The key 1606 may then, for example, include these combinations of all memristive structures. As described herein, in the case of using the static state parameter values 812, the number of possible intermediate logic states and, therefore, also the number of combinations of two logic states may be increased. The one or more processors 1604 may be configured to generate the cryptographic key 1608 by applying an encryption algorithm on the determined key 1606. With reference to FIG. 16C, the one or more processors 1604 may be configured to generate (e.g., using a shift register) a random number 1610 using the determined key 1606. Hence, the device 1600 may serve as a random number generator.

Figure 16D:

With reference to FIG. 16D, the device 1600 may include a programming circuit 1612. The programming circuit 1612 may be configured to (individually) set (e.g., write) each of the memristive structures into a respective memristive state. Hence, the device 1600 may be a reconfigurable device (e.g., may serve as a reconfigurable PUF). This may allow to change the key 1606 (and, hence, e.g., the cryptographic key 1608). According to various aspects, the device 1600 may include a random number generator and the programming circuit may be configured to select the memristive state into which a respective memristive element of the plurality of memristive elements is to be written from the plurality of memristive states based on a random number generated by the random number generator. This may further increase the randomness and, thus, the security.

The device 1600 may be any device which may use or may be employed to generate a key (e.g., a cryptographic key), a random number, etc. Thus, the device 1600 may be or may be part of any suitable security device. For example, the device 1600 may be or may be part of a hardware security module, a security key (e.g., a Universal Serial Bus (USB) security key), and/or a secure cryptoprocessor.

When determining the logic state via two or more measurements during a single read-out operation (e.g., using the static state parameter values), the variability of different PUFs may be determined with reduced error rate (in comparison to a single read-out value).

As described herein, the device 1500 and/or the device 1600 may be an analog device.

FIG. 18 shows a flow diagram of a method 1800 for reading a memristive element using at least two different reading voltages.

The method 1800 may include applying a measurement pulse (e.g., a voltage pulse or a current pulse) to a memristive element which is set into a memristive state (in 1802).

The measurement pulse may be a voltage pulse. In this case, the method 1800 may include (in 1804) during applying the voltage pulse to the memristive element, measuring a first current value associated with a current through the memristive element at a first voltage value and a second current value associated with the current through the memristive element at a second voltage value different from the first voltage value.

An alternative method may include applying a first voltage pulse to a memristive element which is set into a memristive state, during applying the first voltage pulse to the memristive element, measuring a first current value associated with a current through the memristive element at a first voltage value. This alternative method may include applying a second voltage pulse to the memristive element and during applying the second voltage pulse to the memristive element, measuring a second current value associated with the current through the memristive element at a second voltage value.

The measurement pulse may be a current pulse. In this case, the method 1800 may include (in 1804) during applying the current pulse to the memristive element, measuring a first voltage value associated with a voltage drop over the memristive element at a first current value and a second voltage value associated with the voltage drop over the memristive element at a second current value different from the first current value.

An alternative method may include applying a first current pulse to a memristive element which is set into a memristive state, during applying the first current pulse to the memristive element, measuring a first voltage value associated with a voltage drop over the memristive element at a first current value. This alternative method may include applying a second current pulse to the memristive element and during applying the second current pulse to the memristive element, measuring a second voltage value associated with the voltage drop over the memristive element at a second current value.

FIG. 19 shows a flow diagram of a method 1900 for reading a memristive element using at least two different reading voltages.

The method 1900 may include applying a measurement pulse (e.g., a voltage pulse or a current pulse) to a memristive element (in 1902).

The measurement pulse may be a voltage pulse. In this case, the method 1900 may include (in 1904) during a falling edge of the applied voltage pulse, measuring a first current value associated with a current through the memristive element at a first voltage value and a second current value associated with the current through the memristive element at a second voltage value different from the first voltage value.

The measurement pulse may be a current pulse. In this case, the method 1900 may include (in 1904) during a falling edge of the applied current pulse, measuring a first voltage value associated with a voltage drop over the memristive element at a first current value and a second voltage value associated with the voltage drop over the memristive element at a second current value different from the first current value.

In each of the methods 1800, 1900, the application of the measurement pulse and the measurement of the first current or voltage value and the second current or voltage value may be carried out as described with reference to, for example, any of FIG. 4A to FIG. 7.

FIG. 20 shows a flow diagram of a method 2000 for determining a respective value of one or more static state parameters associated with a memristive state of a memristive structure.

The method 2000 may include setting a memristive element into a memristive state of a plurality of memristive states (in 2002).

The method 2000 may include determining one or more static state parameter values of the memristive element associated with the memristive state (in 2004). Determining the one or more static state parameter values may include determining a current/voltage characteristic of the memristive element. The current/voltage characteristic may be determined by applying a read voltage sequence to the memristive element to cause a corresponding current sequence through the memristive element or by applying a read current sequence to the memristive element to cause a corresponding voltage drop sequence over the memristive element. The one or more static state parameters may be determined via fitting the current/voltage characteristic by a physical model. The physical model may be based on static state parameters for which the static state parameter values are determined.

The determination of the one or more static state parameter values of the memristive element may be carried out as described with reference to any of FIG. 8 to FIG. 14.

Optionally, the method 2000 may include any kind of employing the determined one or more static state parameter values (e.g., as described with reference to any of FIG. 9 to FIG. 14)

In the following, various examples are provided that may include one or more aspects described above with reference to reading a memristive structure, such as via one of the devices 1500, 1600 and/or using one of the methods 1800, 1900, 2000. It may be intended that aspects described in relation one or more devices 1500, 1600 may apply also to one or more methods, and vice versa.

Example 1 is a method including: applying a voltage pulse to a memristive element (in some aspects referred to as memristive structure) which is set (e.g., written) into a memristive state; during applying the voltage pulse to the memristive element, measuring a first current value associated with a current through the memristive element at a first voltage value and a second current value associated with the current through the memristive element at a second voltage value different from the first voltage value.

In Example 2, the method of Example 1 can optionally further include: setting (e.g., writing) the memristive element into the memristive state prior to applying the voltage pulse to the memristive element.

In Example 3, the subject matter of Example 1 or 2 can optionally include that the application of the first voltage value and the second voltage value does not change the memristive state of the memristive element. For example, the first voltage value and the second voltage value may be less than a programming voltage (e.g., write voltage) used to set (e.g., write) the memristive element into the memristive state.

In Example 4, the subject matter of any one of Examples 1 to 3 can optionally include that a maximum voltage value of the voltage pulse does not change the memristive state of the memristive element. For example, the maximum voltage value of the voltage pulse may be equal to or less than a programming voltage (e.g., write voltage) used to set (e.g., write) the memristive element into the memristive state.

In Example 5, the subject matter of any one of Examples 1 to 4 can optionally include that the voltage pulse and a programming voltage (e.g., write voltage) used to set (e.g., write) the memristive element into the memristive state are of the same polarity.

In Example 6, the subject matter of any one of Examples 1 to 5 can optionally include that the first current value and the second current value are measured during a rising edge of the applied voltage pulse.

In Example 7, the subject matter of any one of Examples 1 to 5 can optionally include that the first current value and the second current value are measured during a falling edge of the applied voltage pulse.

In Example 8, the subject matter of any one of Examples 1 to 7 can optionally include that measuring the first current value and the second current value includes: during a rising edge and/or a falling edge of the voltage pulse, measuring a current through the memristive element to determine a current/voltage characteristic of the memristive element, the measured current including the first current value and the second current value.

In Example 9, the method of any one of Examples 1 to 8 can optionally further include: applying a further voltage pulse (e.g., directly following) to the memristive element, the further voltage pulse having opposite polarity to the voltage pulse; during a falling edge of the applied further voltage pulse, measuring a third current value associated with the current through the memristive element at a third voltage value and a fourth current value associated with the current through the memristive element at a fourth voltage value different from the third voltage value.

Example 10 is a method including: applying a voltage pulse to a memristive element; during a falling edge of the applied voltage pulse, measuring a first current value associated with a current through the memristive element at a first voltage value and a second current value associated with the current through the memristive element at a second voltage value different from the first voltage value.

In Example 11, the method of Example 10 can optionally further include: setting (e.g., writing) the memristive element into a memristive state prior to applying the voltage pulse to the memristive element.

In Example 12, the subject matter of Example 11 can optionally include that the voltage pulse and a programming voltage (e.g., write voltage) used to set (e.g., write) the memristive element into the memristive state are of the same polarity.

In Example 13, the subject matter of Example 10 can optionally include that applying the voltage pulse to the memristive element includes setting (e.g., writing) the memristive element into a memristive state during a rising edge of the applied voltage pulse.

In Example 14, the method of any one of Examples 10 to 13 can optionally further include: applying a further voltage pulse (e.g., directly following) to the memristive element, the further voltage pulse having opposite polarity to the voltage pulse; during a falling edge of the applied further voltage pulse, measuring a third current value associated with the current through the memristive element at a third voltage value and a fourth current value associated with the current through the memristive element at a fourth voltage value different from the third voltage value.

In Example 15, the subject matter of any one of Examples 10 to 14 can optionally include that measuring the first current value and the second current value includes: measuring a current through the memristive element to determine a current/voltage characteristic of the memristive element, the measured current including the first current value and the second current value.

Example 16 is a method for determining static state parameter values of a memristive element, the method including: setting a (e.g., manufactured) memristive element into a memristive state of a plurality of memristive states, determining one or more static state parameter values of the memristive element associated with the memristive state, wherein determining the one or more static state parameter values includes: determining (e.g., measuring and, optionally, plotting) a current/voltage characteristic of the memristive element based on applying a read voltage sequence to the memristive element to cause a corresponding current sequence through the memristive element, fitting the current/voltage characteristic based on a physical model to determine the one or more static state parameter values, wherein the physical model is based on static state parameters for which the static state parameter values are determined.

In Example 17, the method of Example 16 can optionally further include: setting the memristive element into another memristive state of the plurality of memristive states, determining one or more other static state parameter values of the memristive element associated with the other memristive state, wherein determining the one or more other static state parameter values includes: determining (e.g., measuring and, optionally, plotting) another current/voltage characteristic of the memristive element based on applying a read voltage sequence (e.g., the same read voltage sequence or another read voltage sequence) to the memristive element to cause a corresponding current sequence through the memristive element, fitting the other current/voltage characteristic based on the physical model to determine the one or more other static state parameter values.

In Example 18, the method of Example 16 or 17 can optionally further include: simulating, based on the determined static state parameter values (e.g., the determined one or more static state parameter values and/or the determined one or more other static state parameter values), the behavior of a memristive circuit (e.g., via electronic circuit simulation) which includes one or more memristive elements configured in accordance with the (e.g., manufactured) memristive element.

In Example 19, the subject matter of Example 18 can optionally include that simulating the behavior of the memristive circuit includes: varying one or more simulation parameters associated with an operation of the memristive circuit.

In Example 20, the subject matter of Example 19 can optionally include that the one or more simulation parameters include at least one parameter from the following list of parameters: a temperature of the memristive element, a programming voltage for setting a memristive state, a read voltage for reading the memristive state of the memristive element, and/or a desired current through the memristive element responsive to applying a corresponding read voltage.

In Example 21, the subject matter of any one of Examples 18 to 20 can optionally include that the current/voltage characteristic of the memristive element is determined at a first temperature value; and wherein simulating the behavior of the memristive circuit includes simulating the behavior of the memristive circuit at a second temperature value different from the first temperature value.

In Example 22, the subject matter of any one of Examples 18 to 21 can optionally include that each determined static state parameter value is associated with a respective error; and wherein the simulation of the behavior of the memristive circuit is carried out in consideration of the respective error (e.g., as noise) of the determined static state parameter values.

In Example 23, the method of any one of Examples 18 to 22 can optionally further include: measuring a static state parameter value of at least one static state parameter; determining a difference between the measured static state parameter value and the static state parameter value determined for the at least one static state parameter via the physical model; and in the case that the determined difference is less than a predefined verification value, verify the determined static state parameter value.

In Example 24, the method of any one of Examples 18 to 23 can optionally further include: setting the memristive element into the other memristive states of the plurality of memristive states one after another; in each of the other memristive states of the plurality of memristive states, determining respective one or more static state parameter values of the memristive element to determine a functional correlation between the one or more static state parameter values and the memristive states; and wherein the simulation of the behavior of the memristive circuit is carried using the determined functional correlation.

In Example 25, the method of any one of Examples 16 to 24 can optionally further include: selecting (e.g., adapting), based on the determined static state parameter values (e.g., the determined one or more static state parameter values and/or the determined one or more other static state parameter values), operating parameters associated with an operation of the memristive element (e.g., as a function of the determined static state parameter values).

In Example 26, the subject matter of Example 25 can optionally include that the selected operating parameters include at least one operating parameter of the following list of operating parameters: a (e.g., respective) read voltage drop over the memristive element, a read current through the memristive element for reading the memristive state of the memristive element, a write voltage drop over the memristive element, a write current through the memristive element for writing the memristive state of the memristive element, a change in flux and/or a change in charge of the memristive element associated with a writing of the memristive element, and/or an operating temperature.

In Example 27, the subject matter of Example 24 or 25, provided that in combination with Example 17, can optionally include that the selected operating parameters include a programming voltage (e.g., write voltage) for setting the memristive element into a corresponding memristive state of the plurality of memristive states.

In Example 28, the subject matter of any one of Examples 25 to 27 can optionally include that selecting the operating parameters based on the determined static state parameter values includes adapting at least one operating parameter associated with the operation of the memristive element during use of the memristive element (e.g., allowing a reconfiguration in use due to possible changes (e.g., temperature)).

In Example 29, the method of Example 28 can optionally further include: operating the memristive element based on initial operating parameters and, after adapting the at least one operating parameter, operating the memristive element based on the adapted at least one operating parameter.

Example 30 is a for selecting operating parameters associated with an operation of a memristive device which includes a plurality of memristive elements, the method including: for each memristive element of the plurality of memristive elements, determining respective one or more static state parameter values in accordance with the method of Example 16; selecting, based on the static state parameter values determined for the plurality of memristive elements, the operating parameters associated with the operation of the memristive device.

In Example 31, the method according to any one of Examples 16 to 30 can optionally further include: determining (e.g., classifying), based on the determined static state parameter values (e.g., the determined one or more static state parameter values and/or the determined one or more other static state parameter values), whether the memristive state of the memristive element is associated with a first logic state (e.g., "0") or a second logic state (e.g., "1").

In Example 32, the method of any one of Examples 16 to 31 can optionally further include: determining (e.g., classifying), for at least one (e.g., for each) static state parameter value of the determined static state parameter values (e.g., the determined one or more static state parameter values and/or the determined one or more other static state parameter values), whether the at least one static state parameter value is within a predefined range associated with the at least one static state parameter value.

In Example 33, the method of Example 32 can optionally further include: in the case that the at least one static state parameter value is within the predefined range associated with the at least one static state parameter value, validating the memristive element.

In Example 34, the method of any one of Examples 16 to 31 can optionally further include: validating the memristive element in the case that each static state parameter value of the determined static state parameter values (e.g., the determined one or more static state parameter values and/or the determined one or more other static state parameter values) is within a respective predefined range.

Example 35 is a method for validating a memristive device which includes a plurality of memristive elements, the method including: for each memristive element of the plurality of memristive elements, determining respective one or more static state parameter values in accordance with the method of Example 16; for each static state parameter for which the one or more static state parameter values are determined, determining, whether the plurality of memristive elements fulfills one or more predefined criteria, wherein the plurality of memristive elements fulfill the one or more predefined criteria for a respective static state parameter in the case that a variation of the determined static state parameter values associated with the respective static state parameter between the plurality of memristive elements is equal to or less than a predefined threshold variation.

In Example 36, the subject matter of Example 35 can optionally include that the variation of the determined static state parameter values associated with the respective static state parameter is a deviation from an average value, the average value determined based on averaging the static state parameter values associated with the respective static state parameter over the plurality of memristive elements.

Example 37 is a method for validating memristive elements of a plurality of memristive elements, the method including: for each memristive element of the plurality of memristive elements, determining respective one or more static state parameter values in accordance with the method of Example 16; determining, whether a respective memristive element of the plurality of memristive elements fulfills one or more predefined criteria, wherein the respective memristive element fulfills the one or more predefined criteria in the case that each of the one or more static state parameter values determined for the respective memristive element fulfills a respective criterium, wherein a respective static state parameter value fulfills the criterium in the case that the respective static state parameter value is within a predefined range associated with the respective static state parameter for which the respective static state parameter value is determined; and validating the respective element in the case that the respective element fulfills the one or more predefined criteria.

In Example 38, the subject matter of Example 37 can optionally include that the predefined range associated with the respective static state parameter defines a deviation from an average value, the average value determined based on averaging the static state parameter values associated with the respective static state parameter over the plurality of memristive elements.

In Example 39, the method of Example 37 or 38 can optionally further include: invalidating the respective memristive element in the case that the respective element does not fulfill at least one of the one or more predefined criteria (invalidated memristive elements may, for example, not be addressed during use).

In Example 40, the method according to any one of Examples 16 to 39 can optionally further include: setting the memristive element into the other memristive states of the plurality of memristive states one after another; in each of the other memristive states of the plurality of memristive states, determining respective one or more static state parameter values of the memristive element in accordance with the method of Example 16 to determine a functional correlation between the one or more static state parameter values and the memristive states.

Example 41 is a method for determining static state parameter values of a memristive element as a function of a memristive state of the memristive element, the method including: setting the memristive element into each memristive state of the plurality of memristive states one after another; in each memristive state of the plurality of memristive states, determining respective one or more static state parameter values of the memristive element in accordance with the method of Example 16 to determine a functional correlation between the one or more static state parameter values and the memristive states.

In Example 42, the subject matter of Example 40 or 41 can optionally include that setting the memristive element into a respective memristive state of the plurality of memristive states includes applying a programming voltage associated with the respective memristive state to the memristive element.

In Example 43, the subject matter of any one of Examples 16 to 42 can optionally include that the one or more static state parameters are correlated to (e.g., electrical and/or manufacturing-related) properties of the memristive element.

In Example 44, the subject matter of any one of Examples 16 to 43 can optionally include that the one or more static state parameters characterize the memristive element.

In Example 45, the subject matter of any one of Examples 16 to 44 can optionally include that the one or more static state parameters include at least one parameter of the following list of parameters: a series resistance of the memristive device, an ideality factor of the memristive device, a reverse saturation current of the memristive device, and/or barrier potential of the memristive device.

In Example 46, the subject matter of any one of Examples 16 to 45 can optionally include that the current/voltage characteristic is fitted according to:

$$V = A\frac{k_B T}{q}\log\left(\frac{I}{B}+1\right)\left(1 + C\frac{k_B T}{q}\log\left(\frac{I}{B}+1\right)\right) + I \cdot D,$$

wherein: V is the applied read voltage, I is the (read) current through the memristive element responsive to applying the read voltage, $k_B$ is the Boltzmann constant, T is the temperature of the memristive element, q is the electron charge, and A, B, C, and D are fitting parameters.

In Example 47, the subject matter of Example 46 can optionally include that: A and C represent an ideality of the memristive element; and/or that B represents a reverse saturation current, $I_S$, through the memristive element responsive to applying the read voltage; and/or that D represents a series resistance, $R_S$, of the memristive element.

Example 48 is a device (e.g., a memory device, a storage device, a processing device) including: at least one memristive element including a memristive state of a plurality of memristive states; and a read circuit configured to: determine the memristive state of the at least one memristive element based on at least two measurements during a single read-out operation, the at least two measurements using different read-out voltage values or different read-out current values.

In Example 49, the subject matter of Example 48 can optionally include that each measurement of the at least two read-out measurements includes: measuring an electric current through the at least one memristive element responsive to applying a respective read voltage or measuring a voltage drop over the at least one memristive element responsive to applying a respective read current.

In Example 50, the subject matter of Example 48 or 49 can optionally include that the read circuit is configured to: carry out, during the single read-out operation, a first measurement to determine a first expected memristive state of the at least one memristive element, carry out, during the single read-out operation, a second measurement to determine a second expected memristive state of the at least one memristive element, and determine the memristive state of the at least one memristive element based on the determined first expected memristive state and the determined second expected memristive state.

In Example 51, the subject matter of Example 50 can optionally include that the read circuit is configured to: determine, whether the first expected memristive state corresponds to the second expected memristive state, and in the case that the first expected memristive state corresponds to the second expected memristive state, determine the first expected memristive state as the memristive state of the at least one memristive element.

In Example 52, the subject matter of Examples 49 and 51 can optionally include that the read circuit is configured to, in the case that the first expected memristive state does not correspond to the second expected memristive state: carry out (two or more) further measurements during the single read-out operation to determine a current/voltage characteristic of the at least one memristive element, fit the current/voltage characteristic based on a physical model to determine one or more static state parameter values, wherein the physical model is based on static state parameters for which the static state parameter values are determined, and determine the memristive state of the at least one memristive element based on the determined one or more static state parameter values.

In Example 53, the subject matter of Example 52 can optionally include that the read circuit is configured to determine, based on the determined one or more static state parameter values, whether the memristive state is associated with a first logic state (e.g., "0") or a second logic state (e.g., "1").

Example 54 is a device including: (e.g., a memory/ storage, such as an n-logic memory, including) a plurality of memristive elements (e.g., including the same memristive state or different memristive states) (e.g., serving as physical unclonable function, PUF, due to manufacturing differences); a read circuit (read-out circuit) configured to read out logic states of the plurality of memristive elements, wherein the read circuit is configured to read out a logic state of a respective memristive element of the plurality of memristive elements via at least two measurements during a single read-out operation, and based on determining, based on the at least two measurements, whether the logic state of the respective memristive element is associated with a first logic state (e.g., "0") or a second logic state (e.g., "1") wherein each measurement of the at least two measurements is associated with a respective measurement point (e.g., different read-out voltage values or different read-out current values) different from the measurement points of the other measurements; and one or more processors configured to generate a key (e.g., a private key, an authentication key) based on the logic states determined for the plurality of memristive elements.

In Example 55, the subject matter of Example 54 can optionally include that the read circuit is configured to determine that the logic state of the respective memristive element is associated with the first logic state in the case that the read circuit determines the first logic state for each measurement of the at least two measurements; and wherein the read circuit is configured to determine that the logic state of the respective memristive element is associated with the second logic state in the case that the read circuit determines the second logic state for each measurement of the at least two measurements.

In Example 56, the subject matter of Example 54 or 55 can optionally include that the read circuit is configured to: carry out, during the single read-out operation, a first measurement of the at least two measurements to determine a first expected logic state of the respective memristive element, carry out, during the single read-out operation, a second measurement of the at least two measurements to determine a second expected logic state of the respective memristive element, and in the case that the first expected logic state corresponds to the second expected logic state, determine the first expected logic state as the logic state of the respective memristive element.

In Example 57, the subject matter of Example 56 can optionally include that the read circuit is configured to: in the case that the first expected logic state does not correspond to the second expected logic state, carry out, during the single read-out operation, a third measurement to determine a third expected logic state of the respective memristive element, and in the case that the third expected logic state corresponds to the first expected logic state or to the second expected logic state, determine the third expected logic state as the logic state of the respective memristive element.

In Example 58, the subject matter of Example 56 can optionally include that the read circuit is configured to: in the case that the first expected logic state does not correspond to the second expected logic state, carry out, during the single read-out operation, (two or more) further measurements to determine a current/voltage characteristic of the respective memristive element, fit the current/voltage characteristic based on a physical model to determine one or more static state parameter values, wherein the physical model is based on static state parameters for which the static state parameter values are determined, and determine, based on the determined one or more static state parameter values, whether the respective memristive element is associated with the first logic state or the second logic state.

In Example 59, the subject matter of any one of Examples 54 to 58 can optionally include that each memristive element of the plurality of memristive elements includes a respective memristive state which is within a predefined subrange of a plurality of memristive states.

In Example 60, the subject matter of any one of Examples 54 to 58 can optionally include that each memristive element of the plurality of memristive elements includes the same memristive state of a plurality of memristive states.

Example 61 is a device including: (e.g., a memory/ storage, such as an n-logic memory, including) a plurality of memristive elements (e.g., including the same memristive state or different memristive states) (e.g., serving as physical unclonable function, PUF, due to manufacturing differences); a read circuit (also referred to as read-out circuit) configured to read out the plurality of memristive elements, wherein the read circuit is configured to read out a respective memristive element of the plurality of memristive elements based on determining a current/voltage characteristic of the respective memristive element, wherein the read circuit is configured to determine the current/voltage characteristic of the respective memristiveelement based on applying a read voltage sequence to the respective memristive element to cause a corresponding current sequence through the respective memristive element; and one or more processors configured to: determine respective one or more static state parameter values for each memristive element of the plurality of memristive elements, wherein the determination of the one or more static state parameter values for a respective memristive element of the plurality of memristive elements includes: fitting the current/voltage characteristic determined for the respective memristive element based on a physical model to determine the one or more static state parameter values, wherein the physical model is based on static state parameters for which the static state parameter values are determined; and generate a key (e.g., a private key, an authentication key) based on the one or more static state parameter values respectively determined for each of the plurality of memristive elements.

Example 62 is a device including: (e.g., a memory/ storage, such as an n-logic memory, including) a plurality of memristive elements (e.g., including the same memristive state or different memristive states) (e.g., serving as physical unclonable function, PUF, due to manufacturing differences); a read circuit (also referred to as read-out circuit) configured to read out the plurality of memristive elements, wherein the read circuit is configured to read out a respective memristive element of the plurality of memristive elements based on determining a current/voltage characteristic of the respective memristive element, wherein the read circuit is configured to determine the current/voltage characteristic of the respective memristive based on applying a read current sequence to the respective memristive element to cause a corresponding voltage drop over the respective memristive element; and one or more processors configured to: determine respective one or more static state parameter values for each memristive element of the plurality of memristive elements, wherein the determination of the one or more static state parameter values for a respective memristive element of the plurality of memristive elements includes: fitting the current/voltage characteristic determined for the respective memristive element based on a physical model to determine the one or more static state parameter values, wherein the physical model is based on static state parameters for which the static state parameter values are determined; and generate a key (e.g., a private key, an authentication key) based on the one or more static state parameter values respectively determined for each of the plurality of memristive elements.

In Example 63, the subject matter of Example 61 or 62 can optionally include that each memristive element of the plurality of memristive elements includes a respective memristive state of a plurality of memristive states, wherein the memristive states of the plurality of memristive elements are (e.g., randomly) distributed over the plurality of memristive states.

In Example 64, the subject matter of any one of Examples 54 to 63 can optionally include that the plurality of memristive states has a number of memristive states equal to or greater than 50 (e.g., equal to or greater than 100, e.g., equal to or greater than 500, etc.).

In Example 65, the subject matter of any one of Examples 54 to 64 can optionally include that the one or more processors are configured to generate the key based on: determining a respective logic state for each memristive element of the plurality of memristive elements, wherein determining a respective logic state for a respective memristive element includes: classifying the respective memristive element into a group of two or more groups based on the one or more static state parameter values determined for the respective memristive element, wherein each group of the two or more groups is bijectively assigned to a respective logic state; and generating the key based on the respective logic state each memristive element of the plurality of memristive elements.

In Example 66, the subject matter of any one of Examples 54 to 65 can optionally include that the one or more processors are further configured to generate a cryptographic key based on applying an encryption algorithm on the key.

In Example 67, the subject matter of any one of Examples 54 to 66 can optionally include that the one or more processors are further configured to generate (e.g., using a shift register) random numbers using the key.

In Example 68, the device of any one of Examples 54 to 67 can optionally further include: a write circuit configured to write each memristive element of the plurality of memristive elements into a respective memristive state of a plurality of memristive states (e.g., based on applying a respective write voltage) (e.g., making the device a reconfigurable PUF).

In Example 69, the device of Example 68 can optionally further include: a random number generator configured to generate random numbers; wherein the write circuit is configured to select the memristive state into which a respective memristive element of the plurality of memristive elements is to be written from the plurality of memristive states based on a random number generated by the random number generator (randomly writing the reconfigurable PUF).

Example 70 is a hardware security module including the device according to any one of Examples 54 to 69.

Example 71 is a (e.g., USB) security key including the device according to any one of Examples 54 to 69.

Example 72 is a secure cryptoprocessor including the device according to any one of Examples 54 to 69.

Example 73 is a method including: applying a current pulse to a memristive element which is set (e.g., written) into a memristive state; during applying the current pulse to the memristive element, measuring a first voltage value associated with a voltage drop over the memristive element at a first current value and a second voltage value associated with the voltage drop over the memristive element at a second current value different from the first current value.

In Example 74, the method of Example 73 can optionally further include: setting (e.g., writing) the memristive element into the memristive state prior to applying the current pulse to the memristive element.

In Example 75, the subject matter of Example 73 or 74 can optionally include that the application of the first current value and the second current value does not change the memristive state of the memristive element. For example, the first current value and the second current value may be less than a programming current (e.g., write current) used to set (e.g., write) the memristive element into the memristive state.

In Example 76, the subject matter of any one of Examples 73 to 75 can optionally include that a maximum voltage value of the voltage pulse does not change the memristive state of the memristive element. For example, the maximum voltage value of the voltage pulse may be equal to or less than a programming voltage (e.g., write voltage) used to set (e.g., write) the memristive element into the memristive state.

In Example 77, the subject matter of any one of Examples 73 to 76 can optionally include that the current pulse and a programming current (e.g., write current) used to set (e.g., write) the memristive element into the memristive state are of the same polarity.

In Example 78, the subject matter of any one of Examples 73 to 77 can optionally include that the first voltage value and the second voltage value are measured during a rising edge of the applied current pulse.

In Example 79, the subject matter of any one of Examples 73 to 77 can optionally include that the first voltage value and the second voltage value are measured during a falling edge of the applied current pulse.

In Example 80, the subject matter of any one of Examples 73 to 79 can optionally include that measuring the first voltage value and the second voltage value includes: during a rising edge and/or a falling edge of the voltage pulse, measuring a voltage at the memristive element to determine a current/voltage characteristic of the memristive element, the measured voltage including the first voltage value and the second voltage value.

In Example 81, the method of any one of Examples 73 to 80 can optionally further include: applying a further current pulse (e.g., directly following) to the memristive element, the further current pulse having opposite polarity to the current pulse; during a falling edge of the applied further current pulse, measuring a third voltage value associated with the voltage drop over the memristive element at a third current value and a fourth voltage value associated with the voltage drop over the memristive element at a fourth current value different from the third current value.

Example 82 is a method including: applying a current pulse to a memristive element; during a falling edge of the applied current pulse, measuring a first voltage value associated with a voltage drop over the memristive element at a first current value and a second voltage value associated with the voltage drop over the memristive element at a second current value different from the first current value.

In Example 83, the method of Example 82 can optionally further include: setting (e.g., writing) the memristive element into a memristive state prior to applying the current pulse to the memristive element.

In Example 84, the subject matter of Example 83 can optionally include that the current pulse and a programming current (e.g., write current) used to set (e.g., write) the memristive element into the memristive state are of the same polarity.

In Example 85, the subject matter of Example 82 can optionally include that applying the current pulse to the memristive element includes setting (e.g., writing) the memristive element into a memristive state during a rising edge of the applied current pulse.

In Example 86, the method of any one of Examples 82 to 85 can optionally further include: applying a further current pulse (e.g., directly following) to the memristive element, the further current pulse having opposite polarity to the current pulse; during a falling edge of the applied further current pulse, measuring a third voltage value associated with the voltage drop over the memristive element at a third current value and a fourth voltage value associated with the voltage drop over the memristive element at a fourth current value different from the third current value.

In Example 87, the subject matter of any one of Examples 82 to 86 can optionally include that measuring the first voltage value and the second voltage value includes: measuring a voltage at the memristive element to determine a current/voltage characteristic of the memristive element, the measured voltage including the first voltage value and the second voltage value.

Example 88 is a method for determining static state parameter values of a memristive element, the method including: setting a (e.g., manufactured) memristive element into a memristive state of a plurality of memristive states, determining one or more static state parameter values of the memristive element associated with the memristive state, wherein determining the one or more static state parameter values includes: determining (e.g., measuring and, optionally, plotting) a current/voltage characteristic of the memristive element based on applying a read current sequence to the memristive element to cause a corresponding voltage sequence at the memristive element, fitting the current/voltage characteristic based on a physical model to determine the one or more static state parameter values, wherein the physical model is based on static state parameters for which the static state parameter values are determined.

In Example 89, the method of Example 88 can optionally further include: setting the memristive element into another memristive state of the plurality of memristive states, determining one or more other static state parameter values of the memristive element associated with the other memristive state, wherein determining the one or more other static state parameter values includes: determining (e.g., measuring and, optionally, plotting) another current/voltage characteristic of the memristive element based on applying a read current sequence (e.g., the same read voltage sequence or another read voltage sequence) to the memristive element to cause a corresponding voltage sequence at (hence a sequence of voltage drops over) the memristive element, fitting the other current/voltage characteristic based on the physical model to determine the one or more other static state parameter values.

In Example 90, the method of Example 88 or 89 can optionally further include: simulating, based on the determined static state parameter values (e.g., the determined one or more static state parameter values and/or the determined one or more other static state parameter values), the behavior of a memristive circuit (e.g., via electronic circuit simulation) which includes one or more memristive elements configured in accordance with the (e.g., manufactured) memristive element.

In Example 91, the subject matter of Example 90 can optionally include that simulating the behavior of the memristive circuit includes: varying one or more simulation parameters associated with an operation of the memristive circuit.

In Example 92, the subject matter of Example 91 can optionally include that the one or more simulation parameters include at least one parameter from the following list of parameters: a temperature of the memristive element, a programming voltage for setting a memristive state, a read voltage for reading the memristive state of the memristive element, and/or a desired current through the memristive element responsive to applying a corresponding read voltage.

In Example 93, the subject matter of any one of Examples 90 to 92 can optionally include that the current/voltage characteristic of the memristive element is determined at a first temperature value; and wherein simulating the behavior of the memristive circuit includes simulating the behavior of the memristive circuit at a second temperature value different from the first temperature value.

In Example 94, the subject matter of any one of Examples 90 to 93 can optionally include that each determined static state parameter value is associated with a respective error; and wherein the simulation of the behavior of the memristive circuit is carried out in consideration of the respective error (e.g., as noise) of the determined static state parameter values.

In Example 95, the method of any one of Examples 90 to 94 can optionally further include: measuring a static state parameter value of at least one static state parameter; determining a difference between the measured static state parameter value and the static state parameter value determined for the at least one static state parameter via the physical model; and in the case that the determined difference is less than a predefined verification value, verify the determined static state parameter value.

In Example 96, the method of any one of Examples 90 to 95 can optionally further include: setting the memristive element into the other memristive states of the plurality of memristive states one after another; in each of the other memristive states of the plurality of memristive states, determining respective one or more static state parameter values of the memristive element to determine a functional correlation between the one or more static state parameter values and the memristive states; and wherein the simulation of the behavior of the memristive circuit is carried using the determined functional correlation.

In Example 97, the method of any one of Examples 88 to 96 can optionally further include: selecting (e.g., adapting), based on the determined static state parameter values (e.g., the determined one or more static state parameter values and/or the determined one or more other static state parameter values), operating parameters associated with an operation of the memristive element (e.g., as a function of the determined static state parameter values).

In Example 98, the subject matter of Example 97 can optionally include that the selected operating parameters include at least one operating parameter of the following list of operating parameters: a (e.g., respective) read voltage drop over the memristive element, a read current through the memristive element for reading the memristive state of the memristive element, a write voltage drop over the memristive element, a write current through the memristive element for writing the memristive state of the memristive element, a change in flux and/or a change in charge of the memristive element associated with a writing of the memristive element, and/or an operating temperature.

In Example 99, the subject matter of Example 96 or 97, provided that in combination with Example 92, can optionally include that the selected operating parameters include a programming current (e.g., write current) for setting the memristive element into a corresponding memristive state of the plurality of memristive states.

In Example 100, the subject matter of any one of Examples 97 to 99 can optionally include that selecting the operating parameters based on the determined static state parameter values includes adapting at least one operating parameter associated with the operation of the memristive element during use of the memristive element (e.g., allowing a reconfiguration in use due to possible changes (e.g., temperature)).

In Example 101, the method of Example 100 can optionally further include: operating the memristive element based on initial operating parameters and, after adapting the at least one operating parameter, operating the memristive element based on the adapted at least one operating parameter.

Example 102 is a for selecting operating parameters associated with an operation of a memristive device which includes a plurality of memristive elements, the method including: for each memristive element of the plurality of memristive elements, determining respective one or more static state parameter values in accordance with the method of Example 88; selecting, based on the static state parameter values determined for the plurality of memristive elements, the operating parameters associated with the operation of the memristive device.

In Example 103, the method according to any one of Examples 88 to 102 can optionally further include: determining (e.g., classifying), based on the determined static state parameter values (e.g., the determined one or more static state parameter values and/or the determined one or more other static state parameter values), whether the memristive state of the memristive element is associated with a first logic state (e.g., "0") or a second logic state (e.g., "1").

In Example 104, the method of any one of Examples 88 to 103 can optionally further include: determining (e.g., classifying), for at least one (e.g., for each) static state parameter value of the determined static state parameter values (e.g., the determined one or more static state parameter values and/or the determined one or more other static state parameter values), whether the at least one static state parameter value is within a predefined range associated with the at least one static state parameter value.

In Example 105, the method of Example 104 can optionally further include: in the case that the at least one static state parameter value is within the predefined range associated with the at least one static state parameter value, validating the memristive element.

In Example 106, the method of any one of Examples 88 to 103 can optionally further include: validating the memristive element in the case that each static state parameter value of the determined static state parameter values (e.g., the determined one or more static state parameter values and/or the determined one or more other static state parameter values) is within a respective predefined range.

Example 107 is a method for validating a memristive device which includes a plurality of memristive elements, the method including: for each memristive element of the plurality of memristive elements, determining respective one or more static state parameter values in accordance with the method of Example 88; for each static state parameter for which the one or more static state parameter values are determined, determining, whether the plurality of memristive elements fulfills one or more predefined criteria, wherein the plurality of memristive elements fulfill the one or more predefined criteria for a respective static state parameter in the case that a variation of the determined static state parameter values associated with the respective static state parameter between the plurality of memristive elements is equal to or less than a predefined threshold variation.

In Example 108, the subject matter of Example 107 can optionally include that the variation of the determined static state parameter values associated with the respective static state parameter is a deviation from an average value, the average value determined based on averaging the static state parameter values associated with the respective static state parameter over the plurality of memristive elements.

Example 109 is a method for validating memristive elements of a plurality of memristive elements, the method including: for each memristive element of the plurality of memristive elements, determining respective one or more static state parameter values in accordance with the method of Example 88; determining, whether a respective memristive element of the plurality of memristive elements fulfills one or more predefined criteria, wherein the respective memristive element fulfills the one or more predefined criteria in the case that each of the one or more static state parameter values determined for the respective memristive element fulfills a respective criterium, wherein a respective static state parameter value fulfills the criterium in the case that the respective static state parameter value is within a predefined range associated with the respective static state parameter for which the respective static state parameter value is determined; and validating the respective element in the case that the respective element fulfills the one or more predefined criteria.

In Example 110, the subject matter of Example 109 can optionally include that the predefined range associated with the respective static state parameter defines a deviation from an average value, the average value determined based on averaging the static state parameter values associated with the respective static state parameter over the plurality of memristive elements.

In Example 111, the method of Example 109 or 110 can optionally further include: invalidating the respective memristive element in the case that the respective element does not fulfill at least one of the one or more predefined criteria (invalidated memristive elements may, for example, not be addressed during use).

In Example 112, the method according to any one of Examples 88 to 111 can optionally further include: setting the memristive element into the other memristive states of the plurality of memristive states one after another; in each of the other memristive states of the plurality of memristive states, determining respective one or more static state parameter values of the memristive element in accordance with the method of Example 88 to determine a functional correlation between the one or more static state parameter values and the memristive states.

Example 113 is a method for determining static state parameter values of a memristive element as a function of a memristive state of the memristive element, the method including: setting the memristive element into each memristive state of the plurality of memristive states one after another; in each memristive state of the plurality of memristive states, determining respective one or more static state parameter values of the memristive element in accordance with the method of Example 88 to determine a functional correlation between the one or more static state parameter values and the memristive states.

In Example 114, the subject matter of Example 112 or 113 can optionally include that setting the memristive element into a respective memristive state of the plurality of memristive states includes applying a programming voltage associated with the respective memristive state to the memristive element.

In Example 115, the subject matter of any one of Examples 88 to 114 can optionally include that the one or more static state parameters are correlated to (e.g., electrical and/or manufacturing-related) properties of the memristive element.

In Example 116, the subject matter of any one of Examples 88 to 115 can optionally include that the one or more static state parameters characterize the memristive element.

In Example 117, the subject matter of any one of Examples 88 to 116 can optionally include that the one or more static state parameters include at least one parameter of the following list of parameters: a series resistance of the memristive device, an ideality factor of the memristive device, a reverse saturation current of the memristive device, and/or barrier potential of the memristive device.

In Example 118, the subject matter of any one of Examples 88 to 117 can optionally include that the current/voltage characteristic is fitted according to:

$$V = A\frac{k_B T}{q}\log\left(\frac{I}{B}+1\right)\left(1+C\frac{k_B T}{q}\log\left(\frac{I}{B}+1\right)\right)+I\cdot D,$$

wherein: V is the applied read voltage, I is the (read) current through the memristive element responsive to applying the read voltage, $k_B$ is the Boltzmann constant, T is the temperature of the memristive element, q is the electron charge, and A, B, C, and D are fitting parameters.

In Example 119, the subject matter of Example 118 can optionally include that: A and C represent an ideality of the memristive element; and/or that B represents a reverse saturation current, $I_S$, through the memristive element responsive to applying the read voltage; and/or that D represents a series resistance, $R_S$, of the memristive element.

Example 120 is a method including: setting a memristive element into a memristive state of a plurality of memristive states, determining one or more static state parameter values of the memristive element associated with the memristive state, wherein determining the one or more static state parameter values includes: determining a current/voltage characteristic of the memristive element, and fitting the current/voltage characteristic based on a physical model to determine the one or more static state parameter values, wherein the physical model is based on static state parameters for which the static state parameter values are determined.

In Example 121, the subject matter of Example 120 can optionally include that determining the current/voltage characteristic of the memristive element includes: causing a read voltage drop sequence over the memristive element and determining a corresponding read current sequence through the memristive element; and/or causing a read current sequence through the memristive element and determining a corresponding read voltage drop sequence over the memristive element.

In Example 122, the subject matter of Example 120 or 121 can optionally further include: simulating, based on the determined static state parameter values, the behavior of a memristive circuit which includes one or more memristive elements configured in accordance with the memristive element.

In Example 123, the subject matter of Example 122 can optionally include that simulating the behavior of the memristive circuit includes: varying one or more simulation parameters associated with an operation of the memristive circuit.

In Example 124, the subject matter of Example 123 can optionally include that the one or more simulation parameters include at least one parameter from the following list of parameters: a temperature of the memristive element, a programming voltage for setting a memristive state, a read voltage for reading the memristive state of the memristive element, and/or a desired current through the memristive element responsive to applying a corresponding read voltage.

In Example 125, the subject matter of any one of Examples 122 to 124 can optionally include that the current/voltage characteristic of the memristive element is determined at a first temperature value; and wherein simulating the behavior of the memristive circuit includes simulating the behavior of the memristive circuit at a second temperature value different from the first temperature value.

In Example 126, the subject matter of any one of Examples 122 to 125 can optionally include that each determined static state parameter value is associated with a respective error; and wherein the simulation of the behavior of the memristive circuit is carried out in consideration of the respective error of the determined static state parameter values.

In Example 127, the method of any one of Examples 122 to 126 can optionally further include: measuring a static state parameter value of at least one static state parameter; determining a difference between the measured static state parameter value and the static state parameter value determined for the at least one static state parameter via the physical model; and in the case that the determined difference is less than a predefined verification value, verify the determined static state parameter value.

In Example 128, the method of any one of Examples 122 to 127 can optionally further include: setting the memristive element into two or more other memristive states of the plurality of memristive states one after another; in each of the two or more other memristive states of the plurality of memristive states, determining respective one or more static state parameter values of the memristive element to determine a functional correlation between the one or more static state parameter values and the memristive states; and wherein the simulation of the behavior of the memristive circuit is carried using the determined functional correlation.

In Example 129, the method of any one of Examples 120 to 128 can optionally further include: selecting, based on the determined static state parameter values, operating parameters associated with an operation of the memristive element.

In Example 130, the subject matter of Example 129 can optionally include that the selected operating parameters include at least one operating parameter of the following list of operating parameters: a read voltage or read current for reading the memristive state of the memristive element, and/or an operating temperature.

In Example 131, the subject matter of Example 129 or 130 can optionally include that selecting the operating parameters based on the determined static state parameter values includes adapting at least one operating parameter associated with the operation of the memristive element during use of the memristive element.

In Example 132, the method of Example 131 can optionally further include: operating the memristive element based on initial operating parameters and, after adapting the at least one operating parameter, operating the memristive element based on the adapted at least one operating parameter.

In Example 133, the method of any one of Examples 120 to 132 can optionally further include: determining, based on the determined static state parameter values, whether the memristive state of the memristive element is associated with a first logic state or a second logic state.

In Example 134, the method of any one of Examples 120 to 133 can optionally further include: determining, for at least one static state parameter value of the determined static state parameter values, whether the at least one static state parameter value is within a predefined range associated with the at least one static state parameter value; and in the case that the at least one static state parameter value is within the predefined range associated with the at least one static state parameter value, validating the memristive element.

In Example 135, the subject matter of any one of Examples 120 to 134 can optionally include that the one or more static state parameters are correlated to properties of the memristive element.

In Example 136, the subject matter of any one of Examples 120 to 135 can optionally include that the one or more static state parameters include at least one parameter of the following list of parameters: a series resistance of the memristive device, an ideality factor of the memristive device, a reverse saturation current of the memristive device, and/or barrier potential of the memristive device.

In Example 137, the subject matter of any one of Examples 120 to 136 can optionally include that the current/voltage characteristic is fitted according to:

$$V = A\frac{k_B T}{q}\log\left(\frac{I}{B}+1\right)\left(1+C\frac{k_B T}{q}\log\left(\frac{I}{B}+1\right)\right)+I\cdot D,$$

wherein: V is the applied read voltage, I is the current through the memristive element responsive to applying the read voltage, $k_B$ is the Boltzmann constant, T is the temperature of the memristive element, q is the electron charge, and A, B, C, and D are fitting parameters.

In Example 138, the subject matter of Example 137 can optionally include that: A and C represent an ideality of the memristive element; and/or B represents a reverse saturation current, $I_S$, through the memristive element responsive to applying the read voltage; and/or D represents a series resistance, $R_S$, of the memristive element.

In Example 139, the method of Example 137 or 138 can optionally further include: wherein fitting the current/voltage characteristic based on the physical model includes: determining a corrected current/voltage characteristic based on correcting for ferroelectric polarization effects, and fitting the corrected current/voltage characteristic based on the physical model.

Example 140 is a method for validating a memristive device which includes a plurality of memristive elements, the method including: setting each memristive element of the plurality of memristive elements into a respective memristive state based on applying a same programming voltage or a same programming current; for each memristive element of the plurality of memristive elements, determining respective one or more static state parameter values wherein determining the one or more static state parameter values of a respective memristive element includes: determining a current/voltage characteristic of the respective memristive element, and fitting the current/voltage characteristic based on a physical model to determine the one or more static state parameter values, wherein the physical model is based on static state parameters for which the static state parameter values are determined; for each static state parameter for which the one or more static state parameter values are determined, determining, whether the plurality of memristive elements fulfills one or more predefined criteria, wherein the plurality of memristive elements fulfill the one or more predefined criteria for a respective static state parameter in the case that a variation of the determined static state parameter values associated with the respective static state parameter between the plurality of memristive elements is equal to or less than a predefined threshold variation.

It is understood that a device (e.g., a device according to any one of Examples 48 to 71) may be configured to carry out one or more of the methods according to Examples 1 to 47 and/or according to Example 73 to 140.

The term "using" as described according to various aspects may be understood in terms of "based on" or as a "function of" or "by". The term "based on" as described according to various aspects may be understood in terms of "by" or as a "function of".

It is noted that various measurement routines can be used for current/voltage measurement to determine a functional relationship between a voltage drop and a corresponding electric current, e.g., current controlled measurement (e.g., setting a current and measuring a corresponding voltage) or a voltage controlled measurement (e.g., setting a voltage and measuring a corresponding current), e.g., a flux controlled measurement (e.g., setting a time and a time dependent voltage and measuring a corresponding time dependent current, e.g., measuring a charge as a time integral of the time dependent current), e.g., a charge controlled measurement (e.g., setting a time and a time dependent current and measuring a corresponding time dependent voltage, e.g., measuring a flux as a time integral of the time dependent voltage).

The term "determine" as described according to various aspects may be understood in some aspects to include one or more aspects of "measuring", "modelling", "plotting", "fitting", and the like. However, a measurement may include a certain degree of modelling, plotting, fitting as well.

Example 141 is a method including: writing a memristive element (in some aspects referred to as memristive structure) into a memristive state of a plurality of memristive states; during writing the memristive element, determining (e.g., measuring or setting for a measurement) a first current value associated with a current through the memristive element at a first voltage value and determining (e.g., measuring or setting for a measurement) a second current value associated with a current through the memristive element at a second voltage value different from the first voltage value.

In Example 142, the method of Example 141 can optionally further include: after writing the memristive element into the memristive state, writing the memristive element into another memristive state of the plurality of memristive states different from the memristive state; and determining a third current value associated with a current through the memristive element at a third voltage value (e.g., different from the first and second voltage value) and determining a fourth current value associated with a current through the memristive element at a fourth voltage value different from the third voltage value (e.g., and different from the first and second voltage value).

According to various aspects, writing the memristive element into any one of the plurality of memristive states may include a write operation. The write operation may be configured (e.g., based on supplying one or more write signals to the memristive element) to provide one or more write voltage drops (e.g., in a flux controlled write operation) over the memristive element and/or one or more write currents (e.g., in a current controlled write operation) through the memristive element. The memristive state that is actually written by the write operation may be, according to various aspects, defined by the change of the flux and/or of the charge caused by the write operation. The change in the flux can be defined by a time integral of the applied voltage and the change of the charge can be defined by a time integral of the applied current. In the charge/flux-characteristics of the memristive element, each charge value is unambiguously assigned to a corresponding positive flux value and to a corresponding negative flux value. The charge/flux-characteristics has a hysteretic behavior associated therewith that is associated with memristive functions of the memristive element.

In Example 143, the subject matter of Example 141 or 142 can optionally include that the first current value and the second current value are measured in accordance with a rising edge of an applied write voltage pulse. In other words, the first voltage value and the second voltage value may be at a same rising edge of a write voltage pulse.

In Example 144, the subject matter of Example 142 or 143 can optionally include that the third current value and the fourth current value are measured in accordance with another rising edge of another applied write voltage pulse. In other words, the third voltage value and the fourth voltage value may be at a same rising edge of another write voltage pulse.

In Example 145, the subject matter of Example 142 or 143 can optionally include that the third current value and the fourth current value are measured in accordance with the same rising edge of the write voltage pulse used to determine the first current value and the second current value. In other words, the first voltage value, the second voltage value, third voltage value, and the fourth voltage value may be at a same rising edge of a write voltage pulse.

Example 146 is a method for determining dynamic state parameter values of a memristive element, the method including: setting a (e.g., manufactured) memristive element into a memristive state of a plurality of memristive states, determining one or more static state parameter values of the memristive element associated with the memristive state, wherein determining the one or more static state parameter values includes: determining (e.g., measuring and, optionally, plotting) a current/voltage characteristic of the memristive element based on applying a read voltage sequence to the memristive element to cause a corresponding current sequence through the memristive element, fitting the current/voltage characteristic based on a physical model to determine the one or more static state parameter values, wherein the physical model is based on static state parameters for which the static state parameter values are determined.

Example 147 is a method determining dynamic state parameter values of a memristive element, the method including: setting a (e.g., manufactured) memristive element into an initial memristive state of a plurality of memristive states, determining one or more static state parameter values of the memristive element associated with the initial memristive state, wherein determining the one or more static state parameter values includes: determining (e.g., measuring and, optionally, plotting) a current/voltage characteristic of the memristive element based on applying a read voltage sequence to the memristive element to cause a corresponding current sequence through the memristive element, fitting the current/voltage characteristic based on a physical model to determine the one or more static state parameter values, wherein the physical model is based on static state parameters for which the static state parameter values are determined. Applying a write voltage or a write current to the memristive element and measuring the corresponding write current or the corresponding write voltage, determining one or more static state parameter values of the memristive element associated with the final memristive state, wherein determining the one or more static state parameter values includes: determining (e.g., measuring and, optionally, plotting) a current/voltage characteristic of the memristive element based on applying a read voltage sequence to the memristive element to cause a corresponding current sequence through the memristive element, fitting the current/voltage characteristic based on a physical model to determine the one or more static state parameter values associated with the final memristive state of the memristive element, wherein the physical model is based on static state parameters for which the static state parameter values are determined. Fitting the current/voltage characteristic curve of the memristive element during writing it from the initial memristive state to the final memristive state characterized based on a physical model to determine the one or more dynamic state parameter values associated with the change from the initial memristive state to the final memristive state.

The physical model describing the current/voltage characteristics of a memristive element associated with the writing operation from an initial memristive state to a final memristive state is described in the following. We state that the index "1" refers to properties related with the top electrode of the memristive structure and that the index "2" refers to properties related with the bottom electrode of the memristive structure. According to various aspects, the physical model (e.g., used for fitting the resistance-characteristic curve) may be given after initialization in high resistance state (HRS) based on:

$$V = n_1 \frac{k_B T}{q} \log\left(\frac{I}{E[I]} + 1\right)\left(1 + K_1 \frac{k_B T}{q} \log\left(\frac{I}{E[I]} + 1\right)\right) + V2$$

with the voltage V applied between top electrode and bottom electrode or with the current sourced between top electrode and bottom electrode with $$V = V_1 + V_2 \text{ and with}$$

$$I = -I_{s2,Branch4}\left(e^{\frac{-qV_2}{k_BT(n_2+K_2V_2)}} - 1\right) + \frac{V_2}{F[I]}$$

and may be given after initialization in low resistance (LRS) based on:

$$V = -n_2\frac{k_BT}{q}\log\left(\frac{I}{G[I]} + 1\right)\left(1 + K_2\frac{k_BT}{q}\log\left(\frac{I}{G[I]} + 1\right)\right) + V1$$

$$\text{with } V = V_1 + V_2 \text{ and with}$$

$$I = +I_{s1,Branch2}\left(e^{\frac{+qV_1}{k_BT(n_1-K_1V_1)}} - 1\right) + \frac{V_1}{H[I]}$$

wherein: V may be the applied voltage, I may be the current through the memristive structure responsive to applying the read voltage, $k_B$ may be the Boltzmann constant, T may be the temperature of the memristive structure, q may be the electron charge, and E[I], F[I], G[I], and H[I] each may be a respective dynamic state parameter. According to various aspects, the physical model (e.g., used for fitting the resistance-characteristic curve) may be given with E[I]=$I_{s1}$[I], F[I]=$R_{s2}$[I], G[I]=$I_{s2}$[I], H[I]=$R_{s1}$[I] after initialization in high resistance state (HRS) based on:

$$V = n_1\frac{k_BT}{q}\log\left(\frac{I}{I_{s1}[I]} + 1\right)\left(1 + K_1\frac{k_BT}{q}\log\left(\frac{I}{I_{s1}[I]} + 1\right)\right) + V2$$

$$\text{with } V = V_1 + V_2 \text{ and with}$$

$$I = -I_{s2,Branch4}\left(e^{\frac{-qV_2}{k_BT(n_2+K_2V_2)}} - 1\right) + \frac{V_2}{R_{s2}[I]}$$

and may be given after initialization in low resistance (LRS) based on:

$$V = -n_2\frac{k_BT}{q}\log\left(\frac{I}{I_{s2}[I]} + 1\right)\left(1 + K_2\frac{k_BT}{q}\log\left(\frac{I}{I_{s2}[I]} + 1\right)\right) + V1$$

$$\text{with } V = V_1 + V_2 \text{ and with}$$

$$I = +I_{s1,Branch2}\left(e^{\frac{+qV_1}{k_BT(n_1-K_1V_1)}} - 1\right) + \frac{V_1}{R_{s1}[I]}$$

wherein: V may be the applied write voltage, I may be the current through the memristive structure responsive to applying the write voltage, $k_B$ may be the Boltzmann constant, T may be the temperature of the memristive structure, q may be the electron charge, and $I_{s1}$[I], $R_{s2}$[I], $I_{s2}$[I], and $R_{s1}$[I] each may be a respective dynamic state parameter. $I_{s1}$[I] describes the saturation current of the top electrode in forward direction (positive bias applied to top electrode). $R_{s2}$[I] describes the depletion resistance of the bottom electrode in reverse direction (positive bias applied to top electrode). $I_{s2}$[I] describes the saturation current of the bottom electrode in reverse direction (negative bias applied to top electrode). $R_{s1}$[I] describes the depletion resistance of the top electrode in forward direction (negative bias applied to top electrode). Hence, in this example, the physical model may include four dynamic state parameters. It is understood that the dynamic state parameters do change when the current/voltage curve of branch 1 and of branch 3 are measured.

It is noted, that various aspects are described for a read and/or write procedure to operate the memristive element, wherein reference is made to a read voltage and/or a write voltage. The write voltage may be representative for a memristive state to be written, in particular if the write voltage is applied long enough, e.g., for a saturation time. However, in some aspects, a memristive state to be written (or changed) may be defined based on a change in charge or flux introduced in the memristive element. A written memristive state may be read based on a read voltage that is equal to or less than the write voltage that is used to write the memristive state in order to avoid a rewriting. However, in the case that the write voltage is applied for a short time, e.g., for a time lower than the saturation time, the effectively induced change in the flux and/or charge is less than a change in the flux and/or the charge that could be introduced based on the same voltage if the voltage would be applied for a longer time, e.g., for the saturation time, see, for example, FIGS. 4B and 4C. Therefore, there may be write procedures to write a memristive state based on a boosted write voltage that that is higher than actually needed to write the memristive element into the memristive state to allow for use of a shorter write time such that the flux and/or charge change introduced in the memristive element caused based on the boosted write voltage and the correspondingly reduced write time (lower than the saturation time) is the same as the flux and/or charge change that would be instructed based on the actually needed lower write voltage applied for the saturation time. This may allow for a more efficient write procedure.

Furthermore, the write signal may be selected time dependent such that a maximal flux and/or charge change is caused based on the write signal (e.g., a rectangular write pulse, e.g., a write pulse with a positive curvature in the voltage/time dependency), whereas a read signal may be selected time dependent such that a minimal flux and/or charge change would be caused based on the read signal (e.g., an (for example, exponentially) increasing read pulse, e.g., a read pulse with a negative curvature in the voltage/time dependency).

Example 148 is a device including: a memristive element residing in a memristive state of a plurality of memristive states; and a read circuit configured to: in a first measurement, measure a first voltage drop over the memristive element or a first current ($I_{read1}$) through the memristive element; in a second measurement subsequent to the first measurement, measure a second voltage drop over the memristive element or a second current ($I_{read2}$) through the memristive element; and determine the memristive state of the memristive element based on the first measurement and the second measurement.

In Example 149, the subject matter of Example 148 can optionally include that, in the first measurement, a first read voltage drop over the memristive element is caused and wherein, in the second measurement, a second read voltage drop over the memristive element is caused, the second read voltage drop being different from the first read voltage drop; or that, in the first measurement, a first read current ($I_{read1}$) through the memristive element is caused and wherein, in the second measurement, a second read current ($I_{read2}$) through the memristive element is caused, the second read current ($I_{read1}$) being different from the first read current ($I_{read2}$).

In Example 150, the subject matter of Example 148 or 149 can optionally include that the read circuit is configured to determine the memristive state of the memristive element based on: determining a first expected memristive state of the memristive element based on the first measurement, determining a second expected memristive state of the memristive element based on the second measurement, and determining the memristive state of the memristive element based on the determined first expected memristive state and the determined second expected memristive state.

In Example 151, the subject matter of Example 150 can optionally include that the read circuit is configured to determine the memristive state of the memristive element based on the determined first expected memristive state and the determined second expected memristive state based on: determining, whether the first expected memristive state corresponds to the second expected memristive state, and in the case that the first expected memristive state corresponds to the second expected memristive state, determining the first expected memristive state as the memristive state of the memristive element.

In Example 152, the subject matter of Example 148 or 149 can optionally include that the read circuit is configured to: carry out one or more further measurements subsequent to the first measurement and the second measurement to determine a current/voltage characteristic of the memristive element, wherein each further measurement of the one or more further measurements includes: measure a respective voltage drop over the memristive element or a respective current through the memristive element; fit the current/voltage characteristic based on a physical model to determine one or more static state parameter values, wherein the physical model is based on static state parameters for which the static state parameter values are determined, and determine the memristive state of the memristive element based on the determined one or more static state parameter values.

In Example 153, the subject matter of Example 152 can optionally include that the read circuit is configured to determine, based on the determined one or more static state parameter values, whether the memristive state is associated with a first logic state or a second logic state.

Example 154 is a device including: a plurality of memristive elements; a read circuit configured to read out a respective logic state of each memristive element of the plurality of memristive elements, wherein the read circuit is configured to read out a logic state of a respective memristive element of the plurality of memristive elements via at least two measurements based on determining, based on the at least two measurements, whether the logic state of the respective memristive element is associated with a first logic state or a second logic state, wherein each measurement of the at least two measurements includes measuring a voltage drop over the memristive element or a current through the memristive element; and one or more processors configured to generate a key based on the logic states determined for the plurality of memristive elements.

In Example 155, the subject matter of Example 154 can optionally include that the at least two measurements include a first measurement and a second measurement; and that, in the first measurement, a first read voltage drop over the respective memristive element is caused and wherein, in the second measurement, a second read voltage drop over the respective memristive element is caused, the second read voltage drop being different from the first read voltage drop; or wherein, in the first measurement, a first read current through the respective memristive element is caused and wherein, in the second measurement, a second read current through the respective memristive element is caused, the second read current being different from the first read current.

In Example 156, the subject matter of Example 155 can optionally include that the read circuit is configured to determine, based on the at least two measurements, whether the logic state of the respective memristive element is associated with the first logic state or the second logic state based on: determining a first expected logic state of the respective memristive element based on the first measurement, determining a second expected logic state of the respective memristive element based on the first or second measurement, and in the case that the first expected logic state corresponds to the second expected logic state, determining the first expected logic state as the logic state of the respective memristive element.

In Example 157, the subject matter of Example 156 can optionally include that the read circuit is configured to: in the case that the first expected logic state does not correspond to the second expected logic state, carry out one or more further measurements to determine a current/voltage characteristic of the respective memristive element, fit the current/voltage characteristic based on a physical model to determine one or more static state parameter values, wherein the physical model is based on static state parameters for which the static state parameter values are determined, and determine, based on the determined one or more static state parameter values, whether the respective memristive element is associated with the first logic state or the second logic state.

In Example 158, the subject matter of any one of Examples 154 to 157 can optionally include that each memristive element of the plurality of memristive elements includes a respective memristive state which is within a predefined subrange of a plurality of memristive states.

In Example 159, the subject matter of any one of Examples 154 to 127 can optionally include that each memristive element of the plurality of memristive elements includes the same memristive state of a plurality of memristive states.

Example 160 is a device including: a plurality of memristive elements; a read circuit configured to read out the plurality of memristive elements, wherein the read circuit is configured to read out a respective memristive element of the plurality of memristive elements based on determining a current/voltage characteristic of the respective memristive element based on current/voltage measurements; and one or more processors configured to: determine respective one or more static state parameter values for each memristive element of the plurality of memristive elements, wherein the determination of the one or more static state parameter values for a respective memristive element of the plurality of memristive elements includes: fitting the current/voltage characteristic determined for the respective memristive element based on a physical model to determine the one or more static state parameter values, wherein the physical model is based on static state parameters for which the static state parameter values are determined; and generate a key based on the one or more static state parameter values respectively determined for each of the plurality of memristive elements.

In Example 161, the subject matter of Example 160 can optionally include that each memristive element of the plurality of memristive elements includes a respective memristive state of a plurality of memristive states, wherein the memristive states of the plurality of memristive elements are distributed over the plurality of memristive states.

In Example 162, the subject matter of any one of Examples 154 to 161 can optionally include that the plurality of memristive states has a number of memristive states equal to or greater than 50.

In Example 163, the subject matter of any one of Examples 154 to 162 can optionally include that the one or more processors are configured to generate the key based on: determining a respective logic state for each memristive element of the plurality of memristive elements, wherein determining a logic state for a respective memristive element includes: classifying the respective memristive element into a group of two or more groups based on the one or more static state parameter values determined for the respective memristive element, wherein each group of the two or more groups is bijectively assigned to a respective logic state; and generating the key based on the respective logic state of each memristive element of the plurality of memristive elements.

In Example 164, the subject matter of any one of Examples 154 to 163 can optionally include that the one or more processors are further configured to generate a cryptographic key based on the key.

In Example 165, the subject matter of any one of Examples 154 to 164 can optionally include that the one or more processors are further configured to generate one or more random numbers based on the key.

In Example 166, the subject matter of any one of Examples 154 to 165 can optionally include: a write circuit configured to write each memristive element of the plurality of memristive elements into a respective memristive state of a plurality of memristive states.

In Example 167, the subject matter of Example 166 can optionally include: a random number generator configured to generate random numbers; wherein the write circuit is configured to select the memristive state into which a respective memristive element of the plurality of memristive elements is to be written from the plurality of memristive states based on a random number generated by the random number generator.

Example 168 is a device, including: a memristive element; and a read circuit to read the memristive element by a read operation, wherein the read operation comprises: causing a time dependent read voltage drop over the memristive element, wherein the time dependent read voltage has a negative curvature in the voltage/time dependency (to reduce a flux and/or charge introduction into the memristive element to avoid a write disturbance during reading the memristive element); and/or causing a time dependent read current through the memristive element, wherein the time dependent read current has a negative curvature in the current/time dependency (to reduce a flux and/or charge introduction into the memristive element to avoid a write disturbance during reading the memristive element).

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

What is claimed is:

1. A device, comprising:
a memristive element residing in a memristive state of a plurality of memristive states; and
a read circuit configured to:
in a first measurement, measure a first voltage drop over the memristive element or a first current, $I_{read1}$, through the memristive element;
in a second measurement subsequent to the first measurement, measure a second voltage drop over the memristive element or a second current, $I_{read2}$, through the memristive element; and
determine the memristive state of the memristive element based on the first measurement and the second measurement.

2. The device according to claim 1,
wherein, in the first measurement, a first read voltage drop over the memristive element is caused and wherein, in the second measurement, a second read voltage drop over the memristive element is caused, the second read voltage drop being different from the first read voltage drop; or
wherein, in the first measurement, a first read current through the memristive element is caused and wherein, in the second measurement, a second read current through the memristive element is caused, the second read current being different from the first read current.

3. The device according to claim 1,
wherein the read circuit is configured to determine the memristive state of the memristive element based on:
determining a first expected memristive state of the memristive element based on the first measurement,
determining a second expected memristive state of the memristive element based on the second measurement, and
determining the memristive state of the memristive element based on the determined first expected memristive state and the determined second expected memristive state.

4. The device according to claim 3,
wherein the read circuit is configured to determine the memristive state of the memristive element based on the determined first expected memristive state and the determined second expected memristive state based on:
determining, whether the first expected memristive state corresponds to the second expected memristive state, and
in the case that the first expected memristive state corresponds to the second expected memristive state, determining the first expected memristive state as the memristive state of the memristive element.

5. The device according to claim 1,
wherein the read circuit is configured to:
carry out one or more further measurements subsequent to the first measurement and the second measurement to determine a current/voltage characteristic of the memristive element,
wherein each further measurement of the one or more further measurements comprises:
measure a respective voltage drop over the memristive element or a respective current through the memristive element;
fit the current/voltage characteristic based on a physical model to determine one or more static state parameter values, wherein the physical model is based on static state parameters for which the static state parameter values are determined, and
determine the memristive state of the memristive element based on the determined one or more static state parameter values.

6. The device according to claim 5, wherein the read circuit is configured to determine, based on the determined one or more static state parameter values, whether the memristive state is associated with a first logic state or a second logic state.

7. A device, comprising:

a plurality of memristive elements;

a read circuit configured to read out a respective logic state of each memristive element of the plurality of memristive elements, wherein the read circuit is configured to read out a logic state of a respective memristive element of the plurality of memristive elements via at least two measurements by determining, based on the at least two measurements, whether the logic state of the respective memristive element is associated with a first logic state or a second logic state, wherein each measurement of the at least two measurements comprises measuring a voltage drop over the memristive element or a current through the memristive element; and one or more processors configured to generate a key based on the logic states determined for the plurality of memristive elements.

8. The device according to claim 7, wherein the at least two measurements comprise a first measurement and a second measurement; and wherein, in the first measurement, a first read voltage drop over the respective memristive element is caused and wherein, in the second measurement, a second read voltage drop over the respective memristive element is caused, the second read voltage drop being different from the first read voltage drop; or wherein, in the first measurement, a first read current through the respective memristive element is caused and wherein, in the second measurement, a second read current through the respective memristive element is caused, the second read current being different from the first read current.

9. The device according to claim 8, wherein the read circuit is configured to determine, based on the at least two measurements, whether the logic state of the respective memristive element is associated with the first logic state or the second logic state based on:

determining a first expected logic state of the respective memristive element based on the first measurement, determining a second expected logic state of the respective memristive element based on the second measurement, and in the case that the first expected logic state corresponds to the second expected logic state, determining the first expected logic state as the logic state of the respective memristive element.

10. The device according to claim 9, wherein the read circuit is configured to:

in the case that the first expected logic state does not correspond to the second expected logic state, carry out one or more further measurements to determine a current/voltage characteristic of the respective memristive element, fit the current/voltage characteristic based on a physical model to determine one or more static state parameter values, wherein the physical model is based on static state parameters for which the static state parameter values are determined, and determine, based on the determined one or more static state parameter values, whether the respective memristive element is associated with the first logic state or the second logic state.

11. The device according to claim 7, wherein each memristive element of the plurality of memristive elements comprises a respective memristive state which is within a predefined subrange of a plurality of memristive states.

12. The device according to claim 7, wherein each memristive element of the plurality of memristive elements comprises the same memristive state of a plurality of memristive states.

13. A device, comprising:

a plurality of memristive elements;

a read circuit configured to read out the plurality of memristive elements, wherein the read circuit is configured to read out a respective memristive element of the plurality of memristive elements based on determining a current/voltage characteristic of the respective memristive element based on current/voltage measurements; and one or more processors configured to:

determine respective one or more static state parameter values for each memristive element of the plurality of memristive elements, wherein the determination of the one or more static state parameter values for a respective memristive element of the plurality of memristive elements comprises: fitting the current/voltage characteristic determined for the respective memristive element based on a physical model to determine the one or more static state parameter values, wherein the physical model is based on static state parameters for which the static state parameter values are determined; and generate a key based on the one or more static state parameter values respectively determined for each of the plurality of memristive elements.

14. The device according to claim 13, wherein each memristive element of the plurality of memristive elements comprises a respective memristive state of a plurality of memristive states, wherein the memristive states of the plurality of memristive elements are distributed over the plurality of memristive states.

15. The device according to claim 14, wherein the plurality of memristive states has a number of memristive states equal to or greater than 50.

16. The device according to claim 13, wherein the one or more processors are configured to generate the key based on:

determining a respective logic state for each memristive element of the plurality of memristive elements, wherein determining a logic state for a respective memristive element comprises: classifying the respective memristive element into a group of two or more groups based on the one or more static state parameter values determined for the respective memristive element, wherein each group of the two or more groups is bijectively assigned to a respective logic state; and generating the key based on the respective logic state of each memristive element of the plurality of memristive elements.

17. The device according to claim 13, wherein the one or more processors are further configured to generate a cryptographic key based on the key.

18. The device according to claim 13, wherein the one or more processors are further configured to generate one or more random numbers based on the key.

19. The device according claim 13, further comprising: a write circuit configured to write each memristive element of the plurality of memristive elements into a respective memristive state of a plurality of memristive states.

20. The device according to claim 19, further comprising: a random number generator configured to generate random numbers;

wherein the write circuit is configured to select the memristive state into which a respective memristive element of the plurality of memristive elements is to be written from the plurality of memristive states based on a random number generated by the random number generator.

\* \* \* \* \*